(12) United States Patent
Stiles et al.

(10) Patent No.: US 7,514,516 B2
(45) Date of Patent: *Apr. 7, 2009

(54) MEASUREMENT AND PREPARATION OF BRANCHED VINYL POLYMERS

(75) Inventors: Brad Stiles, Friendswood, TX (US); Jose M. Sosa, Deer Park, TX (US); Cyril Chevillard, Dickinson, TX (US); Aron Griffith, League City, TX (US); Jay L. Reimers, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 577 days.

This patent is subject to a terminal disclaimer.

(21) Appl. No.: 11/208,909

(22) Filed: Aug. 22, 2005

(65) Prior Publication Data

US 2005/0277754 A1 Dec. 15, 2005

Related U.S. Application Data

(63) Continuation-in-part of application No. 10/445,760, filed on May 27, 2003, now Pat. No. 6,972,311.

(51) Int. Cl.
*C08F 212/34* (2006.01)
*C08F 212/36* (2006.01)
*C08F 2/38* (2006.01)
*G01N 30/84* (2006.01)

(52) U.S. Cl. .................... 526/346; 526/224; 526/230.5; 526/232.3; 526/336; 526/347; 422/70; 436/161

(58) Field of Classification Search ............... 526/230.5, 526/232, 3, 336, 346, 347, 224; 436/161; 422/70
See application file for complete search history.

(56) References Cited

U.S. PATENT DOCUMENTS

| 3,357,964 A * | 12/1967 | Gulpen et al. ............ 526/232.3 |
| 3,966,381 A * | 6/1976 | Suh ......................... 425/376.1 |
| 5,059,667 A * | 10/1991 | Nakamura .................. 526/324 |
| 5,540,813 A | 7/1996 | Sosa et al. |
| 5,830,924 A | 11/1998 | Suh et al. |
| 6,064,945 A * | 5/2000 | Gorenstein et al. ............ 702/23 |
| 6,166,099 A | 12/2000 | Krupinski |
| 6,175,409 B1 | 1/2001 | Nielsen et al. |
| 6,260,407 B1 | 7/2001 | Petro et al. |
| 6,265,226 B1 | 7/2001 | Petro et al. |
| 6,274,641 B1 | 8/2001 | Krupinski |
| 6,294,388 B1 | 9/2001 | Petro et al. |
| 6,353,066 B1 | 3/2002 | Sosa |
| 6,406,632 B1 | 6/2002 | Safir et al. |
| 6,420,444 B1 | 7/2002 | Krupinski |
| 6,433,092 B2 | 8/2002 | Krupinski et al. |
| 6,476,149 B1 | 11/2002 | Krupinski |
| 6,706,814 B2 | 3/2004 | Demirors |
| 6,770,716 B1 | 8/2004 | Sosa et al. |
| 6,822,046 B2 | 11/2004 | Li et al. |
| 6,972,311 B2 * | 12/2005 | Chevillard et al. .......... 526/346 |
| 2005/0176154 A1 * | 8/2005 | Smith et al. .................. 436/86 |

FOREIGN PATENT DOCUMENTS

WO    WO 99/46301    * 9/1999

* cited by examiner

*Primary Examiner*—Fred M Teskin
(74) *Attorney, Agent, or Firm*—Tenley R. Krueger

(57) ABSTRACT

Disclosed are novel non-linear vinyl polymers comprised of a multifunctional peroxide, and a cross-linking agent and/or a chain transfer agent, and methods of making such polymers having: at least 0.03 branches/1000 backbone carbons; linear portions with a molecular weight (Mw) of 350,000 or less; 0.2 to 3.0 branches/molecule; or, a Mz/Mw of from 1.7 to 5.7. Methods of quantifying branching are disclosed using a linear reference having 0.0 to 0.06 branches/1000 backbone carbons along with SEC techniques and measurements of molecular weight, molecular size, and concentration. Also discovered is a vinyl polymer resin comprised of from 0.1 to 50 weight percent of non-linear polymers having at least 0.06 branches/1000 backbone carbons, where branching is measured using a heat polymerized polystyrene having from 0.0 to 0.06 branches/1000 backbone carbons as a linear reference.

4 Claims, 27 Drawing Sheets

MEASUREMENT AND PREPARATION OF BRANCHED VINYL POLYMERS

CROSS-REFERENCE TO RELATED APPLICATIONS

This application is a continuation in part of U.S. patent application Ser. No. 10/445,760 by Chevillard, et al., filed May 27, 2003, entitled "Optimizing Polystyrene in the Presence of Additives," which patented as U.S. Pat. No. 6,972,311.

FIELD OF THE INVENTION

The present invention is related to methods and compositions useful to improve the manufacture of polystyrene and copolymers of styrene. It relates more particularly to methods of polymerizing and copolymerizing styrene monomer with multifunctional initiators in the presence of cross-linking agents and/or chain transfer agents that yield highly branched polystyrene.

The invention also relates to improved branched vinyl polymers, and methods of producing such vinyl polymers. More particularly, it relates to the polymerization of vinyl monomers in the presence of heat and at least one multifunctional initiator that produces polymers with branched molecules and improved properties. Cross-linking agents and/or chain transfer agents can also be used during polymerization and effect the branching of such polymers.

The invention further relates to a method of quantifying branching in polymers. More particularly, it relates to a method of measuring branching using GPC/SEC separation techniques in conjunction with a linear reference with low branching to obtain measurements of molecular weight, molecular size, and concentration.

BACKGROUND OF THE INVENTION

The polymerization of styrene is a very important industrial process that supplies materials used to create a wide variety of polystyrene-containing articles. This expansive use of polystyrene results from the ability to control the polymerization process. Thus, variations in the polymerization process conditions are of utmost importance since they in turn allow control over the physical properties of the resulting polymer. The resulting physical properties determine the suitability of polystyrene for a particular use. For a given product, several physical characteristics must be balanced to achieve a suitable polystyrene material. Among the properties that must be controlled and balanced are averaged molecular weight (Mw) of the polymer, molecular weight distribution (MWD), melt flow index (MFI), and the storage modulus (G').

U.S. Pat. No. 5,540,813 by Sosa, et. al., which is fully incorporated herein by reference, discloses a process for preparing monovinyl polymers, such as polystyrene, which utilizes a combination of sequentially ordered multiple reactors, heat exchangers and devolatilizers to strictly control polymer properties such as the molecular weight distribution and melt flow index.

The relationship between the molecular weight and the storage modulus is of particular importance in polymer foam applications. Such foam applications require high molecular weight polymers having a high storage modulus. It is thought that the storage modulus is related to the degree of branching along the polymer chain. As the degree of branching increases, the likelihood that a branch entangles with other polymer chains increases. A polymer product having a higher degree of branching or cross-linking tends to have a higher storage modulus, and therefore better foam stability characteristics.

Methods for preparing branched polymers are well-known in the art. For example, the preparation of branched polystyrene by free radical polymerization has been reported. Both methods increase the branching in the devolatilization step and produce a polymer with an undesirably low molecular weight.

Rather than employing free radical polymerization, some have used multi-functional mercaptans to form branched polymers. While materials having an acceptable molecular weight can be prepared by this method, these products are often unacceptable for foam applications with typical blowing agents due to their undesirable flow properties.

The properties of randomly branched polystyrene prepared in the presence of divinylbenzene have been reported by Rubens (L. C. Rubens, *Journal of Cellular Physics*, pp 311-320, 1965). However, polymers having a useful combination of molecular weight and cross-linking are not attainable. At low concentrations of divinylbenzene, low molecular weight polymers having little branching result. However, higher concentrations of the cross-linking agent result in excessive cross-linking and concomitant gel formation that is highly undesirable in industrial polystyrene processes. Similar results and problems were reported by Ferri and Lomellini (J. Rheol. 43(6), 1999).

A wide variety of peroxy compounds is known from the literature as initiators for the production of styrenic polymers. Commercially available initiators for polymer production may be classified in different chemical groups, which include diacylperoxides, peroxydicarbonates, dialkylperoxides, peroxyesters, peroxyketals, and hydroperoxides. Peroxides and hydroperoxides undergo at least four reactions in the presence of monomers or hydrocarbons with double bonds. These reactions are: 1) chain transfer, 2) addition to monomer, 3) hydrogen abstraction, and 4) re-combination, often called a cage effect.

Hydroperoxides have been shown to undergo induced decomposition reactions, in which a polymer radical (∼∼P*) will react with the initiator as shown below. This reaction is basically a chain transfer reaction and the reaction should be amenable to the well-known chain transfer equations. Radicals obtained from peroxide initiators (RCOO*) can also abstract a hydrogen from the hydroperoxide.

$$RCOO^* \text{ or } {\sim}{\sim}P^* + RCOOH \rightarrow {\sim}{\sim}PH + ROO^*$$

Baysal and Tobolsky (*Journal of Polymer Science*, Vol. 8, p. 529 et seq., (1952), fully incorporated by reference herein) investigated the chain transfer of polystyryl radicals to t-butyl hydroperoxide (t-BHP), cumyl hydroperoxide (CHP), benzoyl peroxide ($Bz_2O_2$), and azobisisobutyronitrile (AIBN). AIBN and benzoyl peroxide give the classical linear correlations between rate and 1/DP (Degree of Polymerization) indicating no chain transfer to initiators. The hydroperoxides, however, show significant levels of chain transfer.

A. I. Lowell and J. R. Price (*Journal of Polymer Science*, Vol. 43, p. 1, et seq. (1960), fully incorporated by reference herein) also showed that polystyryl radicals undergo considerable chain transfer with bis(2,4-dichloro) benzoyl peroxide as compared to dilauroyl peroxide.

Commercial polystyrene made by the conventional free-radical process yields linear structures and structures with low levels of branching. As noted, methods to prepare branched polystyrenes, however, are not easily optimized and few commercial non-linear polystyrenes are known. Studies of branched polymers show that these polymers possess unique molecular weight-viscosity relationships due to the potential for increased molecular entanglements. Depending upon the number and length of the branches, non-linear structures can give melt strengths equivalent to that of linear polymers at slightly higher melt flows.

U.S. Pat. No. 6,353,066 to Sosa describes a method of producing a copolymer by placing a vinylbenzene (e.g. styrene) in a reactor, placing a cross-linking agent (e.g. divinylbenzene) in the reactor, and placing a chain transfer agent (e.g. mercaptan) in the reactor and forming a polyvinyl benzene in the presence of the cross-linking agent and chain transfer agent. The melt strength of a polymer may also be improved by lightly cross linking a polymer.

It would be desirable if methods could be devised or discovered to provide vinyl polymers with increased branching, such as branched polystyrene with improved properties. It would also be helpful if a method could be devised that would help optimize the physical properties of vinyl polymers having increased branching. Such polymers may have higher melt strength than linear chains, and may improve processability and mechanical properties of the final product (e.g. lower density in foam applications).

While the preparation of branched polymers such as polystyrene by free radical polymerization has been reported, a need exists for a reliable method of measuring and quantifying branching in such polymers. It is also desirable to quantify branching in polymers to more clearly understand the effect of various additives used during polymerization reactions. In the art it is also desirable to provide vinyl polymers with increased branching, a satisfactory molecular weight, and a higher melt strength than linear chains for improved processability and mechanical properties in products (e.g. increased strength and/or lower density in foam). It is also desirable to determine how to best commercially produce polymers with optimal characteristics. Further, it is desirable to define the parameters of density and melt flow index for the optimal characteristics of foamed polymers.

A need also exists to explore the relationship between the molecular weights percentages of the linear fractions to the non-linear fractions in such polymers.

SUMMARY OF THE INVENTION

There is provided, in one form, a method for producing an improved polymerized product that involves polymerizing at least one vinyl monomer in the presence of at least one multifunctional initiator that is selected from the group consisting of bifunctional, trifunctional, and tetrafunctional peroxides. In a non-limiting embodiment, the vinyl monomer is aromatic. In a non-limiting embodiment, the polymerization is also conducted in the presence of at least one chain transfer agent and/or at least one cross-linking agent. A polymerized product is recovered.

In another non-limiting embodiment of the invention, there is provided a vinyl monomer resin that includes at least one vinyl monomer, at least one multifunctional initiator selected from the group consisting of trifunctional, bifunctional, and tetrafunctional peroxides, and at least one chain transfer agent and/or at least one cross-linking agent.

In another non-limiting embodiment of the invention, there is provided a vinylic/diene graft copolymer made by polymerizing at least one vinyl monomer with at least one polydiene in the presence of at least one multifunctional initiator, and at least one chain transfer agent and/or at least one cross-linking agent. A copolymerized product is recovered.

In still another non-limiting embodiment of the invention, a mathematical method and model was discovered to optimize the physical properties of polystyrene in the presence of the additives of this invention.

In yet another non-limiting form of the invention, a novel vinyl polymer is provided that is comprised of a vinyl monomer, a cross-linking agent and/or chain transfer agent, and a multifunctional peroxide initiator, where the initiator causes free radical polymerization and formation of non-linear vinyl polymers that have at least 0.03 branches/1000 backbone carbons.

In another non-limiting embodiment, a polymer is disclosed that includes a vinyl monomer, a cross-linking agent and/or a chain transfer agent, and a multifunctional peroxide initiator, where the initiator causes free radical polymerization and formation of non-linear vinyl polymers that comprise from 0.1 to 50 weight percent of the polymer, with the polymer also being comprised of linear polymers that have a molecular weight (Mw) of 350,000 or less.

In a further non-limiting embodiment, a polymer is disclosed that includes a vinyl monomer, a cross-linking agent and/or chain transfer agent, and a multifunctional peroxide initiator, where the initiator causes free radical polymerization and formation of non-linear vinyl polymers, where the linear and non-linear portions of the polymer have an Mz/Mw of from 1.7 to 5.7.

Another novel polymer includes a vinyl monomer and a bifunctional peroxide initiator that causes free radical polymerization and formation of non-linear vinyl polymers that are from 0.1 to 49 weight percent of the polymer and have at least 0.03 branches/1000 backbone carbons. A further non-limiting polymer is also comprised of a cross-linking agent and/or chain transfer agent.

A non-limiting method of preparing such vinyl polymers is also disclosed that includes providing a vinyl monomer feed stream, introducing a multifunctional peroxide initiator, and a cross-linking agent and/or chain transfer agent, where the initiator causes free radical polymerization and formation of non-linear vinyl polymers that are from 0.1 to 50 weight percent of the polymer, with the linear polymers having a molecular weight (Mw) of 350,000 or less.

A non-limiting method of measuring branching in polymers was also discovered, using a linear reference having 0.06 branches/1000 backbone carbons, or less. More specifically, the method includes obtaining a polymer sample with unknown branching to be analyzed, and using size exclusion chromatography (SEC) to separate the molecules of the sample and the linear reference. The chromatography column separates the molecules of the sample and linear reference based on size and results in a volume of effluent for the sample and for the reference. In a non-limiting embodiment, each volume of effluents of the sample and reference are individually directed to at least one detector to obtain measurements of molecular weight, molecular size, and concentration. In a non-limiting embodiment, branching calculations are based upon the ratio of the intrinsic viscosity of the branched polymer sample to the intrinsic viscosity of the linear reference. In a further non-limiting embodiment, branching calculations are based upon the ratio of the radius of gyration of the branched polymer sample to the radius of gyration of the linear reference.

Further disclosed is a non-limiting embodiment of a polymer resin that includes linear polymers and non-linear vinyl polymers, where the non-linear polymers are from 0.1 to 50 weight percent of the polymer resin and have at least 0.06 branches/1000 backbone carbons, with the branches being measured using a heat polymerized polystyrene having from 0.0 to 0.06 branches/1000 backbone carbons as a linear reference. A method of making the branched polymer resin is also included.

Also provided is a non-limiting method for preparing a polymer having 0.06 branches/1000 backbone carbons or less for usage as a linear reference in polymer characterization systems.

DETAILED DESCRIPTION OF THE INVENTION

Introduction and Definitions

Figure 1:
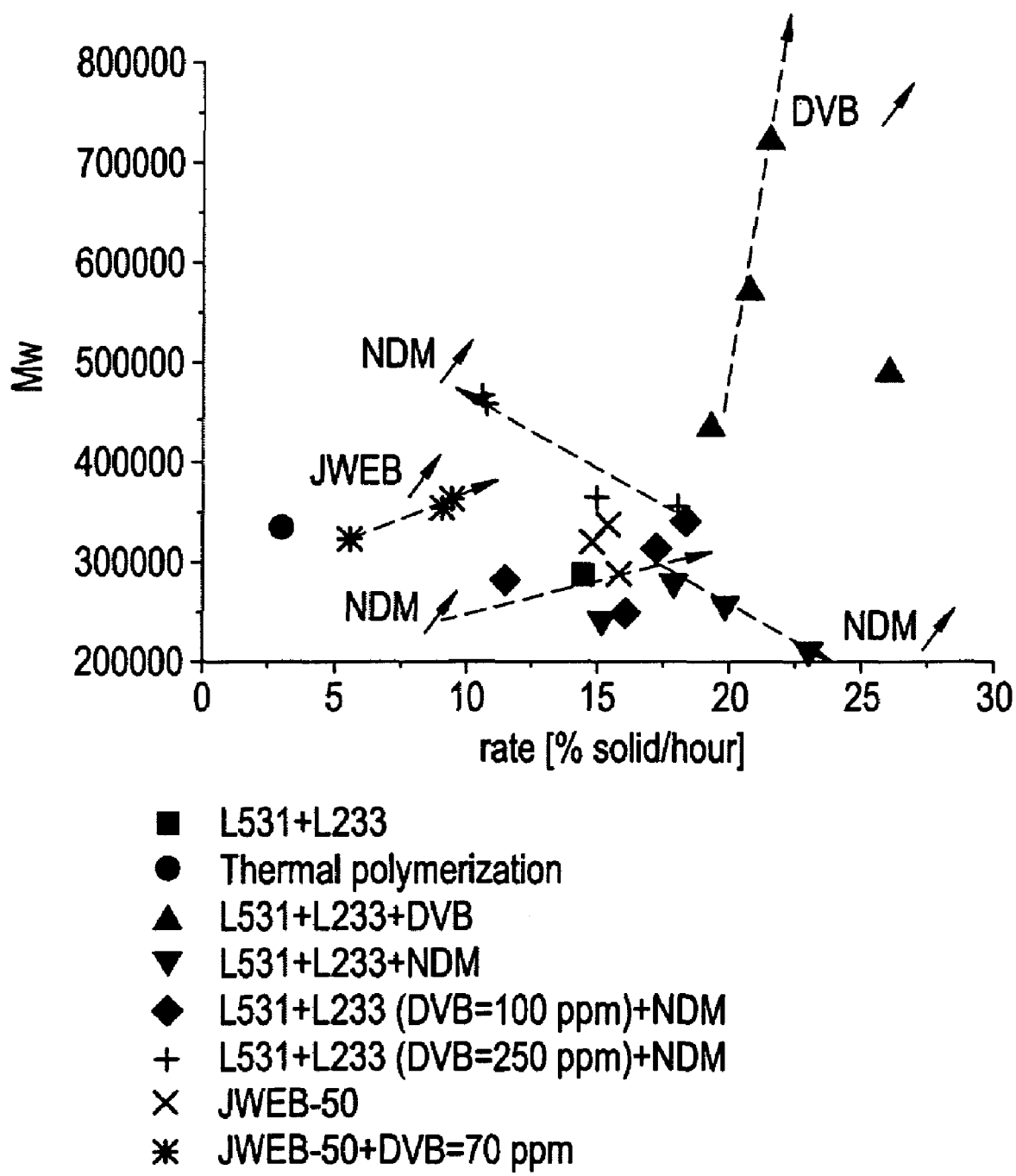
FIG. 1 is a graph of the effects of various additives on the molecular weight (y-axis) and rate α-axis) for foam grade crystalline polystyrene.

A detailed description will now be provided. Each of the appended claims define an invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Each invention will now be described in greater detail below, including specific embodiments, versions and examples, but the invention is not limited to those embodiments, versions or examples, which are included to enable a person having ordinary skill in the art to make and use the inventions, when the information in this patent is combined with available information and technology. Various terms as used herein are shown below. To the extent a term used in a claim is not defined below, it should be given the broadest definition that persons in the pertinent art have given that term as reflected in printed publications and issued patents.

Definitions

The term "aromatic" refers to chemical compounds that that have physical and chemical properties resembling those of benzene; or, pertaining to or characterized by at least one benzene.

The term "backbone carbon" refers to the carbon atoms that are in the main chain or backbone of the polymer.

The term "bifunctional initiator" refers to a substance or molecule other than a reactant that initiates a chain reaction and has two reactive sites.

The term "block copolymer" refers to a polymer made up of blocks of different polymerized monomers, where there are repeated sequences of polymeric segments of different chemical structure.

The term "blowing agent" refers to one or more ingredients that are used to produce gas by chemical and/or thermal action during manufacture to produce foam, foamed products, hollow articles, or cellular articles.

The term "branch" refers to a side chain.

The terms "branch," "branched," and "branching," refer to the structure of certain molecules that have 1 or more branching points that emanate from a common node of a molecule.

The term "branching number" or "$B_n$" refers to the average number of branches per molecule of a given substance. The branching number can be calculated a variety of ways, including but not limited to using the differences in viscosity and molecular weight compared to a linear reference, or instead can be determined using the linear relationship of intrinsic viscosity and molecular weight from the Mark-Houwink equation.

The term "branched polymer" refers to a polymer chain containing monomer units having at least 1 and up to 4 branching points that emanate from a common node of a molecule. When the branches emanate from a carbon atom, there can be 1 to 4 branching points. Examples of branched polymers include copolymers; short-chain branched polymers; long-chained branched polymers; hyper-branched polymers; a cross-linked polymer; a cyclic polymer; a comb-type form polymers with three branching points; a star-type form with three to four branching points; and a dendritic structure with a plurality of branches, having branched units attached to the branches, with four or less branches per unit.

The term "chain" refers various lengths of repetitive units of atoms (monomer residues) which make up the polymer, and which affect the properties of the polymer.

The term "chain transfer" refers to the abstraction of an atom from another molecule (initiator, monomer, polymer, or solvent) by the radical end of a growing (addition) polymer, which simultaneously terminates the polymer chain and creates a new radical capable of chain polymerization; chain transfer also occurs in cationic polymerization.

The term "chain transfer agent" refers to an agent used in polymerization, which has the ability to stop the growth of a molecular chain by yielding an atom to the active radical at the end of the growing chain. It in turn is left as a radical that can initiate the growth of a new chain. Chain transfer agents can be useful for lowering molecular weights in polymerization reactions.

The term "closed cell" refers to a material that has cells, where almost all of the cells are non-interconnecting.

The term "Continuous Stirred-Tank Reactor," and "Continuously-Stirred Tank Reactor" and "CSTR," refers to a tank which has a rotor which stirs reagents within the tank to ensure proper mixing; a CSTR can be used for a variety of reactions and processes.

The term "copolymer" refers to a mixed polymer, and is the product of polymerization of two or more substances. A copolymer molecule can be a random copolymer molecule, a block copolymer molecule (e.g., di-block, tri-block, multi-block, taper-block), a graft copolymer molecule or a comb copolymer molecule.

The term "cross-link" refers to covalent bonds between adjacent polymer chains that lock the chains in place.

The term "cross-linking agent" refers to a substance that promotes or regulates intermolecular covalent bonding between polymer chains, linking them together to create a more rigid structure.

The term "density" refers to bulk density and is the weight per unit volume of a material, including voids, if any.

The term "detector" refers to an apparatus or device, especially a mechanical, electrical, or chemical device that identifies and records or registers a stimulus, such as an environmental change in pressure or temperature, a change in physical and/or chemical characteristics, as well as an electric signal, or radiation from a radioactive material.

The term "effluent" refers to liquid discharged during size exclusion chromatography.

The term "elastomer" refers to an amorphous, cross-linked polymer which will stretch rapidly under tension; a macromolecular material that at room temperature returns rapidly to approximately its initial dimensions and shape after deformation by stress and release of the stress.

The term "elution volume" refers to a volume which removes adsorbed species from a porous bed or chromatographic column by a stream of liquid or gas.

The term "extrusion" refers to a process in which heated or unheated plastic is forced through a shaping orifice such as a die into a formed shape such as in film, sheets, rods, boards, tubing, and the like; a thermoplastic process whereby pellets, granules, or powder are melted and forced through a die under pressure to form one or more shapes.

The term "feed stream" refers to a flow or succession of feed material (liquids and/or solids) that is supplied for various processes, often as starting material.

The term "filler" refers to a relatively inert material added to a plastic to modify its strength, permanence, working properties, or other qualities, or to lower costs.

The term "film" refers to a thin sheet or strip of flexible material, usually having a thickness not greater than 0.30 mm. A film can be made from one or more layers, and one or more materials.

The term "foam" refers to a substance formed by trapping many gas and/or air bubbles therein during manufacture.

The term "free radical polymerization" is a type of polymerization in which the propagation head of a polymer chain consists of an atom or diatomic or polyatomic molecules which possesses one unpaired electron. Reactions involving free radicals are usually divided into three categories: initiation, propagation, and termination. Initiation reactions are those which result in a net increase in the number of free radicals. They may involve the formation of free radicals from stable species or they may involve reactions of free radicals with stable species to form more free radicals. Propagation reactions are those reactions involving free radicals in which the total number of free radicals remains the same. Termination reactions are those reactions resulting in a net decrease in the number of free radicals. Typically two free radicals combine to form a more stable species.

The term "graft copolymer" refers to a copolymer in which polymeric side chains have been attached to the main chain of a polymer of a different structure.

The term "homopolymer" refers to a polymer resulting from polymerization involving a single monomer.

The term "initiator" refers to a substance or molecule, other than reactant, that initiates a chain reaction, such as in polymerization.

The term "injection molding" refers to the process of forming a material by forcing it in a fluid state and under pressure into the cavity of a mold.

The term "linear polymer" refers to a polymer having molecules arranged in a chain-like fashion with few branches or bridges between the chains. Linear polymers are formed by conventional polymerization such as by thermal initiation with or without monofunctional initiators, and without the use of cross-linking agents, chain transfer agents, or multifunctional initiators.

The term "light scattering" refers to the dispersal of a beam of light or radiation into a range of directions as a result of physical interactions.

The term "M" or "molecular weight" refers to the real molecular weight (M) which is the sum of the atomic weights of all the atoms in a molecule.

The term "MFI" and "melt flow index" refers to the number of grams of polymer that can be pushed out of a capillary die of standard dimensions, and is expressed in grams/10 minutes.

The term "molecular weight distribution" or "MWD" refers to the frequency of occurrence of the different molecular weight chains in a homologous polymeric system.

The term "molecule" refers to the smallest particle of a pure chemical substance that still retains its chemical composition and properties. A molecule is made of two or more atoms joined by shared pairs of electrons in a chemical bond. It may consist of atoms of the same chemical element, or of different elements.

The term "monomer" typically refers to a small molecule of low molecular weight that may become chemically bonded to other monomers to form a polymer.

The term "MM" or "molecular mass" refers to the mass of the substance divided by amount of substance, and is usually expressed in g/mol or kg/mol units. Molar mass is informally referred to as molecular weight.

The term "Mn" or "number average molecular weight" refers to the molecular weight obtained by counting the number of molecules per unit weight of sample.

The term "multifunctional initiator" in polymer chemistry refers to a chemical compound or molecule, other than reactant, that initiates a chain reaction, and has a plurality of reactive sites. Typically the initiator decomposes to form either radical, anionic, or cationic species that serve as reactive sites for the propagation of chain polymerization.

The term "Mw" refers to the weight-average molecular weight.

The term "Mz" refers to the Z average molecular weight.

The term "node" refers to a point or area on a polymer chain where branches are attached thereto. Typically the node on the polymer chain is a carbon atom to which branches are attached through bonding.

The term "noise" refers to random fluxuations of electronic signals appearing in information that is registered, indicated, or preserved mechanically or electrically.

The term "parts per million" or "ppm" is a measure of concentration that is used where low levels of concentration are significant. The ppm value is equivalent to the absolute fractional amount multiplied by one million (106).

The term "PDI" refers to the Polydispersity Index, which is equivalent to the Molecular Weight Distribution Mw/Mn, where Mw is weight average molecular weight and Mn is number average molecular weight, as determined by gel permeation chromatography with refractive index detection.

The term "peroxide" refers to a specific functional group or a molecule containing the functional group ROOR'. Organic peroxides tend to decompose easily to free radicals of the form: RO. This makes them useful as catalysts for some types of polymerization.

The term "polydispersity" refers to nonhomogeneity in molecular weight; in other words, there is some molecular weight distribution throughout the body of the polymer.

The term "polymer" is a generic term used to describe a substance made of molecules that have one or more types of repeating monomeric units connected by chemical bonds. A polymer has chains of varying lengths which occur because polymer chains terminate during polymerization after random intervals of chain lengthening (propagation).

The term "polymer backbone" refers to the main chain of the polymer and has one or more types of repeating subunits. One or more side chains can be attached to the polymer backbone and can have a multitude of structures.

The term "polymerization" refers to a process of reacting monomer molecules together in a chemical reaction to form linear chains or a three-dimensional network of polymer chains.

The term "polystyrene" refers to a synthetic polymer prepared by polymerization (e.g., a simple one ring aromatic group with a vinyl group attached).

The term "random" or "randomly" when used in conjunction with branching or branched refers to the formation of branched polymers that are formed without a specific pattern or main or side chain length. The formation of randomly branched polymers is unsystematic.

The term "reactant" refers to substances that exist at the start of a chemical reaction. During the course of a reaction, the reactants form one or more products.

The term "reactive site" refers to a propagating site on the initiator which is unstable and highly reactive, at which a reaction can occur; a reactive site remains at the end of the chain until it is quenched.

The term "record" in reference to measurement values or test data refers to the act of registering, indicating, or preserving the values or data mechanically or electrically. For example, the values and data can be recorded by storing such in a computer or data file, displaying the data such as on a monitor, and/or by printing media or in writing.

The term "reference" refers to a substance that can be used for comparison purposes between a known and unknown substance, such as to determine whether a substance is linear or has branched molecules.

The term "refractive index" refers to the factor by which electromagnetic radiation is slowed down (relative to vacuum) when it travels inside a material.

The term "resin" refers to any class of solid or semisolid organic products of natural or synthetic origin with no definite melting point, generally of high molecular weight. Most resins are polymers.

The term "sample" refers to a part or portion of a substance or product intended to be representative of the whole.

The term "storage modulus" or "G'" refers to the component of applied normal stress which is in phase with the normal strain, divided by the strain.

The term "tetrafunctional initiator" refers to a substance or molecule, other than a reactant, that initiates a chain reaction, and has four reactive sites.

The term "thermoplastic" refers to a plastic that can be softened by heating and hardened by cooling, that in the softened state can be shaped by flow into articles by molding or extrusion.

The term "trifunctional initiator" refers to a substance or molecule, other than a reactant, that initiates a chain reaction, and has three reactive sites.

The term "vinyl" refers to an organic molecule which contains a vinyl group (H2C=CHR'), where R is a functional group such as an aromatic or halogen.

The term "viscosity" refers to a measure of the resistance of a fluid to deformation under shear stress. Viscosity describes a fluid's internal resistance to flow and may be thought of as a measure of fluid friction.

The term "weight percent" refers to the percent by weight of the total molecular weight expressed as the real molecular weight (M), which is the sum of the atomic weights of all the atoms in a molecule, also known as relative molecular mass.

Procedure

The inventors have explored the potential for providing branched vinyl polymers such as polystyrene having at least some increased branching by using one or more multifunctional initiators such as tetrafunctional initiators, trifunctional initiators, and bifunctional initiators, and in an embodiment cross-linking agents and/or chain transfer agents. Other additives can also be used if desired. The invention also concerns initiating a vinyl monomer such as styrene in various solvents and in the optional presence of an elastomer such as a polydiene, like polybutadiene, with a multifunctional initiator (e.g. bi-, tri- or tetrafunctional) and to use the multifunctional initiator to obtain branched structures. A mathematical model has also been discovered that helps define the proportions of chain transfer agent and cross-linking agent for a given melt flow index, molecular weight, and zero shear viscosity.

In theory, tetrafunctional materials can be schematically represented by the shape of a cross. If at the end of each arm of the cross, the potential for initiation or chain transfer exists, it is possible to envision polystyrene molecules that will have higher molecular weight than by using no initiators or bifunctional initiators only. Similarly to tetrafunctional initiators, trifunctional initiators simply have three "arms" or starting points instead of the four found in tetrafunctional initiators. Bifunctional initiators simply have two "arms" or starting points instead of the four found in tetrafunctional initiators.

By using a multifunctional initiator during polymerization, molecules with a variety of types of branching can be produced. For example, with a multifunctional initiator such as a tetrafunctional initiator like that shown below:

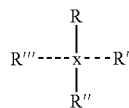

where x is the node (the initiator itself), and R-R''' are the reactive sites, a variety of types of branches can be formed during polymerization. For example, a polymer can be produced with branches A and B as shown below:

A molecule with branches A, B, and C is shown below, and the disclosed GPC method will show 1 branch/molecule.

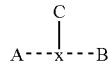

Similarly, a molecule with branches A, B, C and D as shown below can be referred to as a "star" and the disclosed GPC method will show 2 branches/molecule.

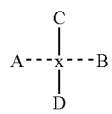

Also, since a branched molecule can recombine with other branched molecules, more highly branched structures also exist, i.e., chains with more than one branched-point node. For example, a polymer that has 3 branches/molecule would correspond to two nodes with branches "C" and "D" and an additional branch "F" as illustrated below

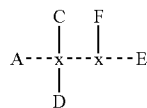

It should also be understood that more than one type of non-linear polymer may be produced during polymerization with a multifunctional initiator, thus affecting the branching data.

Where the branching points emanate from carbon, there can be no more than 4 branches per monomeric unit. The structure of the non-linear molecules can be copolymers; short-chain branched polymers; long-chained branched polymers; hyper-branched polymers; a cross-linked polymer; a cyclic polymer; a star form where the monomer units have 3 or 4 branching points, a comb-type form where the monomer units have 3 branching points, or a dendritic structure where the branches themselves have branched units attached to them.

Depending on the type of monomers and polymers which are used, initiators that have even more reactive sites may possibly be used. Where the branching points emanate from atoms other than carbon, more or less branching points are possible. Also at some at some branching nodes, the polymers will fail to initiate and form branches.

In a non-limiting embodiment of this invention, the vinyl monomers of this invention include styrene, methyl methacrylate, butyl acrylate, butyl methacrylate, methyl acrylate, octyl methacrylate, octyl acrylate, ethyl acrylate, 2-ethylhexyl acrylate, or any combination thereof.

In a non-limiting embodiment of this invention, the polymerization processes also include the addition of comonomers that comprise 40 weight % or less of the total weight of the polymer such as polyvinyl monomers, conjugated dienes, α,β-ethylenically unsaturated carboxylic acids, $C_1$ to $C_8$ esters, ethylenically unsaturated amides, vinylidene chloride, vinylidene bromide, vinyl esters, maleimides, or any combination thereof, and other comonomers that are well-known in the art.

In a further non-limiting embodiment of this invention, the monomers and/or comonomers of this invention also include vinyl chloride, vinyl acetate, isoprene, acrylamides, acrylic acids, and acrylates. Other monomers and/or comonomers known to one skilled in the art can also be used in this invention. In an additional non-limiting embodiment a plurality of monomers and comonomers can be used.

In polymerizations by the step mechanisms as here, equations may be used to predict the point at which crosslinking or gelation occurs. In the present case, relatively small levels of tetrafunctional initiators are used to optimize the melt properties resulting from the formation of branched structures. With the tetrafunctional initiator, four linear chains for one branched molecules are formed. At high levels of initiators the amount of linear chains, initiated by the alkyl radicals, will lower the effect brought by the branched chains, initiated by the tetrafunctional radicals. In another non-limiting embodiment, bifunctional and/or trifunctional initiators can be used with or without tetrafunctional initiators to optimize melt properties.

In another non-limiting embodiment, the composition of the invention can further comprise a polydiene-modified monovinyl polymer, and can comprise a rubber (polybutadiene)-modified polystyrene. Non-modified vinyl homopolymers are also within the scope of the invention. In a non-limiting embodiment, the homopolymers are aromatic. Styrene monomer can be polymerized in the presence of from about 2 to about 15 weight percent rubber to produce a polymer having impact resistance superior to that of polystyrene homopolymer. A rubber that can be used in making the subject compositions is polybutadiene. The resultant thermoplastic composition, which can be made with these materials, is high impact polystyrene, or HIPS. The predominant morphology of the polymer made from embodiments of the invention is cell or "salami" with some core-shell structure, meaning that the continuous phase of polystyrene comprises a plurality of dispersed structures in which polystyrene is trapped within rubber particles having a distinct membrane and small quantities of polystyrene are occluded inside single cell polybutadiene shells grafted to the polymer.

Styrene polymerization processes are well known. The compositions of the invention can be made by batch polymerization in the presence of from about 2 to 15, and in some embodiments can be from about 4 to about 12, weight percent polybutadiene using multifunctional initiators at concentrations of from 50 ppm to 1200 ppm, and using a solvent. In another non-limiting embodiment of the invention the concentration of multifunctional initiator may range from 100 ppm to 950 ppm, and in a further non-limiting embodiment from 50 ppm to 600 ppm. Other quantities of the multifunctional initiators can be used as long as they are effective in causing the desired branching, molecular weights, melt flow indices, and other such desired parameters.

In one non-limiting embodiment of the invention, the multifunctional initiator is a trifunctional or tetrafunctional peroxide and is selected from the group consisting of tri- or tetrakis t-alkylperoxycarbonates, tri- or tetrakis-(t-butylperoxy-carbonyloxy) methane, tri- or tetrakis-(t-butylperoxy-carbonyloxy) butane, tri- or tetrakis (t-amylperoxycarbonyloxy) butane, tri- or tetrakis (t-$C_{4-6}$ alkyl monoperoxycarbonates) and tri or tetrakis (polyether peroxycarbonate), or mixtures thereof. In one non-limiting embodiment of the invention, the tetrafunctional initiator has four t-alkyl terminal groups, where the t-alkyl groups are t-butyl and the initiator has a poly(alkyl ethoxy) ether central moiety with 1 to 4 (alkyl ethoxy) units. This molecule is designated herein as LUPEROX® JWEB 50 and is available from Total Petrochemicals, USA. Another commercial product suitable as a multifunctional initiator is 2,2 bis(4,4-di-(tert-butyl-peroxy-cyclohexyl)propane) from Akzo Nobel Chemicals Inc., 3000 South Riverside Plaza Chicago, Ill., 60606. Another commercial product is 3,3',4,4' tetra (t-butyl-peroxy-carboxy) benzophenone from NOF Corporation Yebisu Garden Place Tower, 20-3 Ebisu 4-chome, Shibuya-ku, Tokyo 150-6019.

In another non-limiting embodiment, one or more additional types of multifunctional initiators can be used including but not limited to 2,5-dimethyl-2-t-butylperoxy-5-hydroperoxyhexane; HOO—C(CH$_3$)(C$_2$H$_5$)—OO—C(CH$_3$)(C$_2$H$_5$)—OOH; t-amyl peroxy-2-ethylhexyl carbonate (TAEC); t-butylperoxy isopropyl carbonate (TBIC); t-butyl perbenzoate; 1,1-di-(t-butylperoxy)-3,3,5-trimethylcyclohexane; 1,1-di-(t-amylperoxy)cyclohexane; ethyl-3,3-di(t-butylperoxy)butyrate, or any combination thereof, as well as other multifunctional initiators known to one skilled in the art.

In a further non-limiting embodiment of the invention, a bifunctional initiator (e.g. L531 and L233) can be used to increase the rate of polymerization, but will cause minimal, if any, branching without other additives. Thus, such bifunctional initiators can be used in conjunction with tri- or tetrafunctional initiators and/or cross-linking agents and/or chain transfer agents.

Additionally other multifunctional initiators that are known to one skilled in the art can be used if they are effective in producing non-linear molecules as measured by the methods disclosed herein. In a non-limiting embodiment, the multifunctional initiator is one or more bifunctional, trifunctional, or tetrafunctional initiator. In a further non-limiting embodiment, the multifunctional initiator is a combination of one or more bifunctional, trifunctional, and/or tetrafunctional initiators. The multifunctional initiators can be used at the same or differing times with respect to each other and the addition of the monomer, as well as the addition of other additives.

Suitable optional solvents for the polymerization include, but are not limited to ethylbenzene, xylenes, toluene, hexane, and cyclohexane. Other solvents known to one skilled in the art can also be used.

In one non-limiting embodiment of the invention, the chain transfer agent is preferably a member of the mercaptan family. Particularly useful mercaptans include, but are not limited to, n-octyl mercaptan, t-octyl mercaptan, n-decyl mercaptan, n-dodecyl mercaptan, t-dodecyl mercaptan, tridecyl mercaptan, tetradecyl mercaptan, n-hexadecyl mercaptan, t-nonyl mercaptan, ethyl mercaptan, isopropyl mercaptan, t butyl mercaptan, cyclohexyl mercaptan, benzyl mercaptan or mixtures thereof. One or more of such chain transfer agents can be utilized in this invention. Other chain transfer agents known to one skilled in the art can also be used. In advantageous embodiments, the concentration of the chain transfer agent may range from about 0 ppm to about 800 ppm by weight based on the total amount of vinyl monomers; in one embodiment of the invention, up to about 800 ppm, and in another embodiment of the invention from about 25 to about 800 ppm. In another non-limiting embodiment of the invention, the concentration of the chain transfer agent may range from about 100 ppm to about 400 ppm. Again, if the concentration of chain transfer agent is too low, the storage modulus, G', is not improved and gelation may occurs due to the presence of (divinylbenzene) DVB. However, if the concentration is too high the molecular weight Mw of the resulting polymer is too low to use to manufacture certain products.

In one non-limiting embodiment the monomer is styrene and the cross-linking agent is divinylbenzene (DVB). Other suitable cross-linking agents include, but are not limited to, 1,9-decadiene; 1,7-octadiene; 2,4,6-triallyloxy-1,3,5-triazine; pentaerythritol triacrylate (PETA); ethylene glycol diacrylate (EGDA); ethylene glycol dimethacrylate; triethylene glycol diacrylate; tetraethylene glycol dimethacrylate; or mixtures thereof. One who is skilled in the art understands that substituted vinylbenzene and substituted divinylbenzene molecules or other tri- or tetrafunctional monomers may also be employed as cross-linking agents. The concentration of the cross-linking agent in the mixture may vary. However in a non-limiting embodiment, the cross-linking agent's concentration may range from about 0 ppm to about 400 ppm, up to 400 ppm in an alternate embodiment, from about 25 to about 400 ppm in yet another embodiment, and in another non-limiting embodiment may range from about 25 ppm to about 250 ppm. If the concentration of the cross-linking agent is too low the molecular weight, Mw, of the resulting polymer may be too low, and if the concentration of the cross-linking agent is too high an undesirable gel may form. One or more of such cross-linking agents can be utilized in this invention. Other cross-linking agents known to one skilled in the art can also be used.

In a non-limiting embodiment, the non-linear polymers in accordance with the present invention can be prepared by feeding monovinyl monomer, typically in the presence of sufficient amounts of an organic liquid reaction solvent, such as ethyl benzene and the others previously set forth, with or without other optional additives, such as mineral oils, chain transfer agents, cross-linking agents and rubber, into two or more stirred tube-type reactors having a plurality of reaction zones. In a non-limiting embodiment, there are 3 to 6 reactors assembled in a series and each have a plurality of reaction zones with independent temperature control. The polymerization mixture is then initially heated up to at least about 90° C. to about 110° C. for at least about one hour to initiate the polymerization and then to at least 130° C. to about 140° C. for at least four hours. The multifunctional initiator is then added to the polymerization mixture at any desired stage of the polymerization process, but is typically added in the first reaction zone of any reactor, and most often the first reactor. Polymerization is usually started at about 100° C. within the first reaction zone of the reactor, then is increased in order to maintain a polymerization rate that is relatively constant. Usually, the final temperature in the third reaction zone of the third to sixth reactor reaches about 150° C. to about 180° C. Heat initiated polymerized polystyrene such as that used as a linear reference is produced as above, but without additives that cause the formation of branches or branching, such as multifunctional initiators, cross-linking agents, and/or chain transfer agents.

In an embodiment, one or more multifunctional initiators can be added during to the reactors together at the same time or separately at different times during polymerization. In a non-limiting embodiment, 6 reactors in series are used to produce the polystyrene of this invention. A cocktail, or combination, of initiators can be used in reactors 1, 2 or 3, or instead different initiators can be added in different reactors. In a non-limiting embodiment, the initiators are added in reactors 1 and 2. In another non-limiting embodiment, initiators can be added in reactors 3 and 4. In a further non-limiting embodiment, the initiators are added in reactors 1, 2, 3, and 4. The initiators can also be added in other combinations using reactors 1 through 4. However, it becomes more difficult to add initiators in reactors 5 and 6 due to high viscosities of the polystyrene.

When 60-75% of the monomer is converted to polymer, the polymerization mixture leaves the reactor and is passed through a heater at a temperature in excess of 200° C. and then subjected to a vacuum. At this point, unreacted monomers and diluents are evaporated and condensed and are recycled as feed to the first reaction zone. The reacted polymer is then dried and devolatilized by conventional means. The polymers can then be granulated and/or further processed. Such processes are well-known in the art and are described, for example, in U.S. Pat. Nos. 5,200,476 and 5,540,813 to Sosa et al. which were previously set forth and fully incorporated herein. Although batch polymerizations are used to describe the invention, the reactions described can be carried out in continuous units, as the one described by Sosa and Nichols in U.S. Pat. No. 4,777,210, fully incorporated by reference herein.

It has also been discovered that the polymerization of a vinyl monomer such as styrene carried out in the presence of divinylbenzene (DVB) and n-dodecyl mercaptan (NDM) to produced branched structures as disclosed in U.S. Pat. No. 6,353,066 (fully incorporated by reference herein) can be improved by using a tetrafunctional initiator in combination with DVB and NDM. Extensive studies have been done to determine the conditions suitable for optimizing the melt rheology, however, it has been surprisingly found that an increase in rate can be produced while obtaining the desired molecular parameters.

It has been discovered that multifunctional initiators can be used together with chain transfer agents and cross-linking agents to manufacture polystyrene and HIPS that is more highly branched. The chain transfer agent and/or cross-linking agent may be added prior to, during, or after the initiator is added to the monomer.

Grafting is also favored by using polybutadiene having a medium or high-cis isomer content. Polybutadiene useful in making the composition of the invention is produced, for example, by known processes by polymerizing butadiene in either a hexane or cyclohexane solvent to a concentration of about 12 weight percent, and flashing off the solvent at a temperature ranging from about 80° to 100° C., to further concentrate the polybutadiene solution to about 24 to 26 weight percent, the approximate consistency of rubber cement. The crumb polybutadiene is then precipitated from the solution using steam, then dried and baled. Commercially available rubbers suitable for producing HIPS are available from several suppliers such as Lanxess 380, 550, and 710 (Lanxess Corporation, Orange, Tex.) and Firestone Diene 35, 55 and 70 (Firestone Polymers, Akron, Ohio).

In making certain compositions of the invention, batch or continuous polymerizations can be conducted in 97:3 to 91:9 styrene to rubber, 85:15 to 80:20 typical styrene solvent mixtures to 60-80% styrene conversion to polystyrene and then flashing off the unreacted monomer and the solvent. In a non-limiting, typical preparation, 3-12% of rubber is dissolved in styrene, then about 10% ethylbenzene is added as 90:10 styrene:ethylbenzene. The ethylbenzene is used as a diluent. Other hydrocarbons can also be used as solvents or diluents. In one non-limiting embodiment, a possible temperature profile to be followed in producing the subject branched polymer compositions is about 110° C. for about 120 minutes, about 130° C. for about 60 minutes, and about 150° C. for about 60 minutes. In another non-limiting embodiment, the present invention may also be utilized in a continuous flow process for producing polystyrene utilizing a pre-inversion reactor in which a solution of styrene, rubber, and the initiator is polymerized to a point below the inversion point and then introduced into a post inversion stirred tank reactor. The viscosity of the solutions in the pre-inversion and in the second stirred tank reactor are closely controlled to produce desirable high impact polystyrene (HIPS).

In another non-limiting embodiment, the polymers of this invention have an elastomeric component of less than about 28%, similar to that described in U.S. Pat. No. 6,822,046 issued to Li, Sosa et al., which is fully incorporated herein by reference. The '046 Li patent describes a method of improving the environmental stress crack resistance as well as other desirable properties of impact-resistant, elastomer-modified monovinyl compounds utilizing a combination of polymerization initiators, including perketals and peroxycarbonates, the entire disclosure of which is hereby fully incorporated by reference.

Further processes for preparing polymers with rubber copolymers can be found in U.S. Pat. No. 6,770,716 to Sosa et al., the entire disclosure of which is fully incorporated herein by reference, and such teachings can be modified to make the polymers of this invention.

In a non-limiting embodiment, the compositions of the invention can be made by batch polymerization in the presence of heat and at least one multifunctional initiator that causes free radical polymerization and the formation of non-linear polymers. During polymerization, linear polymers are also formed. In a non-limiting embodiment, the non-linear polymers comprise 0.1 to 50 weight percent of the total weight of the polymer. In an embodiment, the non-linear portion is comprised of randomly branched molecules with varying polymer chain lengths having varying levels/types of branching in varying locations along the polymer backbone. In another non-limiting embodiment, the non-linear polymers comprise 0.1 to 20 weight percent of the polymer. In a further non-limiting embodiment, the non-linear polymers comprise 3 to 10 weight percent of the polymer.

Also in a further non-limiting embodiment, the produced polymer has both non-linear and linear molecules and a MFI that is 2.4 g/10 min or greater. In another non-limiting embodiment, the MFI of the produced polymer is from 2.5 g/10 min to 8.0 g/10 min.

In an additional non-limiting embodiment, the produced non-linear vinyl polymers have at least 0.03 branches/1000 backbone carbons. In a further non-limiting embodiment, branching is determined at one or more log M values from Log M 4.0 to Log M 6.3.

In a non-limiting embodiment, the produced vinyl polymer is comprised of non-linear vinyl polymers that comprise from 0.1 to 50 weight percent of the polymer and linear polymers that have a molecular weight (Mw) of 350,000 or less. In a further non-limiting embodiment, the non-linear polymers together with the linear polymers collectively have a molecular weight (Mz) of 550,000 or greater.

In a further non-limiting embodiment, the produced non-linear and linear polymers have an Mz/Mw of from 1.7 to 5.7.

In a non-limiting embodiment, the non-linear polymers have from 0.2 to 6.0 branches/molecule as determined by measurements of molecular weight, molecular size, and concentration. In a further non-limiting embodiment, the produced polymer has an average of 0.4 to 7.0 or higher branches/molecule. In a non-limiting embodiment, branching is determined at one or more log M values from Log M 4.0 to Log M 6.3.

In another non-limiting embodiment, the polymer of this invention has an average branches/molecule ($B_n$) of from 0.15 to 1.5.

In a further non-limiting embodiment, the produced polymer has both non-linear and linear molecules that collectively have a polydispersity index (Mw/Mn) of from 2 to 3.5, and in an alternative non-limiting embodiment from 2.4 to 5.0.

In a further non-limiting embodiment, the polymer comprises at least one vinyl monomer, at least one bifunctional peroxide initiator that causes free radical polymerization, and at least one cross-linking agent, where the initiator and cross-linking agent together cause the formation of non-linear vinyl polymers. In a non-limiting embodiment, the bifunctional initiator is L233 and the cross-linking agent is EGDA. In an embodiment 25 ppm to 500 ppm or more of such initiator and cross-linking agent are used.

In other non-limiting embodiments, the produced polymer has an average of 0.03 to 0.25 branches/1000 backbone carbons. In an additional non-limiting embodiment, the produced polymer has from 0.04 to 0.25 branches/molecule for one of more portions of the Log M range of 5.0 to 6.0.

In a non-limiting embodiment, branching of the molecules is measured by the methods disclosed herein. In another non-limiting embodiment, branching of molecules produced by the methods disclosed herein, as well as other methods known to one skilled in the art, can be quantified by other measuring methods known to one skilled in the art, using a linear reference like that disclosed herein and one or more portions of the methods set forth herein.

A feature of the present invention is that the produced resins can be foamed. The preparation of polymer foams is well-known in the art. In a non-limiting embodiment, the produced non-linear polymers are foamed by using a blowing agent comprised of pentane and/or carbon dioxide, as well as pentane and/or fluorocarbon or hydrofluorocarbons (HFC) and a blowing system. Alternatively, the blowing agent can be an admixture of carbon dioxide with other blowing agents, such as lower alcohols, such as $C_1$-$C_6$ alcohols. Optionally, the blowing agent system can also be comprised of a carbon dioxide blowing agent in an admixture with an ether. Of course any other blowing agent known to one skilled in the art for foaming resins can also be used in conjunction with the polymers of this invention.

When the blowing agent is mixed into heat-plastified resin, it causes the resin to expand and form foam. If more than one blowing agent is used, such agents may be admixed and pumped as a combination stream into the resin, or instead supplied as separate streams. It should be noted that adequate mixing of the blowing agents into the resin is required in order to obtain products with desirable foam uniformity. Such mixing may be accomplished by a variety of means including rotary mixers such as extruders which are well-known in the art. The polymeric material of this invention can also be chemically foamed.

In preparing thermoplastic polymer foams in accordance with the branched polymers of the present invention, one method of producing such foams is injecting a blowing agent into a polymer stream within an extruder. From the extruder, the polymer gel is passed into a second extruder or a rotary mixer having a studded rotor. The gel from the extruder is fed into the inlet end of the mixer and discharged from the outlet end, the flow being in a generally axial direction. From the mixer, the gel passes through coolers and from the coolers to a die which extrudes a generally rectangular sheet of various thickness, boards, molded shapes, or the foam can be made into sheets.

In preparing foams of the polymers of this invention, it may also be advantageous to add a nucleating agent to reduce the foam cell size. There are a variety of nucleating agents that are well-known in the art and for example include talc, magnesium oxide, calcium-silicate and calcium stearate. A variety of other additives that are known by one skilled in the art can also be utilized such as, for example, plasticizers or lubricants such as mineral oil; butyl stearate or dioctyl phthalate; fire retardants; stabilizers, including antioxidants; mold release agents, for example, zinc stearate; pigments; and, a variety of extrusion aids that are commonly used in foam preparation.

In an embodiment, the polymers of this invention are styrenic and are particularly well suited for preparing closed-cell foamed articles of relatively low density. For purposes of this invention, the term "low density" is meant to include foam with densities of 16 kg/m$^3$ (1 pound per cubic foot (pcf)) to 80 kg/m$^3$ (5 pcf) and in certain embodiments up to even 400 kg/m$^3$ (25 pcf). In a non-limiting embodiment, the foam densities are from 24 kg/m$^3$ (1.5 pcf to 64 kg/m$^3$ (4 pcf). In a further non-limiting embodiment, the foam members have relatively large cross-sectional areas, for example of at least about 50 cm$^2$ (8 square inches, in$^2$) with a minimum cross-sectional dimension of at least 0.6 cm (0.25 inches) to at least 1.25 cm (0.5 inches). Also in a non-limiting embodiment, the foam has relatively small or fine cell sizes, such as from 80 microns to 400 microns.

The invention will now be described further with respect to actual Examples that are intended simply to further illustrate the invention and not limit it in any way.

Extensive studies have been done to determine the conditions suitable for optimizing the melt rheology of a branched polystyrene system using multi-functional initiators, chain transfer agents, and cross-linking agents, however it has also been surprisingly discovered that an increase in rate can be obtained while producing the desired molecular parameters. The relationship between molecular weight and melt viscosity is explored. Key parameters to optimize, in the case of foams, include $\eta_0$ (viscosity at zero shear rate) and molecular weight. As noted, novelty arises in that the desired properties can be obtained at higher polymerization rates.

FIG. 1 shows that the various additives (NDM, DVB, initiators) influence the rate and molecular weight of polystyrene in different ways. By using a mixture of the three additives, both rate and molecular weight can be optimized to give the desired melt viscosity.

In one non-limiting embodiment of the invention, under certain conditions, the use of a difunctional/bifunctional initiator (e.g. LUPERSOL 531 (1,1-di-(t-amylperoxy)cyclohexane) and LUPERSOL 233 (ethyl 3,3 di-tert-butyl-peroxy butyrate) can increase the rate by sevenfold, the addition of DVB increases both rate and Mw, whereas the addition of NDM increases rate and decreases Mw. The use of a multi-functional initiator such as JWEB 50 seems to have a moderate effect on the molecular weight compared to other initiator combinations.

Branched structures have been prepared by using low levels of cross-linking agents such as DVB, tetrafunctional initiators, and chain transfer agents. In this investigation, both DVB and a tetrafunctional initiator (JWEB 50) have been evaluated in terms of the potential to synthesize branched structures. The steps leading to a model to optimize the zero shear viscosity, $\eta_o$, are discussed.

Batch Experiments with DVB and NDM

The first set of experiments concerns the synthesis of polystyrene by using the L531 and L233 initiators in the presence of DVB and NDM at the concentrations shown in Table I. The polymerization was carried out thermally for 2 hours at 110° C., 1 hour at 130° C. and 1 hour at 150° C.

TABLE I

| DVB [ppm] | NDM [ppm] | L531 [ppm] $T_{1/2}$ (1 h) 112° C. | L233 [ppm] $T_{1/2}$ (1 h) 134° C. |
|---|---|---|---|
| 0 | 0 | 350 | 65 |
| 100 | 0 | | |
| 150 | 0 | | |
| 200 | 0 | | |
| 250 | 0 | | |
| 0 | 200 | | |
| 0 | 400 | | |
| 0 | 600 | | |
| 0 | 800 | | |
| 100 | 200 | | |
| 100 | 400 | | |
| 100 | 600 | | |
| 100 | 800 | | |
| 250 | 200 | | |
| 250 | 400 | | |
| 250 | 600 | | |
| 250 | 800 | | |

Batch Experiments with JWEB-50

The second set of experiments concerns the synthesis of polystyrene by using a tetrafunctional initiator (JWEB-50) at the concentration shown in Table II using the same temperature profile described previously.

TABLE II

| JWEB-50 [ppm] $T_{1/2}$ (1 h) 118° C. |
|---|
| 200 |
| 400 |
| 600 |

Analytical Testing

The samples were submitted to gel permeation chromatography (GPC) for molecular weight determination, and to dynamic mechanical analysis (DMA) by using the following protocol:

Frequency sweep from 500 to 0.1 rad/s at 230° C., 170° C., 140° C.

Frequency sweep from 500 to 0.01 rad/s at 110° C.

Mz as a Function of Mw: Batch and Plant Samples

Figure 2:
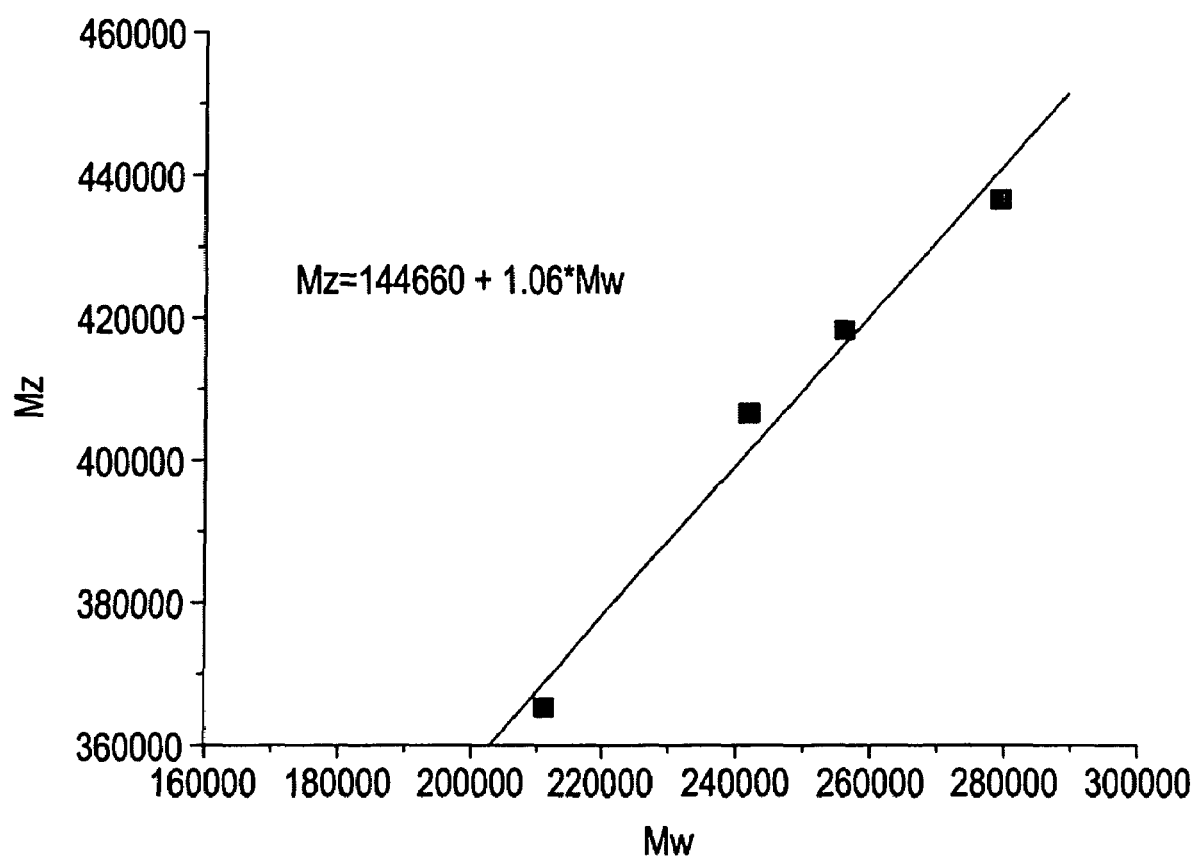
FIG. 2 is a graph of Mz v. Mw for linear polystyrene chains.
Figure 3:
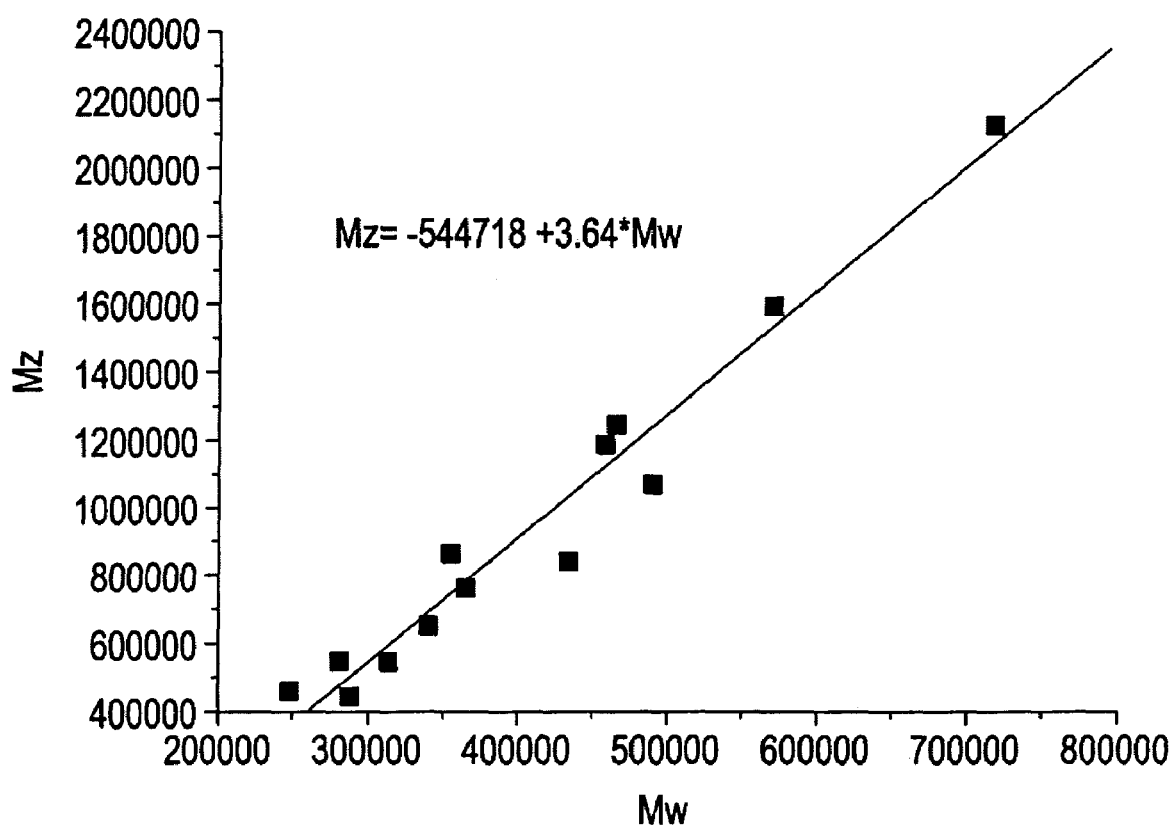
FIG. 3 is a graph of Mz v. Mw for branched polystyrene chains.

FIGS. 2 and 3 display Mz as a function of Mw for linear and branched polystyrene. Note that the slope for linear chain (FIG. 2) is equal to 1.06 and the slope for branched chain (FIG. 3) is equal to 3.64. In other words, the Mz for branched polymer is three to four times higher than for linear chains.

Figure 4:
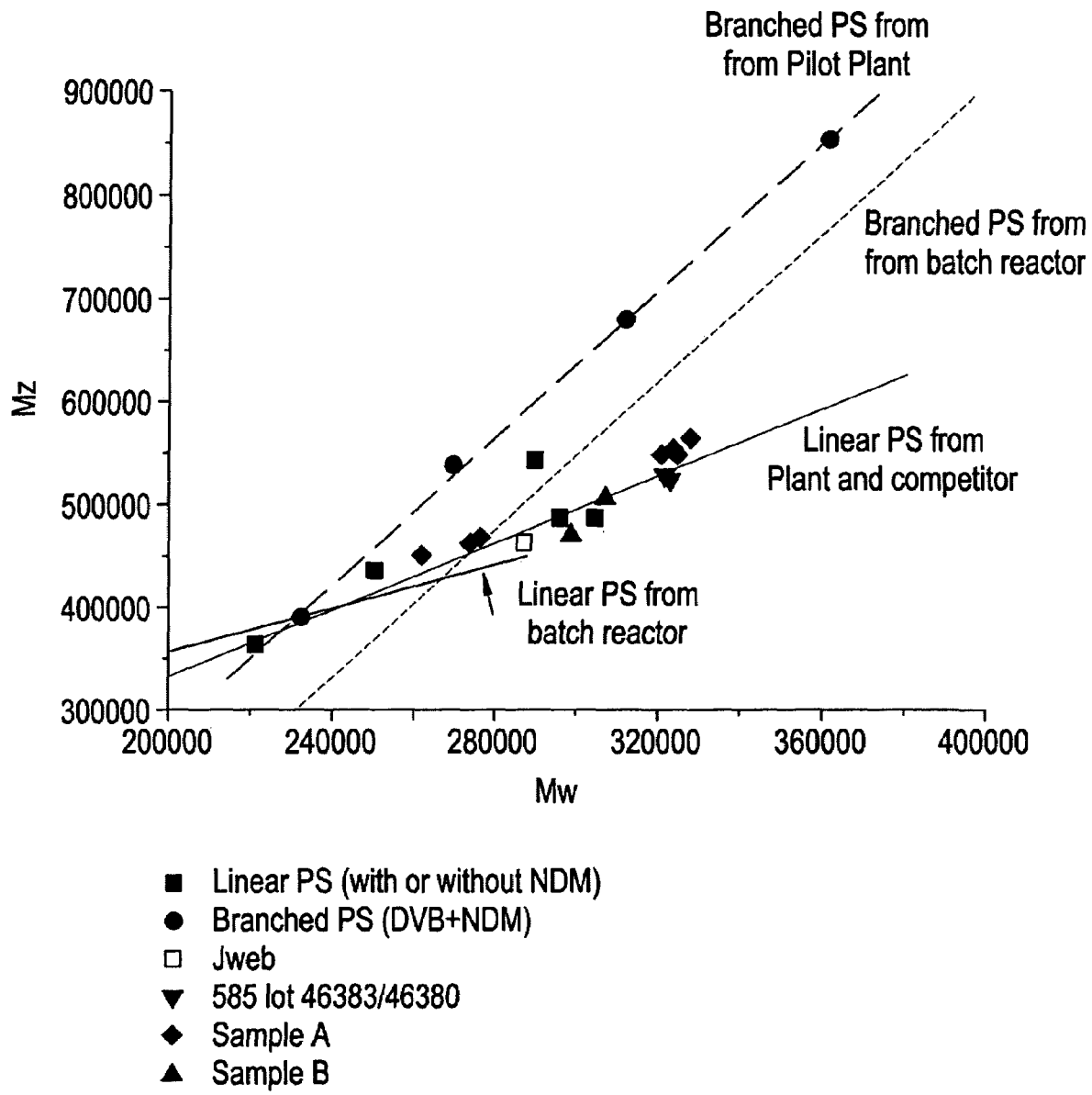
FIG. 4 is a graph of Mz v. Mw for pilot plant, plant and other materials, as well as from batch reactor samples.

FIG. 4 displays Mz as a function of Mw for laboratory and pilot plant samples. As seen here, the linear-PS samples from batch reactor experiments superpose well with pilot plant samples. On the other hand, branched-PS samples made from batch reactor experiments follow the same trend as for pilot plant materials, but are shifted to higher Mw.

Correlation Between $\eta_0$ and Mw

The zero shear viscosity $\eta_0$ was calculated from dynamic rheological measurement at 170° C. as follows:

$$\eta_0 = \lim_{\omega \to 0} \frac{G''(\omega)}{\Omega} \quad \text{Formula (1)}$$

Figure 5:
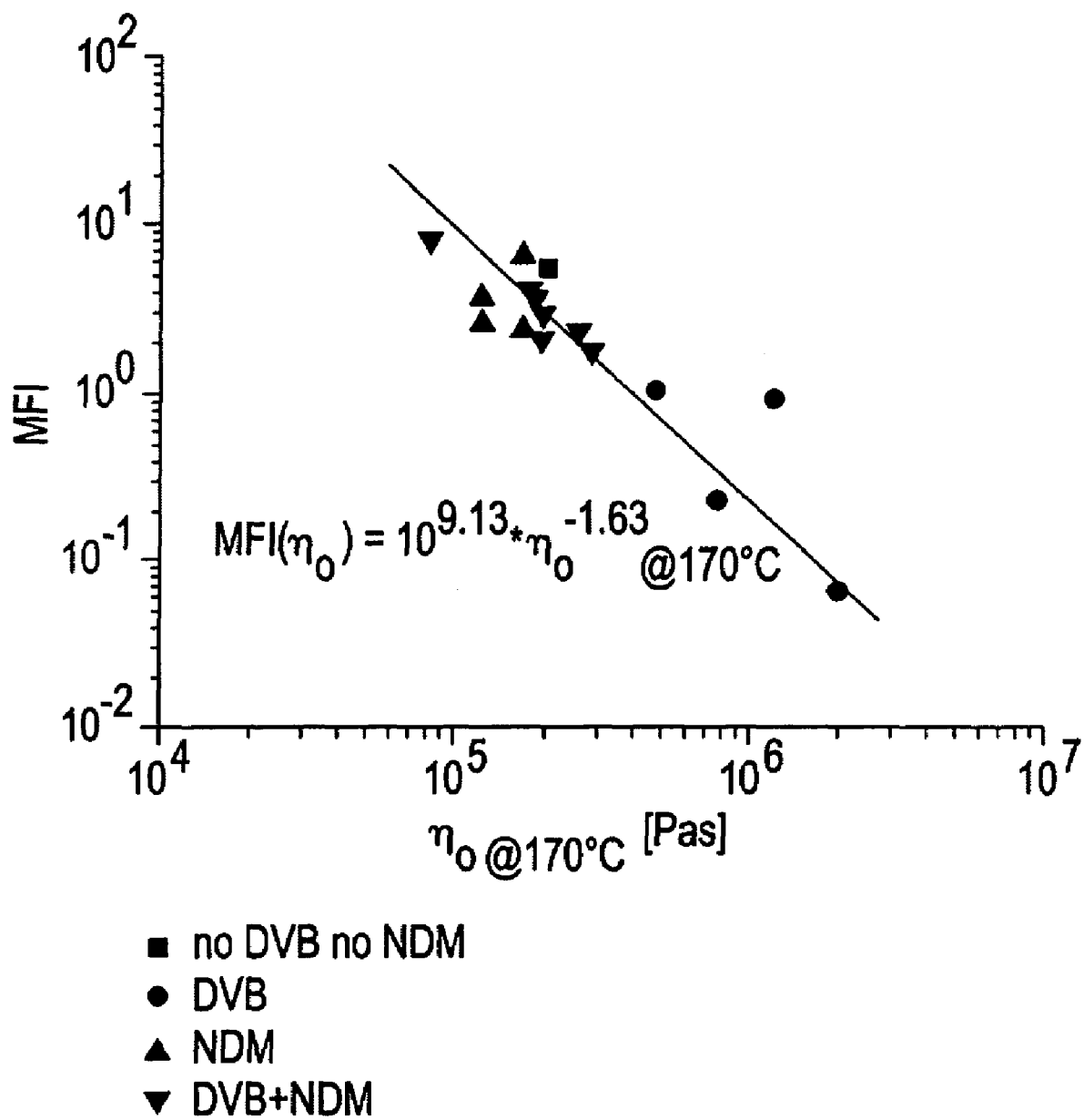
FIG. 5 is a logarithmic graph of melt flow index (MFI) as a function of zero shear viscosity ($\eta_o$) as measured at 170° C.
Figure 6:
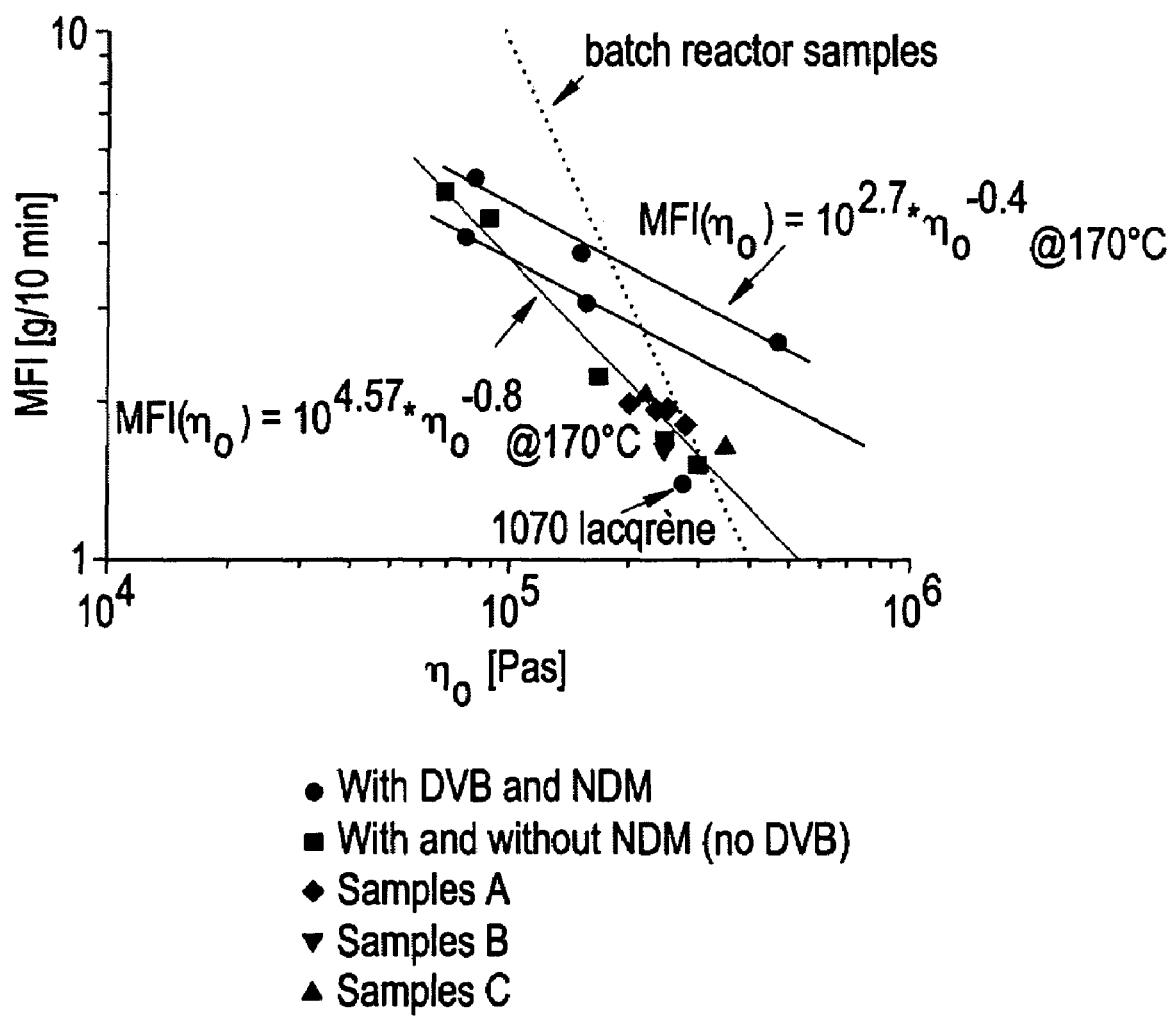
FIG. 6 is another logarithmic graph of MFI as a function of $\eta_o$ as measured at 170° C. for samples from various sources prepared in the presence of DVB and NDM.

For branched polystyrene the melt flow index (MFI) decreases as a power law of $\eta_0$ with an exponent equal to −1.63 (FIG. 5). By comparison with pilot plant materials the relationship determined for batch reactor samples does not apply to pilot plant samples (FIG. 6).

$$MFI = 10^{9.13} \cdot \eta_0^{-163} @_{170° C.} \quad \text{Formula (2)}$$

Correlation Between $\eta_0$ and Mw

Figure 7:
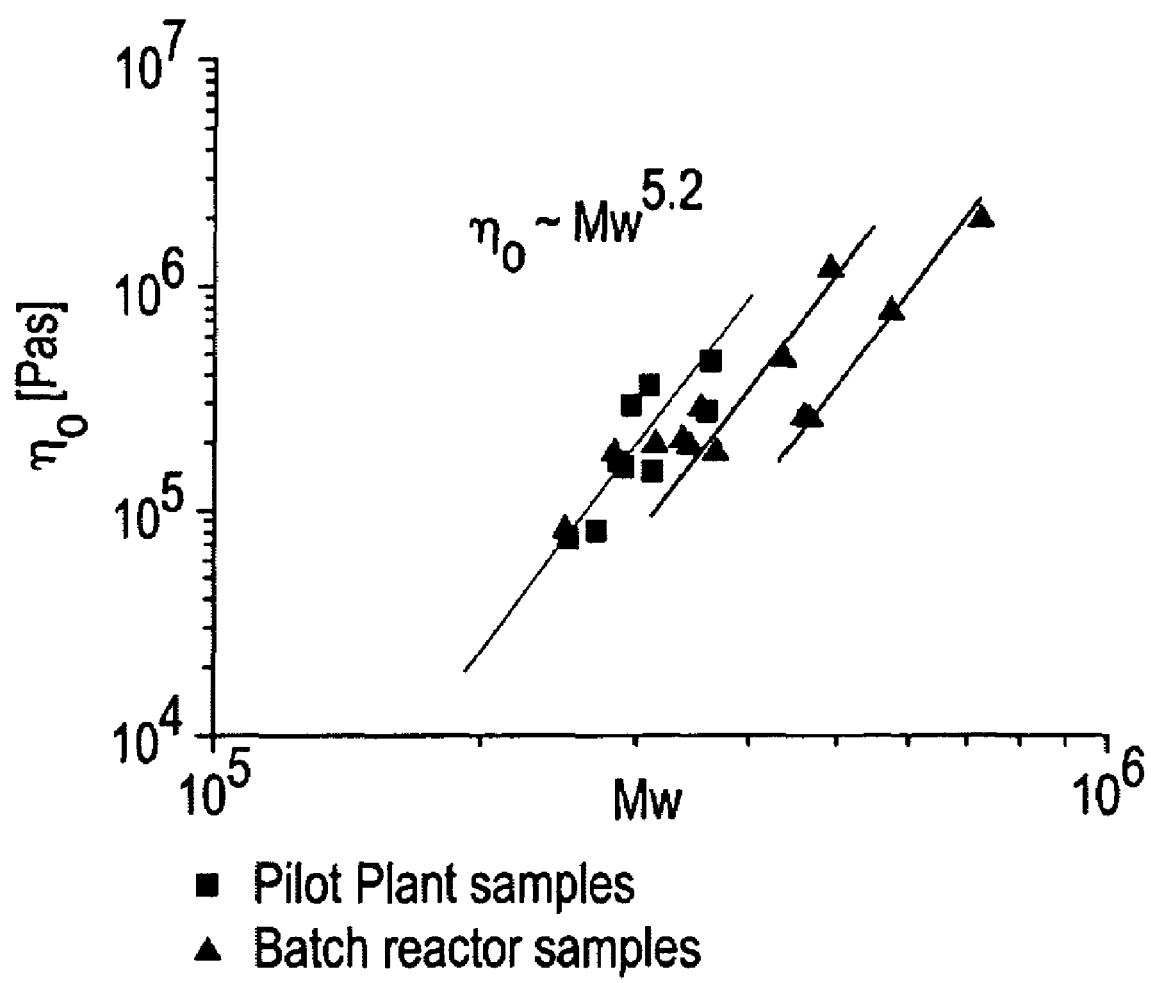
FIG. 7 is a logarithmic chart of a correlation between $\eta_o$ and Mw for samples from two sources.

Viscosity at zero shear rate $\eta_0$ increases as a power law of Mw with an exponent of 3.4 for linear chain and 5.2 for branched chains. The same relationship was found on batch reactor samples. For some reason it is probably related to the experimental error the data are shifted to higher Mw (FIG. 7).

Mathematical Model for Calculating $\eta_0$ as a Function of DVB and NDM

Figure 8:
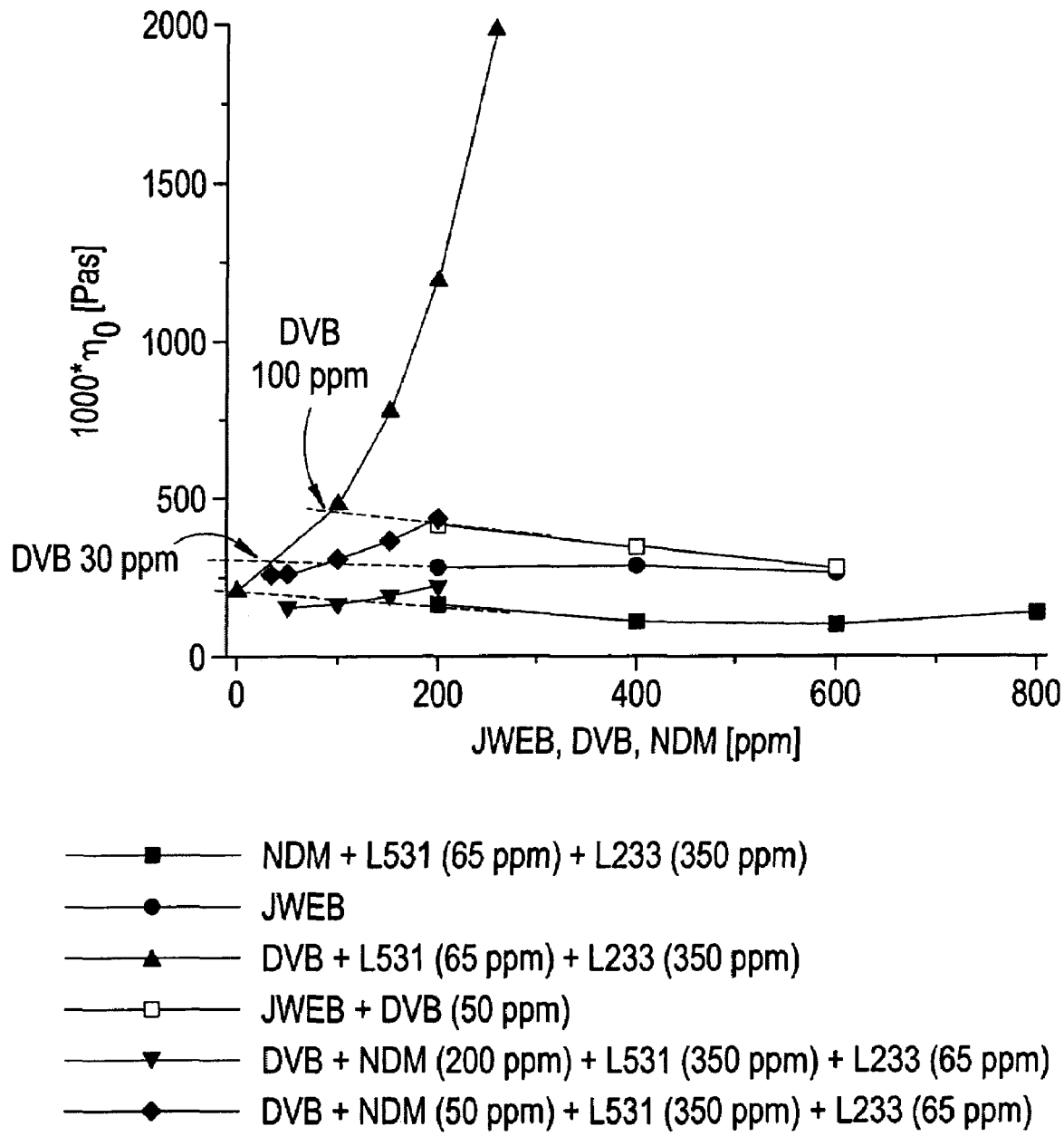
FIG. 8 is a graph of zero shear viscosity $\eta_o$ v. ppm of various components.

FIG. 8 shows the effect on $\eta_0$ by the individual components. Note that the effects are non-linear and the level of additives to produce different structures is not straightforward and extensive experimentation is needed to optimize the level of the additives to obtain branched polystyrene. It is clear that a method to optimize the level of two or three components would be of great importance and value in the synthesis of these materials.

A mathematical model was previously devised to estimate $\eta_0$ of two types of materials as a function of the amount of DVB and NDM. An equation was developed that required only four experimental data points $\{(0, 0); (X_{f0}, 0); (0, Y_{f0}); (x_{f2}, y_{f2})\}$ necessary to have a complete picture of $\eta_0$ as a function of DVB and NDM.

The same work was conducted on the batch reactor samples in order to check the validity of the mathematical model that was proposed. As expected, $\eta_0$ increases as a power law of DVB, but does not decrease as a power law of NDM. Regarding the amount of DVB introduced, it appeared then that the viscosity drops between 0 to 200 ppm of NDM, and then stays constant. The transition to a steady state, in terms of NDM, depends to the amount of DVB introduced and increases with increasing the amount of DVB. The model was optimized based on these new observations.

A model that optimizes the rheological properties (viscosity, melt flow), molecular weight and polydispersity of polystyrene as a function of the relative composition in DVB, NDM, and JWEB was also developed. As noted, the model is supported by laboratory data. The basis of this phenomenological model is as follows:

$$\eta(x, y) = \frac{-\left[\eta(x, y_0) - e^{\left(\frac{-y_0}{t(x)}\right)} \cdot \eta(x, 0) + e^{\left(\frac{-y}{t(x)}\right)} \cdot \right]}{\eta(x, 0) - e^{\left(\frac{-y}{t(x)}\right)} \cdot \eta(x, y_0)}{[-1 + e^{\left(\frac{-y_0}{t(x)}\right)}]} \quad \text{(Formula 3)}$$

where x is the amount of DVB in ppm;
y is the amount of NDM in ppm;
$\eta_0$ is the zero shear viscosity;
$t(x) = 55 + 315 \exp(-x/40)$
$\eta(x,0) = \eta(0,0) + \alpha^* \exp(x/\beta)$
$\eta(x,y_0) = \eta(0,y_0) + \gamma^* \exp(x/\delta)$ In Formula 3, only the four experimental data points (0,0) $(x_0,0)$ $(0,y_0)$ and $(x_0,y_0)$ are needed to have a complete picture of $\eta_0$ as a function of DVB (x) and NDM (y). The parameters $\alpha$, $\beta$, $\gamma$, and $\delta$ are determined empirically from $\eta(x,0)$ and $\eta(x,y_0)$. The function t(x) is determined from small scale reactor runs and can be used even if the model is applied to large scale reactors.

Figure 9:
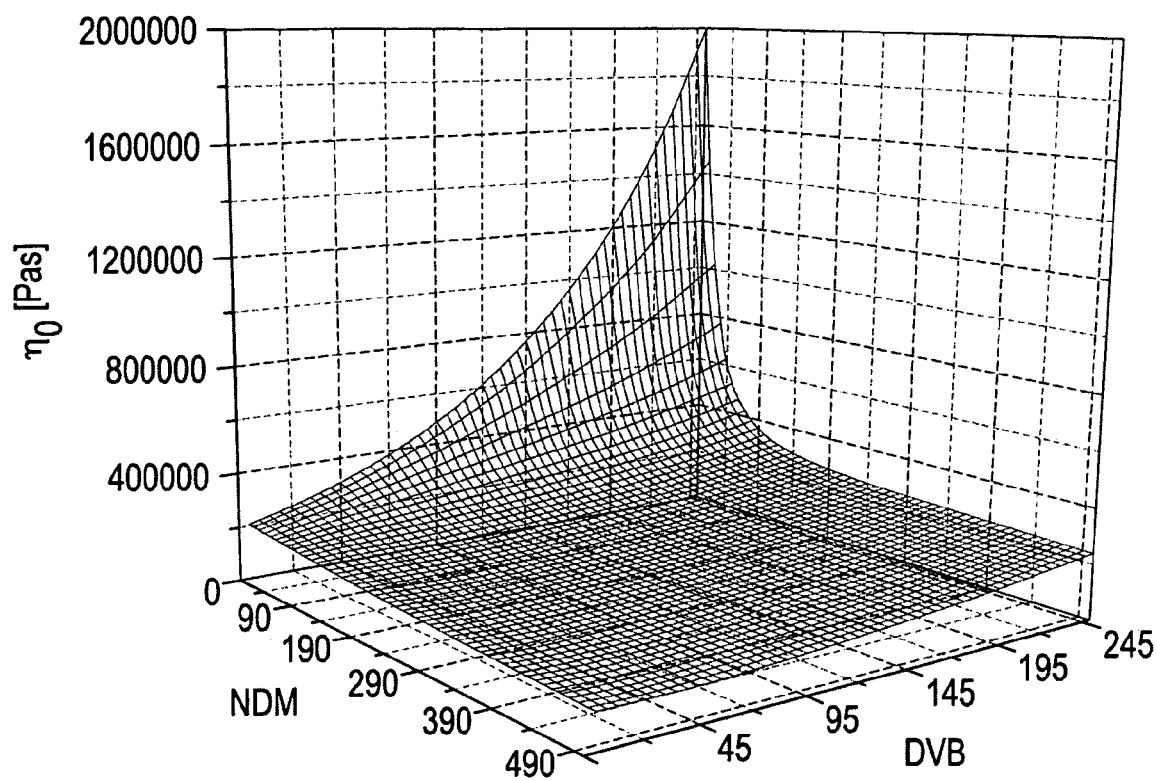
FIG. 9 is a three-dimensional graph of $\eta_o$ as a function of various levels of NDM and DVB using the mathematical model of the invention.

An example of the results expected with the model of this invention is shown in FIG. 9. where a 3-D graph shows the surface generated to relate the level of NDM and DVB with $\eta_0$. By using correlation between $\eta_0$ and melt flow index (MFI), the model can be used to predict the levels of DVB and NDM to produce a resin with a specific melt flow.

Figure 10A:
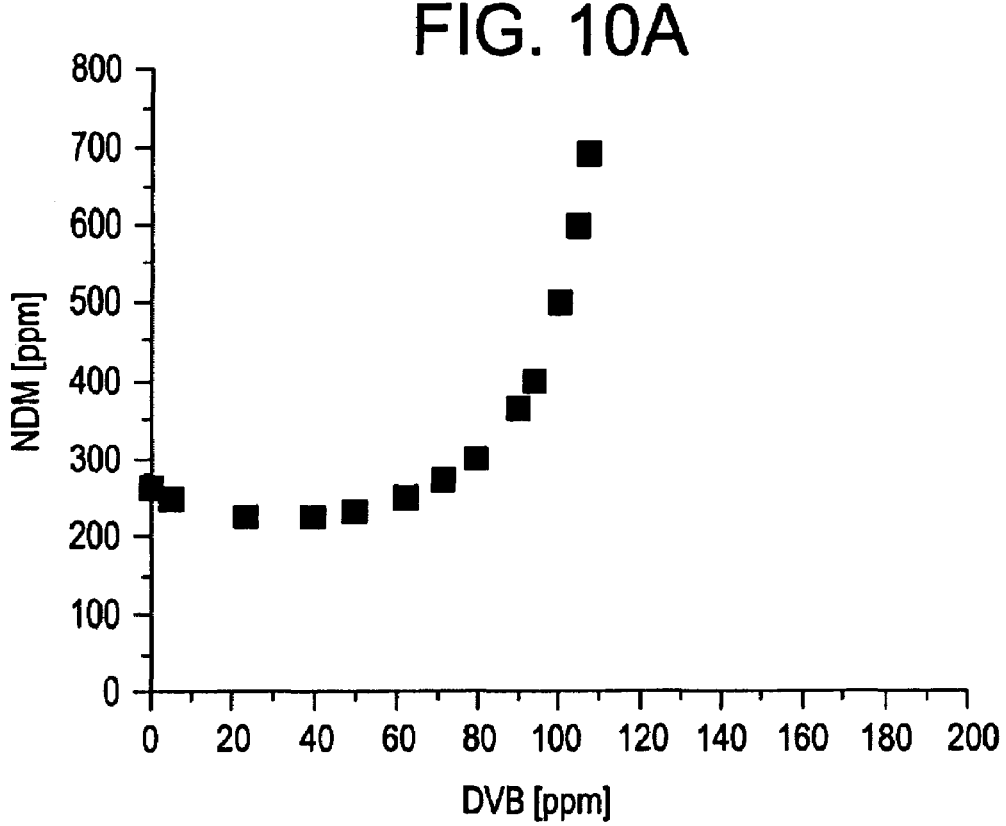
FIG. 10A is a graph of the relative composition in DVB and NDM to obtain a 5 MFI from batch reactor samples using the mathematical model of the invention.
Figure 10B:
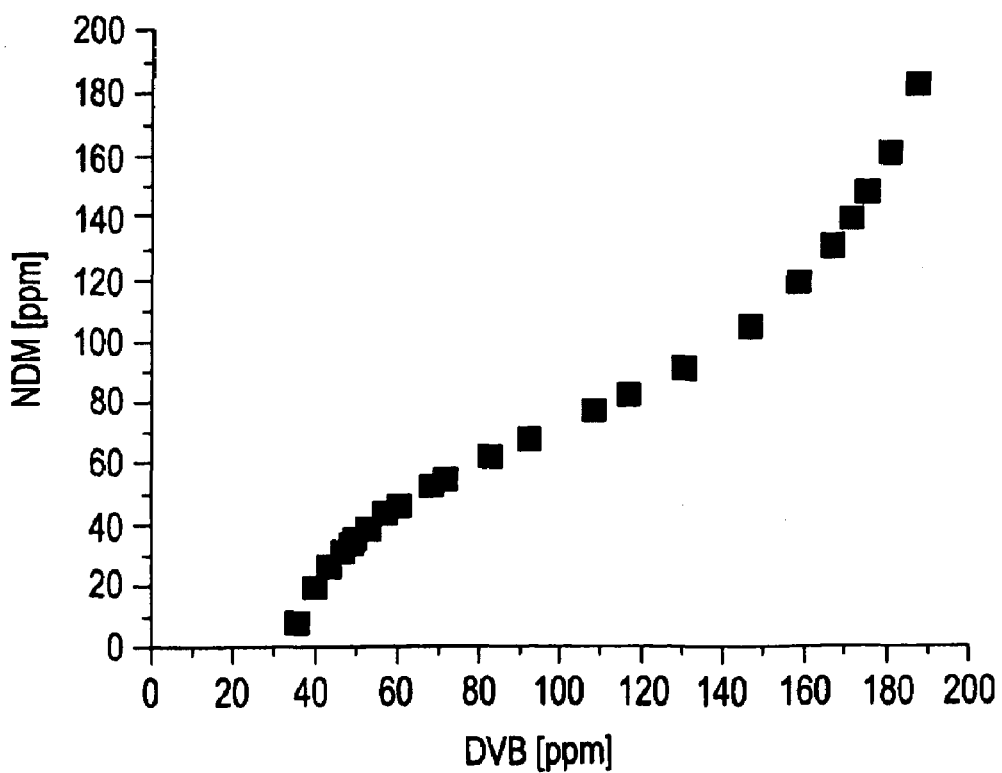
FIG. 10B is a graph of the relative composition in DVB and NDM to obtain a 5 MFI from pilot plant samples using the mathematical model of the invention.

FIGS. 10A and 10B show examples of the profiles that can be obtained using the model. FIG. 10A is an example curve of the relative composition in DVB and NDM to obtain a MFI of 5 from batch reactor samples. FIG. 10B is an example curve of the relative composition in DVB and NDM to obtain a MFI of 5 from pilot plant samples.

The utility of the model has been demonstrated by predicting the levels of NDM and DVB required to produce a 5 MFI material in a continuous pilot plant. As shown in Table III, the relative composition in DVB and NDM as predicted by the model and used by a pilot plant is in the range of +/−2% error. Those skilled in the art can appreciate that the phenomenological method can be applied with additional additives, such as tri-, bi- and tetrafunctional initiators and other multifunctional additives.

TABLE III

Relative Composition of DVB and NDM to
Make a Branched 5 MFI Polystyrene Crystal

| Pilot Plant | Model | Error +/− |
|---|---|---|
| DVB [ppm] 60 | 62 | 1.7% |
| NDM [ppm] 50 | 48 | 2.0% |

The resins of this invention are expected to find use in foam applications where increased density and high storage moduli provide a more stable product. Specific foam applications include, but are not limited to insulation foam boards, cups, plates, food packaging. The styrene-based polymers of the present invention are expected to find use in other injection molded or extrusion molded articles. Thus, the styrene-based polymers of the present invention may be widely and effectively used as materials for injection molding, extrusion molding or sheet molding. It is also expected that the polymer resins of this invention can be used as molding material in the fields of various different products, including, but not limited to household goods, electrical appliances and the like. The polymers of this invention can also be used to make sheets, films, and biaxially oriented films, as well as a variety of other products, some of which have one-time uses. Polymers that have MFI values of from 3.0 g/10 min to 8.0 g/10 min can also be used as injection molding grades foams. The polymers of this invention can also be used in foamed products used in construction, civil engineering, and thermal insulation, and the like.

As a further aspect of the invention, the measurement of branching in polymers such as foam grade polystyrene can be used as a tool to understand the effect of using multifunctional initiators, including but not limited to bifunctional and tetrafunctional initiators, and perhaps trifunctional initiators and other additives, during polymerization. The branching measurement can also be used to more consistently produce polymers with specific characteristics.

Methods for Determining Branching

Although the chemistry of many polymers and polymerization reactions has been extensively studied, it is rarely possible to predict the physical or chemical properties that a particular polymer will possess or the precise composition and architecture that will result from any particular synthesis scheme. Thus, characterization techniques are useful to determine the physical and/or chemical properties of such polymers, and the branching, if any, in the produced polymers.

Methods of measuring branching using a linear reference with low branching was proposed in order to investigate the level of branching in polymers prepared with multifunctional initiators, and the weight percent of the branched molecules in the polymers versus the weight percent of the linear molecules. Certain parameters for potential linear references were investigated. The branching measurements were also used to study the effects of the various multifunctional initiators and variations in the amount of initiator used, as well as other additives. It was determined that the measuring methods were valid and could be used to study the physical and/or chemical characteristics that are especially desirable for particular uses and applications, as well as to develop a method for preparing such branched polymers.

In a non-limiting embodiment, characterization was performed using gel permeation chromatography (GPC) techniques along with measurements of molecular weight, molecular size, and concentration in conjunction with a linear reference having from 0.0 to 0.06 branches/1000 backbone carbons. In a non-limiting embodiment the reference is measured at one or more log M values from log M 4.0 to log M 6.3.

Liquid chromatography is well known in the art for characterizing a polymer sample. Liquid chromatographic techniques employ separation of one or more components of a polymer sample from other components by flow through a chromatographic column, followed by detection of the separated components with a detector such as a flow-through detector. Approaches for liquid chromatography can vary with respect to the basis of separation and with respect to the basis of detection. Gel permeation chromatography (GPC), a well-known form of size exclusion chromatography (SEC), is a frequently-employed chromatographic technique for polymer size determination. In GPC, the polymer sample is separated into components according to the hydrodynamic volume occupied by each component in solution, and does not rely upon chemical differences to effect the separation. Molecules with relatively small hydrodynamic volumes diffuse into the pores of the beads in the column and remain there for longer periods, and thus exit the column after molecules that have a relatively larger hydrodynamic volume. Hence, GPC can characterize one or more separated components of the polymer sample with respect to hydrodynamic radius. While GPC/SEC is primarily used in measuring molecular weight and molecular weight distributions, the size of the polymer molecule also depends on structural factors such as branching.

Figure 11:
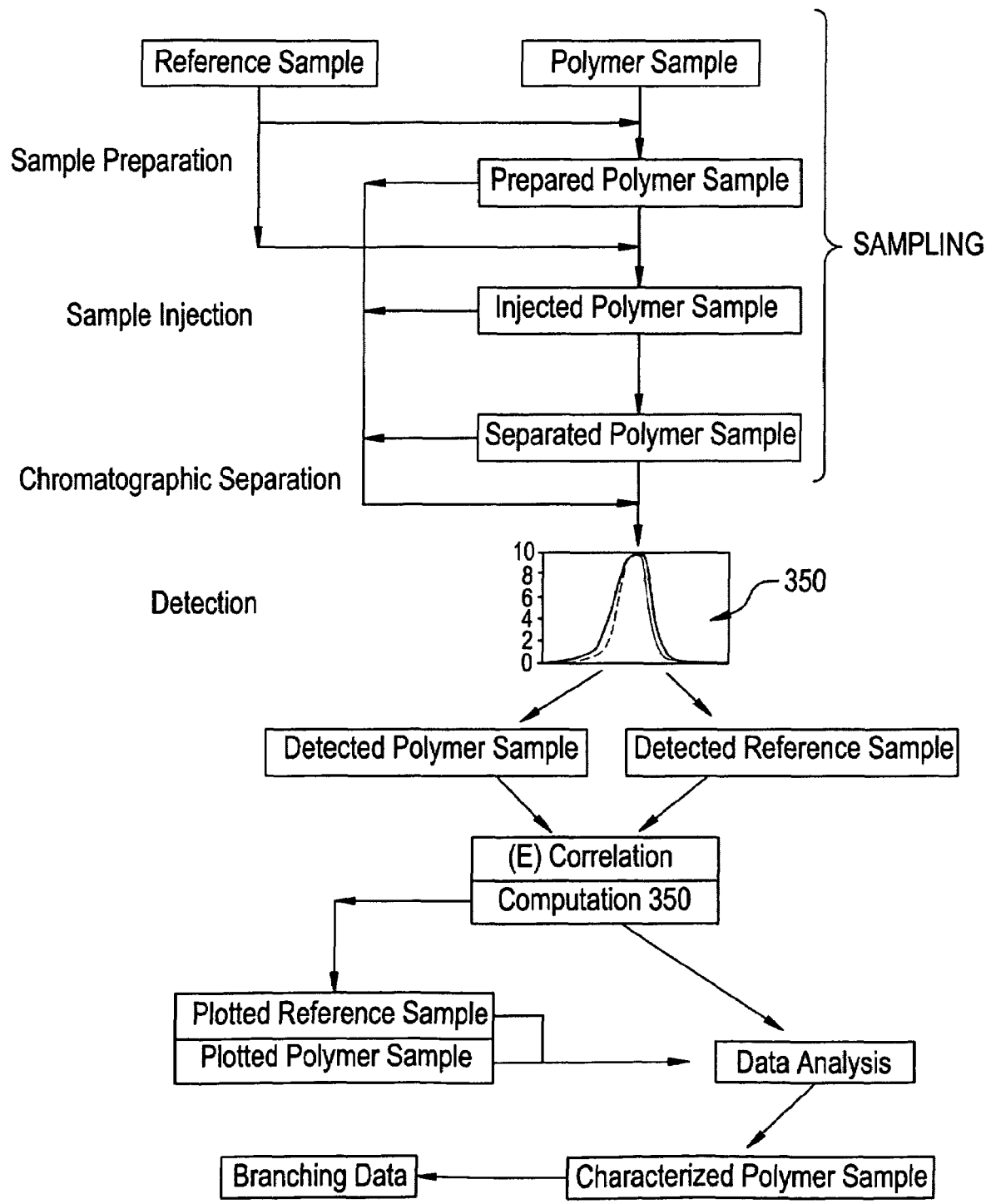
FIG. 11 is flow chart of an overview of the method of characterizing polymers and quantifying branching in polymers.

The flow chart of FIG. 11 shows a non-limiting embodiment of a method for characterizing a polymer sample, and includes: preparing the sample and/or linear or branching reference (reference sample); separately injecting the sample and the reference into a mobile phase of a flow characterization system (e.g., liquid chromatography system); separating the sample and reference chromatographically; detecting a property of the polymer sample and reference (e.g., molecular weight (M), Mz, Mw, Mn, molecular weight distribution (Mw/Mn) and/or Mz/Mw, IV, $R_g$, and the like) or of a component thereof; and correlating the detected property to one or more characterizing properties of interest, including but not limiting to branching data and related parameters (e.g., log M, molecular weight distribution (Mw/Mn), Mz/Mw, log IV, branches/molecule, Bn, branches/1000 backbone carbons, and the like) by way of plots, graphs, and data calculations. In a non-limiting embodiment, a computer 350 is used in conjunction with the detector in the detection step. In a non-limiting embodiment, a computer 350 is also used in conjunction data analysis. A plurality of polymer samples may be characterized as described above in connection with the foregoing steps. Depending upon the polymer used, one or more of the foregoing steps can be used. The analysis can be done in serial or parallel manner, as well as a serial-parallel or hybrid parallel-serial manner. The calculations that are performed using the obtained measurements are discussed in detail below.

According to FIG. 11, various characterization protocols may be employed involving some or all of the foregoing steps. For example, in an embodiment a property of a polymer sample may be detected in a non-flow, static system either with or without sample preparation. In an alternative embodiment, a property of a polymer sample may be detected in a flow characterization system, either with or without sample preparation and either with or without chromatographic separation. In a non-limiting embodiment, the detected property can be any property that provides a scientifically meaningful basis of comparison between two different polymer samples or between a sample and a linear and/or branching reference sample either directly, or after being correlated to a specific characterizing property of interest. The detected property can be a chemical property or a physical property of the polymer sample or component thereof. In a non-limiting embodiment, an electrical, electromagnetic, and/or optical property of the polymer sample or a component thereof can be detected. For example, an amount, frequency, intensity or direction of an incident light that is refracted, scattered, and/or absorbed by the samples or a component thereof may be detected. Other characterizing properties of interest, such as viscosity can likewise be detected.

Figure 12A:
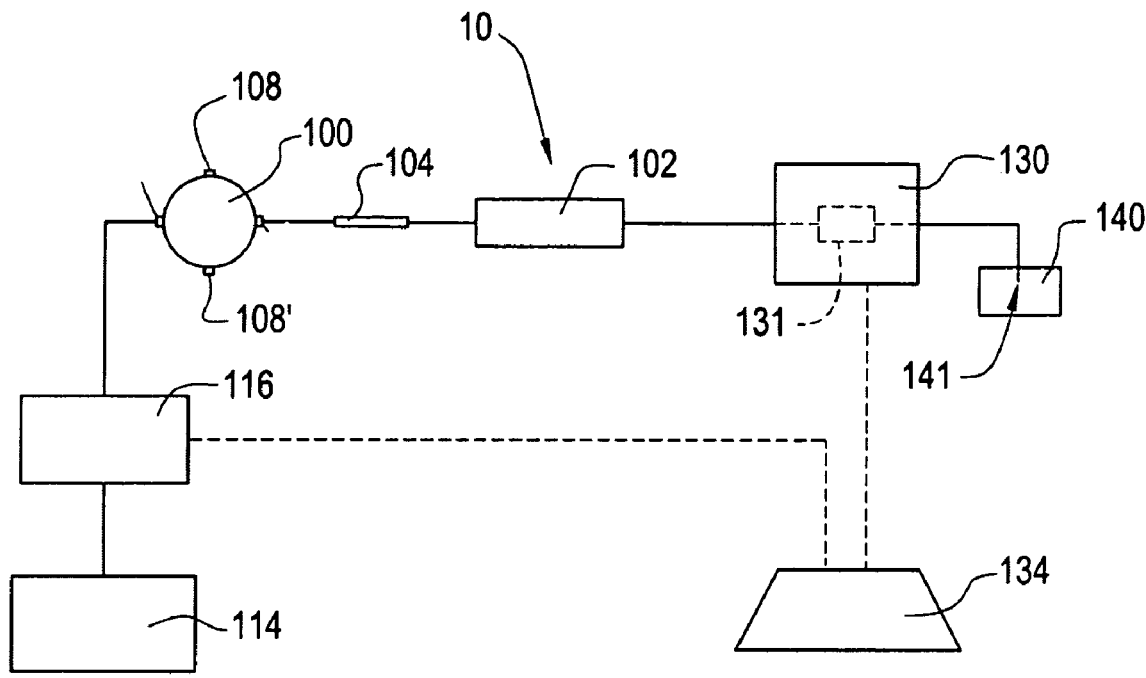
FIG. 12A is a schematic diagram illustrating a liquid chromatography characterization system.
Figure 12B:
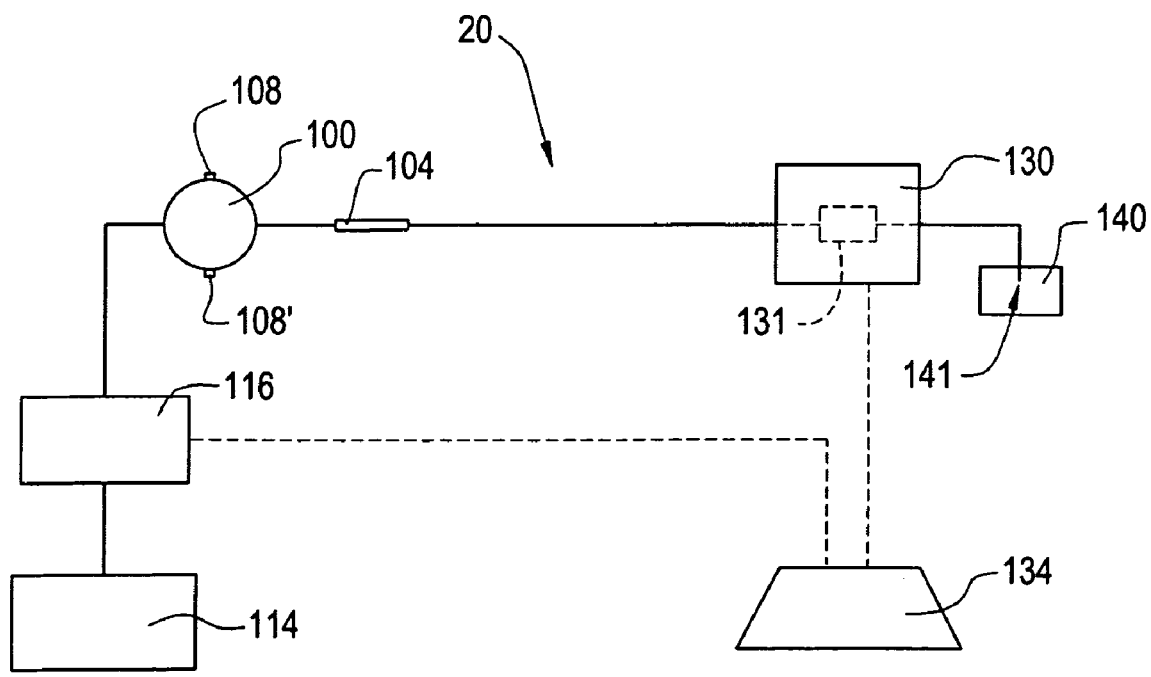
FIG. 12B is schematic diagram illustrating a flow-injection characterization system.

FIG. 12A and FIG. 12B are schematic diagrams illustrating flow characterization systems using liquid chromatography (FIG. 12A) and a flow-injection analysis system (FIG. 12B) that does not use chromatographic separation. Flow-injection analysis systems can, however, include apparatus for non-chromatographic separations (e.g., filtration). Moreover, a polymer sample can be prepared prior to flow-injection analysis (or prior to liquid chromatography), by separating one or more components of the sample.

FIG. 12A shows a non-limiting embodiment of a liquid chromatography system 10 having an injection valve 100 (also known as an injection loop) with an injection port 108, a chromatographic column 102, a flow-through detector 130, and an effluent port 141. An in-line filter 104, additional injection ports 108', and additional chromatographic columns 102 and/or additional flow-through detectors 130 can also be included in the system 10. Additionally in a non-limiting embodiment, automated or manual switches can be used to switch between various portions of the systems having one or more options with respect to filters 104, columns 102, and detectors 130, and the like. In operation, a mobile-phase fluid is pumped from a mobile-phase reservoir 114 by pump 116 through the injection valve 100, chromatographic column 102, and detector 130. The pump 116 can be controlled with a microprocessor 134. The mobile phase can be exhausted from the system via effluent port 141 into a waste collection container 140. A polymer sample or a linear and/or branching reference are individually loaded into injection valve 100 through the injection port 108 and the sample is injected into the mobile phase of the chromatographic system and separated in the chromatographic column 102. One or more properties of the polymer sample or linear and/or branching reference and/or of one or more separated components thereof, are then detected while the sample or reference resides in a detection cavity 131 of the detector 130. A microprocessor such as a computer 134 is typically in electronic communication with the detector to collect, process, analyze and/or store the data obtained therefrom. While only one microprocessor 134 is shown in this figure for pump 116 control and data acquisition, such functions could be effected with separate microprocessors 134.

In a non-limiting embodiment, the polymer characterization system is a liquid chromatography system. In another non-limiting embodiment, the polymer characterization system is a liquid chromatography system comprising a chromatographic column having a stationary phase for size-exclusion chromatography. In an additional non-limiting embodiment, the polymer characterization system is a flow-injection analysis system.

FIG. 12B shows a non-limiting embodiment of a flow-injection analysis system 20 that comprises an injection valve 100 with injection port 108, a flow-through detector 130 and an effluent port 141. The system can also include an in-line filter 104, and can have additional injection ports 108 and/or flow-through detectors 130. In operation, a mobile-phase fluid is pumped from a mobile-phase reservoir 114 by pump 116 through the injection valve 100, filter 104 (if present), and detector 130. If desired, the injected sample or the linear and/or branching reference is individually filtered in filter 104. The pump 116 can be controlled with a microprocessor 134. The mobile phase can be exhausted from the system via effluent port 141 into to a waste collection container 140. A polymer sample or a linear and/or branching reference are individually loaded into the injection valve 100 through the injection port 108, and the loaded sample or reference is injected into the mobile phase of the flow-injection analysis system, and one or more properties of the polymer sample or linear and/or branching reference and/or components thereof, are detected while the sample or reference resides in a detection cavity 131 of the detector 130. A microprocessor such as a computer 134 is typically in electronic communication with the detector to collect, analyze and/or store the data obtained therefrom. While only one microprocessor 134 is shown in FIG. 12B for pump 116 control and data acquisition, such functions could be effected with separate microprocessors 134.

In non-limiting embodiment, a property of a linear and/or branching reference sample or polymer sample or of a component thereof is detected with an optical detector such as a refractive-index detector, an ultraviolet-visual detector, a photodiode array detector, a static-light-scattering detector, a dynamic-light-scattering detector, and/or an evaporative-light-scattering detector (ELSD). Other detectors (e.g., a capillary viscometer detector, photodiode array detector (PDAD), infra-red detector, fluorescence detector, electrochemical detector, conductivity detector, etc.) can likewise be employed in connection with the present invention.

In a non-limiting embodiment, refractive index, viscosity, and light scattering detection (triple detection) are utilized. Depending upon the detector used, the analysis can take from a few hours to a few minutes, and near real time monitoring or process control may also be possible. Additional types of detectors include a static-light-scattering detector (SLS), a dynamic-light-scattering detector (DLS), and an evaporative light-scattering concentration detector (ELSD) can also be used to quantify branching. For example, a SLS detector can be used to measure Mw and the radii of gyration ($R_g$) of a polymer in a dilute solution of known concentration. Dynamic light scattering (DLS) measures the fluctuations in the scattering signal as a function of time and determines the diffusion constant of dissolved polymer chains or other scattering species in solution. The hydrodynamic radius of the chains or particles can then be calculated based on well-established models.

Various detector configurations can be employed in connection with rapid-fire light-scattering (RFLS) techniques. In non-limiting embodiments, the configurations include: (1) a mass detector (e.g., RI detector, ELSD) combined with a SLS detector to determine the weight-average molecular weight, Mw, of the polymer sample—preferably of a polymer solution; (2) a mass detector (e.g., a RI detector, ELSD) combined with a SLS detector; (3) a DLS detector (by itself) to determine the average particle size or a size distribution of a polymer sample, or alternatively, to determine an average molecular weight or a molecular weight distribution of a polymer sample; (4) a SLS detector (by itself) at two or more angles (typically, but not necessarily 90° and 15°) to determine a weight-average molecular weight; and/or (5) SLS and DLS together to determine the radius of gyration and the hydrodynamic radius, which can be used to provide an indication of branching and higher-order conformation and/or architecture. The high-aspect ratio column can also be employed with other detector configurations that in a non-limiting embodiment includes, for example: (1) a RI detector (by itself) with samples of known concentration to determine dn/dC, the specific refractive index increment, which is useful as an indicator for chemical composition; (2) a UV-VIS or photodiode array detector combined with a light scattering and mass detector for composition determinations; and/or (3) a viscometric detector in combination with other detectors to provide additional useful information about the sample, such as polymer branching.

The polymer sample such as a polymer or a polymerization product mixture can be a raw, untreated sample or can be pretreated in preparation for characterization. In an embodiment, typical sample preparation steps include preliminary, non-chromatographic separation of one or more components of a polymer or polymer mixture, dilution, mixing and/or redissolution (e.g., from a solid state), as well as other preparations known to one skilled in the art. In a non-limiting embodiment, sample preparation can also include preliminary separation methods that help remove impurities such as dust, coagulum and the like. Such separation methods can include, for example: filtering (e.g., with a microfilter having pore sizes that allow the passage of particles less than about 0.5 μm or 0.2 μm), precipitation of polymer components, monomer components and/or other small-molecule components, decanting, washing, scavenging (e.g., with drying agents), membrane separation (e.g., diafiltration, dialysis), evaporation of volatile components and/or ion-exchange. In a non-limiting embodiment, the linear and/or branching reference sample and the polymer sample are diluted to a concentration range suitable for detection.

In a non-limiting embodiment, a Viscotek GPCmax SEC (Model 302 GPC/SEC) from Viscotek Corporation (Houston, Tex.) with a triple detector array (TDA™), which employs a concentration detector, a differential bridge viscometer, and a two angle, 7 degree and 90 degree angle light scattering detector was used to analyze the samples. Polymer samples were kept in the dark and stored in a freezer until prepared for analysis. The samples were then dissolved, filtered, degassed, and injected in a calibrated chromatograph and were analyzed. In a non-limiting embodiment, monodispersed polystyrene was used to calibrate the chromatograph.

The experiments were undertaken with a flow rate of 1.0 ml/min with tetrahydrofuran (THF) as an eluant. Solvents that are not isorefractive with the analyzed polymer that are known to one skilled in the art can also be used as an eluant. A 5-μm on-line filter was connected immediately before the columns. The concentration of the samples was approximately 0.1% weight/volume (w/v), and injection volume of 100 μl was employed throughout the analysis. The sample size is not critical, and can vary depending on the particular characterization protocols and systems used to characterize the sample or components thereof. Typical sample sizes can range from about 0.1 μl to about 1 ml. Typical concentrations can vary from 0.01 mg/ml to 100 mg/ml, and in an embodiment is from 0.1 mg/ml to 50 mg/ml. Other suitable concentrations and volumes known by one skilled in the art can also be used.

The effluent of the SEC was directed to multiple detectors to obtain measurements of differential refractive index (DRI), viscosity, and light scattering. In the Viscotek apparatus, all detectors were installed in a single heated compartment with a set of two Viscotek GMHHRH columns kept at 30° C. In another non-limiting embodiment, a temperature controlled system can be used at other temperatures suitable for the chosen solvent. Each of the three detectors measured a different, yet complementary variable. The light-scattering detector provides a measurement which is proportional to molecular weight and concentration. The viscometer detector provides a measurement that is proportional to the intrinsic viscosity and concentration, while intrinsic viscosity is inversely proportional to molecular density. Absolute molecular weight was calculated using the 7 degree angle light scattering detector and the DRI as the concentration detector. Intrinsic viscosity was calculated using the viscometer and DRI concentration detector.

In measuring such values, it should be noted that the viscometer is sensitive to changes in molecular size and the light scattering detector is sensitive to changes in molecular weight. However together with the refractive index (RI) concentration detector, the viscometer and the light scattering detector provide an excellent method for identifying subtle differences in molecular weight. Moreover, these variables together present a more complete picture of the molecular structure and can also be used to quantify branching in the molecules.

In a non-limiting embodiment, the analysis of each sample requires about 1.5 hours to 2 hours. However, it may be possible to obtain such measurements in a shorter time period. In fact, it may be possible to obtain online measurements during polymerization by removing an aliquot and then measuring the sample by various types of methods, including but not limited to light scattering, to obtain molecular weight, and possibly other parameters.

In a non-limiting embodiment of the invention, Viscotek OmniSEC™ software was used to calculate molecular weight, polydispersity values, branching, and to prepare data reports. Other software or software programs that are known to one skilled in the art can also be used for such purposes.

The number, length, and molecular weight of the branches of non-linear polymers can be determined by well-known kinetics calculations, based on the monomer composition, initiator reactivity, and/or process conditions. The underlying theories for calculating branching by using the Zimm-Stockmayer equation, for example, have been well documented in the literature. See, e.g., Zimm, G. H. and Stockmayer, W. H., J. Chem. Phys., 17, 1301 (1949); Rudin, A., Modern Methods of Polymer Characterization, John Wiley & Sons, New York (1991) pp. 103-112; and, Principles of Polymerization, 2nd edition, John Wiley and sons, New York, 1981, all of which are hereby fully incorporated by reference.

Flory also showed that the hydrodynamic volume M[η] of a polymer molecule in solution is proportional to the molecular weight×(times) intrinsic viscosity as published in "Principles of Polymer Chemistry," Cornell University Press, Ithaca, N.Y., 1953, P. J. Flory, and is hereby fully incorporated by reference.

Using the foregoing principles, characterization and branching in the molecules of the polymers can be determined. To generate branching data, a linear reference is necessary. In a non-limiting embodiment a suitable linear reference has from 0 to 0.06 branches/1000 backbone carbons. In a non-limiting embodiment, branching in the linear reference is measured for at least a portion of the range of from log M 4.5 to log M 6.3. In a non-limiting embodiment, the linear reference has a molecular weight distribution of from 1.2 to 3.0. In a further non-limiting embodiment, the linear reference has a polydispersity index ranging from 1.00 to 2.5.

In a non-limiting embodiment, the linear polystyrene reference is prepared by thermal initiation and without additives which cause the formation of branching such as multifunctional initiators, cross-linking agents, and/or chain transfer agents. It has been reported that the number of branch points that could result from chain transfer to polymer is approximately to $10 \times 10^{-4}$ according to the Polymer Handbook, [4th Ed. (J. Brandrup, E. H. Immergut, and E. A. Grulke, editors, J. Wiley and Sons, Inc, NY, N.Y., 1999, p. II-159], and is hereby fully incorporated by reference.

In a non-limiting embodiment, a branching reference can be used as a "standard" by comparing the branching of the sample with that of the non-linear reference and can also give some confidence to the quantified branching. In a non-limiting embodiment a suitable branching reference is one that has known branching. In another non-limiting embodiment, polystyrene prepared with 300 ppm or less DVB or ethylene glycol diacrylate (EGDA) can be used as a branching reference. Other polymers that are known to be linear, or substantially linear, and branched polymers that are known by one skilled in the art can also be used as linear and branching references, respectively.

In a non-limiting embodiment, the following steps are used to quantify branching in polymers. A suitable linear reference is obtained and at least one sample with unknown branching for which branching measurements are desired is obtained. The sample or the reference are individually injected into a chromatography column that separates the molecules of such sample or reference on the basis of their size, with each separation resulting in a volume of effluent. Other apparatus and methods known to one skilled in the art can also be used to separate the molecules.

Each volume of effluents of the sample and the linear reference are individually directed to at least one detector to obtain measurements of molecular weight, molecular size, and concentration. In an embodiment, measurements of the sample and the reference are obtained at each SEC elution volume.

In a non-limiting embodiment, at least one detector provides measurements of refractive index, viscosity, and light scattering. From those measurements, values of molecular weight (M) and intrinsic viscosity (IV) are obtained. In an embodiment, the resulting molecular weights and intrinsic viscosity (IV) are recorded at each SEC elution volume for the sample and the reference. In a non-limiting embodiment, measurements of the molecular weight averages of Mz, Mw, and Mn, as well as molecular weight distribution or polydispersity (Mw/Mn) were also obtained for the sample and the linear reference. In an embodiment, these measurements were also recorded.

Log M and the log IV are calculated from the measured values of the molecular weight (M), and intrinsic viscosity (IV) of the sample and the linear reference. A plot can be prepared using the data points of the log IV values versus the log M values for the polymer sample and the linear reference to help understand the branching characteristics of the sample, if any.

In a non-limiting embodiment when the log IV of a linear reference is plotted versus the log M of such linear reference, a "straight line" is obtained as defined by the Mark-Houwink equation in Formula 4. In an embodiment the straight line can be sloped.

$$[\eta]=KM^a \qquad \text{Formula (4)}$$

In Formula 4, [η] is intrinsic viscosity, K is a constant, M is molecular weight), and "a" is a scalar. The Mark-Houwink equation can be changed to contain logs as in Formula 5.

$$\log [\eta]=\log K+a \log M \qquad \text{Formula (5)}$$

A plot can also be made of the values for log [η] and the log of the values for "M," with the log of viscosity as the y axis and the log of M as the x axis. The slope of the line will give "a," and the antilog of the y-intercept will give In a non-limiting embodiment, one or more portions of the log molecular range (log M) of 6.5 to 3.5 are chosen. In another non-limiting embodiment, the log M range is one or more portions of log M 6.2 to log M 4.5. The log molecular weight range can also be broadened or narrowed as necessary to capture the test data. Other suitable log molecular ranges can be used, depending upon the type of polymer or sample analyzed, the molecular weight of the sample, and/or instrument noise.

If a branching reference is used, it is also analyzed like the sample and linear reference as previously described, the data is recorded, and the values can be plotted, if desired.

The method is also based on deriving "g" the ratio of the radii of gyration of branched molecules to linear molecules, and in an embodiment, it is obtained from intrinsic viscosity as a function of molecular weights. In an embodiment "g" can be referred to as the "number average equation" according to A. Rudin, "Measurement of Long-Chain Branch Frequency in Synthetic Polymers," in H. G. Barth and J. W. Mays (Eds.), Modern Methods of Polymer Characterization," John Wiley and Sons, New York, 1991; and, S. Pang and A. Rudin, "Size-Exclusion Chromatographic Assessment of Long-Chain Branch Frequency in Polyethylenes," Am. Chem. Soc. Symp. Ser. 521, 254 (1993), all of which are hereby fully incorporated by reference.

When measurements are obtained from refractive index, viscosity, and light scattering detectors, branching calculations are based upon g', the ratio of branched (b) polymer intrinsic viscosity to linear (l) polymer intrinsic viscosity, or $g'=(IV_b/IV_l)$. Intrinsic viscosity can also be referred to as $\eta$ (eta), in which case $g'=[\eta]_b/[\eta]_l$ is used to generate g' and is equivalent to the ratio of $[\eta]$ for a branched polymer to the $[\eta]$ of a linear polymer. In that case, $\eta$ (eta) is substituted for intrinsic viscosity (IV) in Formula 6 below. When measurements are obtained from refractive index, viscosity, and light scattering detectors, a calculation of $g=g'^{1/\epsilon}$ is necessary to convert g' to g, which is then directly used in the Zimm-Stockmeyer equation in Formula 6 below. In an embodiment, epsilon ($\epsilon$) is from 0.5 to 1.5 depending on the polymer structure. In a non-limiting embodiment, the calculations are performed with the aid of a computer and computer software, and in a non-limiting embodiment 0.75 was used as the epsilon ($\epsilon$) value, as it was the software default.

Next, using "g" from above and the Zimm-Stockmeyer equation in Formula 6, "$B_n$," the average of branches/molecule is calculated.

$$g = \frac{6}{B_n}\left[\frac{1}{2}\left(\frac{2+B_n}{B_n}\right)^{\frac{1}{2}}\ln\left(\frac{(2+B_n)^{\frac{1}{2}}+B_n^{\frac{1}{2}}}{(2+B_n)^{\frac{1}{2}}-B_n^{\frac{1}{2}}}\right)-1\right] \quad \text{Formula (6)}$$

where: $B_n$ is the average of branches/molecule,
$g=(IV_b/IV_l)^{1/\epsilon}$,
$\epsilon$ is a shape factor, and
ln is the natural logarithm.

Next, branching frequency referred to as $\lambda$ (lambda) can be calculated using the molecular weight and the repeating unit of the polymer. In a non-limiting embodiment, the branching frequency of the sample can be calculated at each data point as determined from each SEC elution volume, using the $B_n$ from Formula 6 to compute $\lambda$ (lambda), where $\lambda$ is described by the equation:

$\lambda=(B_n\times$Molecular Weight of substance per backbone Carbon$\times 1000)$, and where $B_n$ is the number of branch sites per polymer chain. Formula (7)

In a non-limiting embodiment where polystyrene is measured, a repeating unit of 52 is used since styrene has a molecular weight of 104 and there are two backbone carbons per monomer, thus $\lambda=(B_n\times 52,000/M)$, wherein $\lambda$ is expressed as the number of long chain branches per 1000 back bone carbon atoms.

Obviously a plurality of samples can be measured by this method, using one or more linear references, and optionally one or more branching references. If desired, plots can also be made of the various measured and/or calculated parameters, such as those shown in FIGS. 13-27. Further, statistical averages for the measured samples, such as that shown in Table IX, can be calculated from the graphical distributions.

The measuring method detects differences between the radius of gyration of molecule sizes between a linear reference and the non-linear polymer sample. The differences can be seen most notably in molecular weight (and/or the radius of gyration of a mass) and the size of the molecules in solution due to branching within the molecules. The method shows that polymers prepared with additives such as multifunctional initiators, cross-linking agents, and chain transfer agents, have increased branching that is quantifiable by comparing such polymers to a linear reference that was polymerized without the use of such additives.

In a non-limiting embodiment a branching reference, can also be analyzed and compared with the values of the linear reference and the polymer sample, if desired.

In a further non-limiting embodiment, gel permeation chromatographic techniques disclosed in ASTM test method D5296-05 "Standard Test Method for Molecular Weight Averages and Molecular Weight Distribution of Polystyrene by High Performance Size-Exclusion Chromatography" (Polystyrene Standard), can be used to separate the polymer sample and/or the linear and/or branching reference, to measure the desired parameters, and to quantify branching in conjunction with the linear reference and formulas disclosed herein.

In a further non-limiting embodiment, "g" can be obtained from the ratio of the radius of gyration of the branched (b) polymer sample to the radius of gyration of the linear (l) polymer reference sample, by using different detectors to obtain such measurements. Rather than measuring intrinsic viscosity the radius of gyration is measured by the different detectors.

The radius of gyration of an area with respect to a particular axis is the square root of the quotient of the moment of inertia divided by the area. It is the distance at which the entire area must be assumed to be concentrated in order that the product of the area and the square of this distance will equal the moment of inertia of the actual area about the given axis, and the radius of gyration describes the way in which the total cross-sectional area is distributed around its centroidal axis. In a non-limiting embodiment, the numerical value of the radius of gyration, r, is given by the following formula in which I is the moment of inertia and A is the area:

$$r = \sqrt{\frac{I}{A}} \quad \text{Formula (8)}$$

In addition to molecular weight, the radius of gyration of a mass can be measured. In a non-limiting embodiment, the radius of gyration of a mass is similar except that the moment of inertia of the mass is involved. The numerical value of the radius of gyration of a mass, k, is given by the following formula in which I is the mass moment of inertia and m is the mass:

$$k = \sqrt{\frac{I}{m}} \quad \text{Formula (9)}$$

One or more detectors are used to obtain (g) that comprises number average equation from the ratio of the radius of gyration ($R_g$) of the branched (b) polymer intrinsic viscosity of the sample to the radius of gyration of the linear (l) polymer intrinsic viscosity of the linear reference, or $g=(R_{gb}/R_{gl})$. The "g" is then used directly in the Zimm-Stockmeyer equation in Formula 6 to obtain "$B_n$," the average of branches/molecule.

$$g = \frac{6}{B_n}\left[\frac{1}{2}\left(\frac{2+B_n}{B_n}\right)^{\frac{1}{2}} \ln\left(\frac{(2+B_n)^{\frac{1}{2}} + B_n^{\frac{1}{2}}}{(2+B_n)^{\frac{1}{2}} - B_n^{\frac{1}{2}}}\right) - 1\right]$$

where: $B_n$ is the average of branches/molecule $g=(R_{gb}/R_{gl})$                                                 Formula (10)

The measurement values obtained by this alternative method can then be used to calculate branching as described above, using the same types of linear references, and optionally branching references. Similar to the disclosed method that utilizes SEC prior to submitting the samples to the detectors for measurement, in a non-limiting embodiment, the samples and the references are prepared and/or separated if necessary by methods such as SEC prior to such measuring. However the "g" obtained by this method is direct, and thus no epsilon ($\epsilon$) calculation is necessary as previously described when the measurements are obtained from refractive index, viscosity, and light scattering detectors.

Next, $\lambda$ (lambda) or branching frequency can be calculated using Formula 7.

Using these principles, other measuring methods known by one skilled in the art can also be used in conjunction with the linear and/or branching references of this invention and the methods of quantifying branching as set forth to quantify branching in polymers.

In another non-limiting embodiment, a method is disclosed for preparing a linear polymer for usage as a reference in polymer characterization systems for characterizing branching in a polymer sample. In an embodiment, a linear reference polymer having 0.06 branches/1000 backbone carbons or less is prepared by thermal initiation, pretreated if necessary, and then is injected into a polymer characterization system and the hydrodynamic volume of the injected linear polymer is detected as previously described and results in values for radius of gyration ($R_g$) or intrinsic viscosity (IV), and respective molecular weight and mass values. The hydrodynamic volume of a polymer molecule in solution is proportional to the molecular weight×(times) intrinsic viscosity. The detected hydrodynamic volume of the linear reference is used to characterize branching in a polymer sample with unknown branching.

In a non-limiting embodiment, the polymer sample with unknown branching is a polymerization product resulting from polymerization reactions that are varied with respect to type of multifunctional initiators and other additives and/or the relative amounts thereof. In another non-limiting embodiment, the polymer sample is a polymerization product resulting from polymerization reactions that are varied with respect to type of multifunctional initiator and/or cross-linking agent and/or the relative amounts thereof. In a further non-limiting embodiment, the polymer sample is a polymerization product resulting from polymerization reactions that are varied with respect to type of multifunctional initiator and/or chain transfer agent and/or the relative amounts thereof. In an embodiment, the polymer sample is a polymerization product resulting from polymerization reactions that are varied with respect to type of multifunctional initiator and/or a cross-linking agent and/or chain transfer agent or cross-linking agent and chain transfer agent.

The linear reference of this invention can also be used for the characterization of polymers such as that disclosed in U.S. Pat. No. 6,406,632 entitled "Rapid Characterization of Polymers", by Petro et al.; U.S. Pat. No. 6,265,226 entitled "Automated Sampling Methods for Rapid Characterization of Polymers", by Petro et al.; U.S. Pat. No. 6,260,407 entitled "High-Temperature Characterization of Polymers", by Petro et al.; U.S. Pat. No. 6,175,409 entitled "Flow-injection Analysis and Variable-Flow Light Scattering Apparatus and Methods for Characterizing Polymers", by Nielsen et al.; and U.S. Pat. No. 6,294,388 entitled "Indirect Calibration of Polymer Characterization Systems", by Petro et al., all of which are hereby fully incorporated by reference.

Further Batch Experiments using Polystyrene

The measuring methods set forth above were used to quantify the effects of multifunctional initiators, cross-linking agents and/or chain transfer agents on polymer characteristics such as branching, intrinsic viscosity, and molecular weight.

Studies were initiated to produce different foam grade polystyrenes using multifunctional initiators and other additives to study the degree of branching. The samples were synthesized and then characterized by SEC and then measured by measurements by the Viscotek apparatus as described, which employs a concentration detector, a differential bridge viscometer, and a two angle, 7 degree and 90 degree angle light scattering detector. The formulations of Samples 1-9 are shown in Table IV, below.

TABLE IV

Composition of Test Samples
Sample

1 Thermal PS
2 585
3 Branched MF
4 145 ppm L-531, 40 ppm L-233
5 100 ppm DVB
6 170 ppm L233, 0 ppm EGDA
7 170 ppm L233, 76 ppm EGDA
8 170 ppm L233, 152 ppm EGDA
9 170 ppm L233, 228 ppm EGDA Experiments with Thermal PS, PS 585, and Branched MF—Samples 1-3

A third set of experiments concerns the measurement of synthesized polystyrenes shown in Table IV. Sample 1 prepared by thermal initiation was used to compare the number of branch points that could result from chain transfer to polymer, and was used as a linear reference. Sample 2, commercial 585 polystyrene foam (PS 585, sold by Total Petrochemicals, USA) was used as a representative sample of typical commercial foams and is a high molecular weight, low melt flow, crystal polystyrene. Sample 3 designated as Branched MF is an experimental polystyrene that was produced with a tetrafunctional initiator, such as JWEB-50. The polymerization was carried out thermally for 2 hours at 110° C., 1 hour at 130° C. and 1 hour at 150° C. Polystyrene Samples 1-3 were then submitted for SEC and measurements by the Viscotek apparatus as previously described and data was collected, used in calculations, and plots were prepared.

Figure 13:
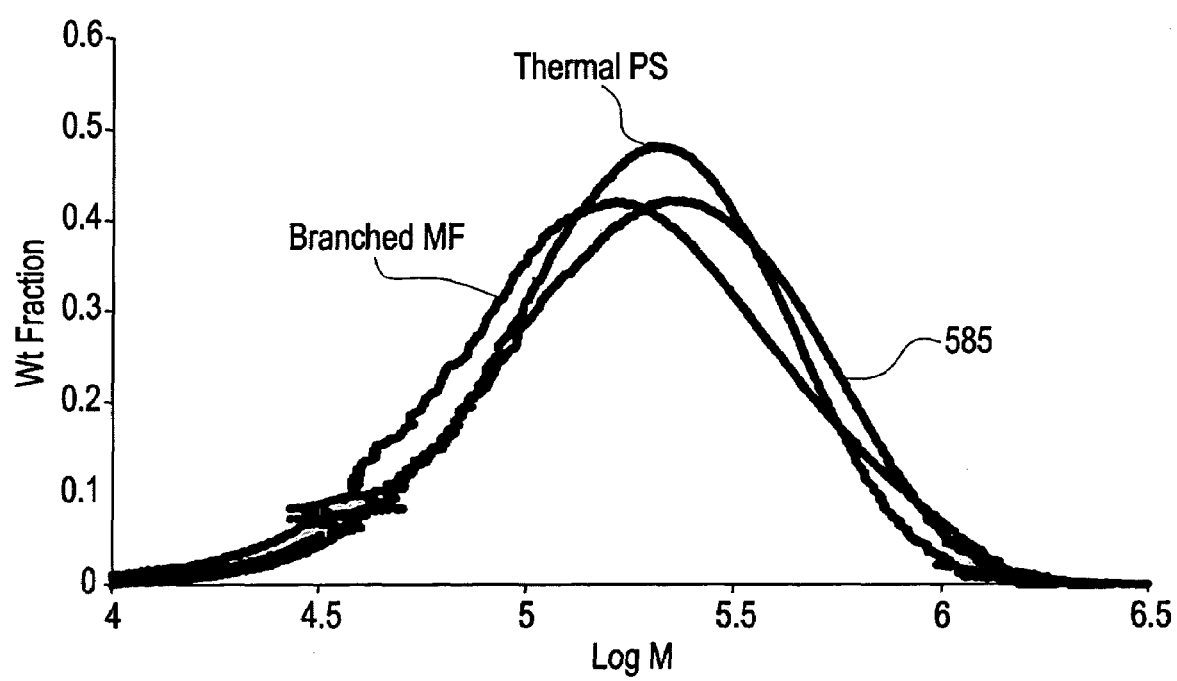
FIG. 13 is graph showing weight fraction (Wt Fraction) versus log molecular weight (Log M) for Samples 1-3 that include a commercial 585 foam grade polystyrene, polystyrene prepared by thermal initiation (Thermal PS) and a multifunctional initiator (Branched MF)

FIG. 13 shows the weight fraction (Wt Fraction) versus log molecular weight (Log M) for Samples 1-3.

Figure 14:
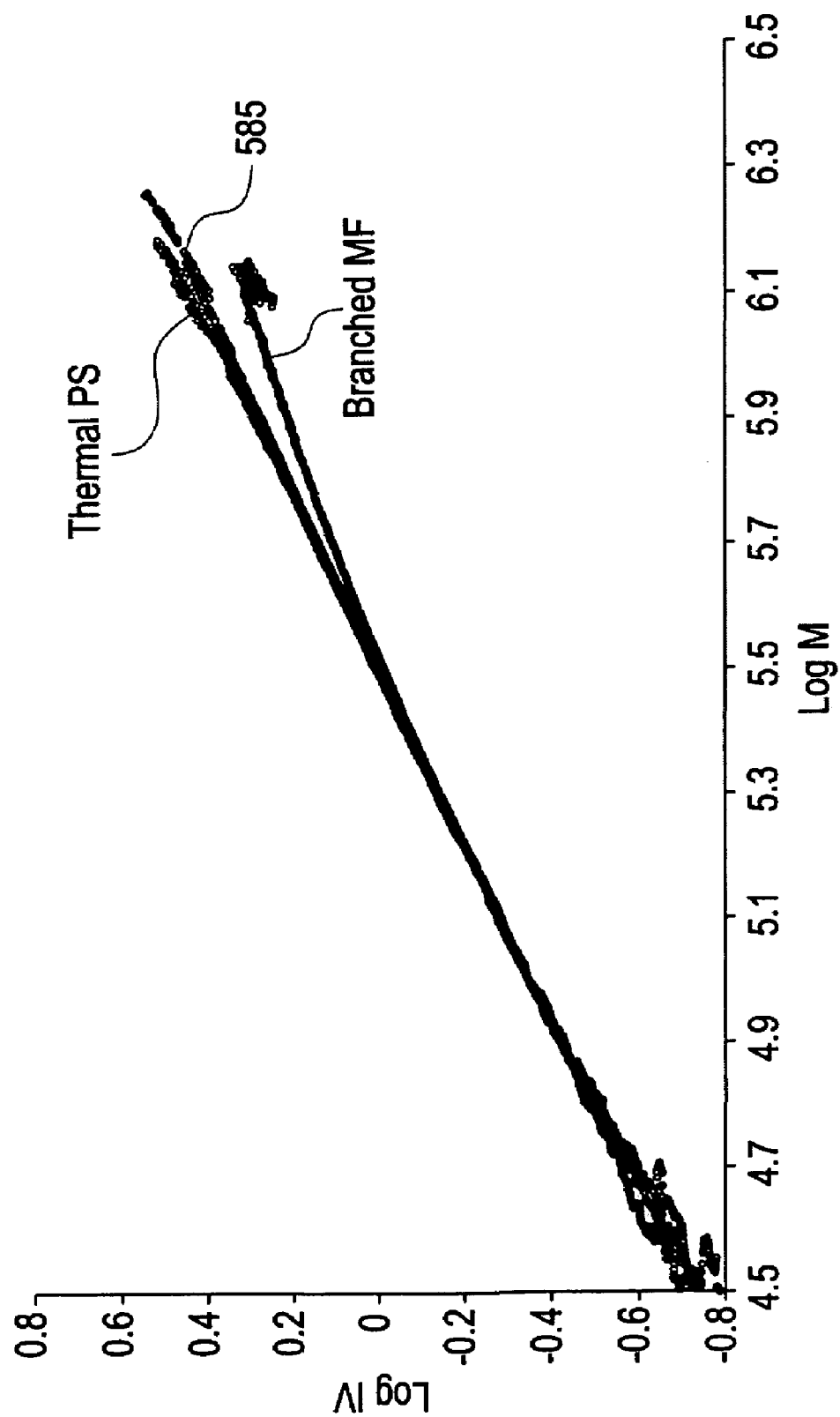
FIG. 14 is graph showing log intrinsic viscosity (Log IV) versus log molecular weight (Log M) for polystyrene Samples 1-3.

One principle used to formulate branching graphs is the Mark-Houwink plots shown in FIGS. 14, 15, 19, 20, 24, and 25 that use the log intrinsic viscosity versus log molecular weight (Log M). By plotting Log IV (or log [η]) versus Log [M], the branched polystyrene is differentiated from the linear polystyrene reference. Viscosity and molecular weight have a linear relationship on a log-log scale for the linear polystyrene reference. In contrast, branched polystyrene will typically exhibit lines which are curved towards lower viscosities at higher molecular weights. FIG. 14 shows the log intrinsic viscosity (Log IV) versus log molecular weight (Log M) for Samples 1-3.

Figure 15:
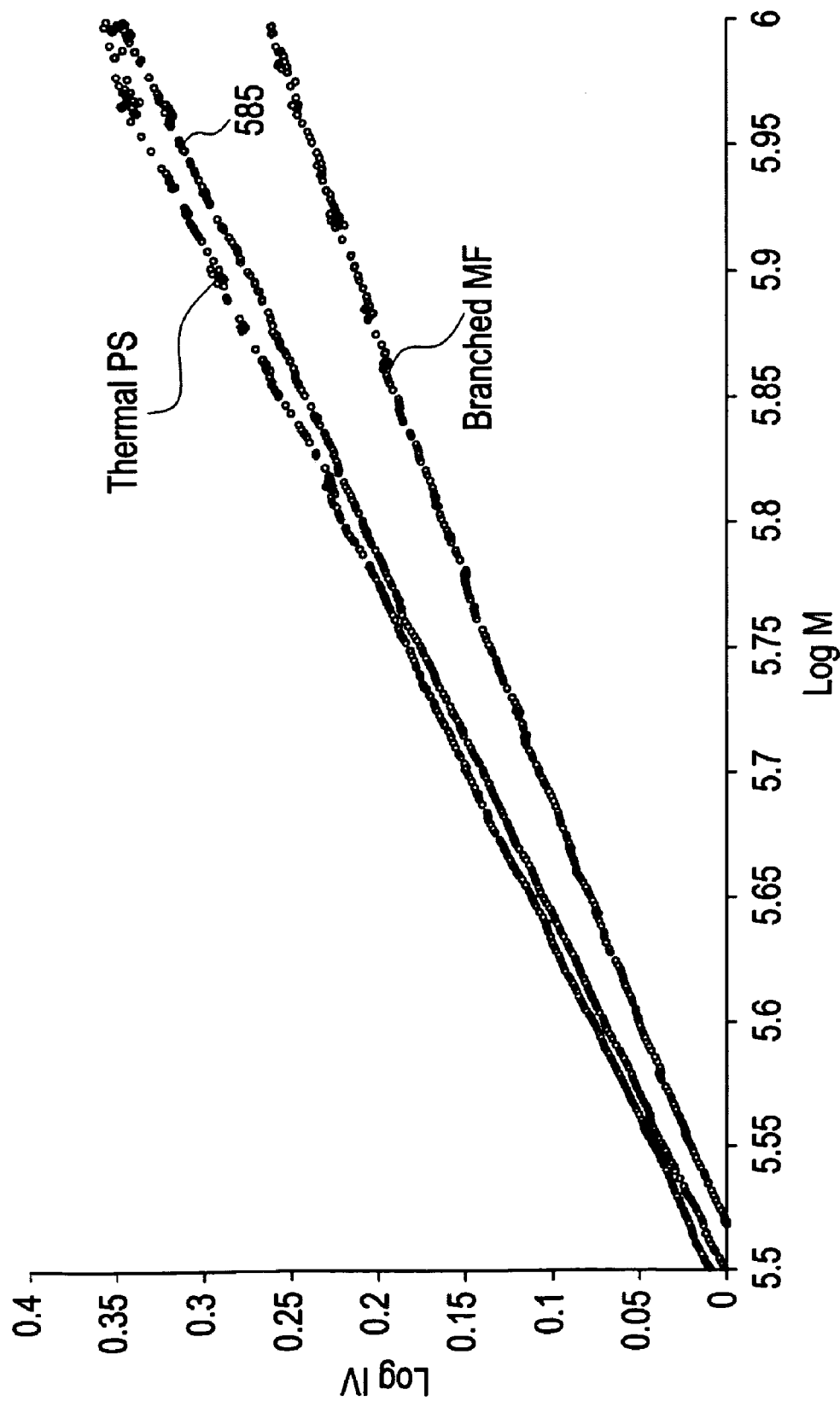
FIG. 15 is an expanded view of FIG. 14 from Log M 5.5 to 6.

FIG. 15 is an expanded view of FIG. 14 and shows the log intrinsic viscosity (Log IV) versus log molecular weight (Log M) for Samples 1-3 from log M5.5 to log M6.0.

Figure 16:
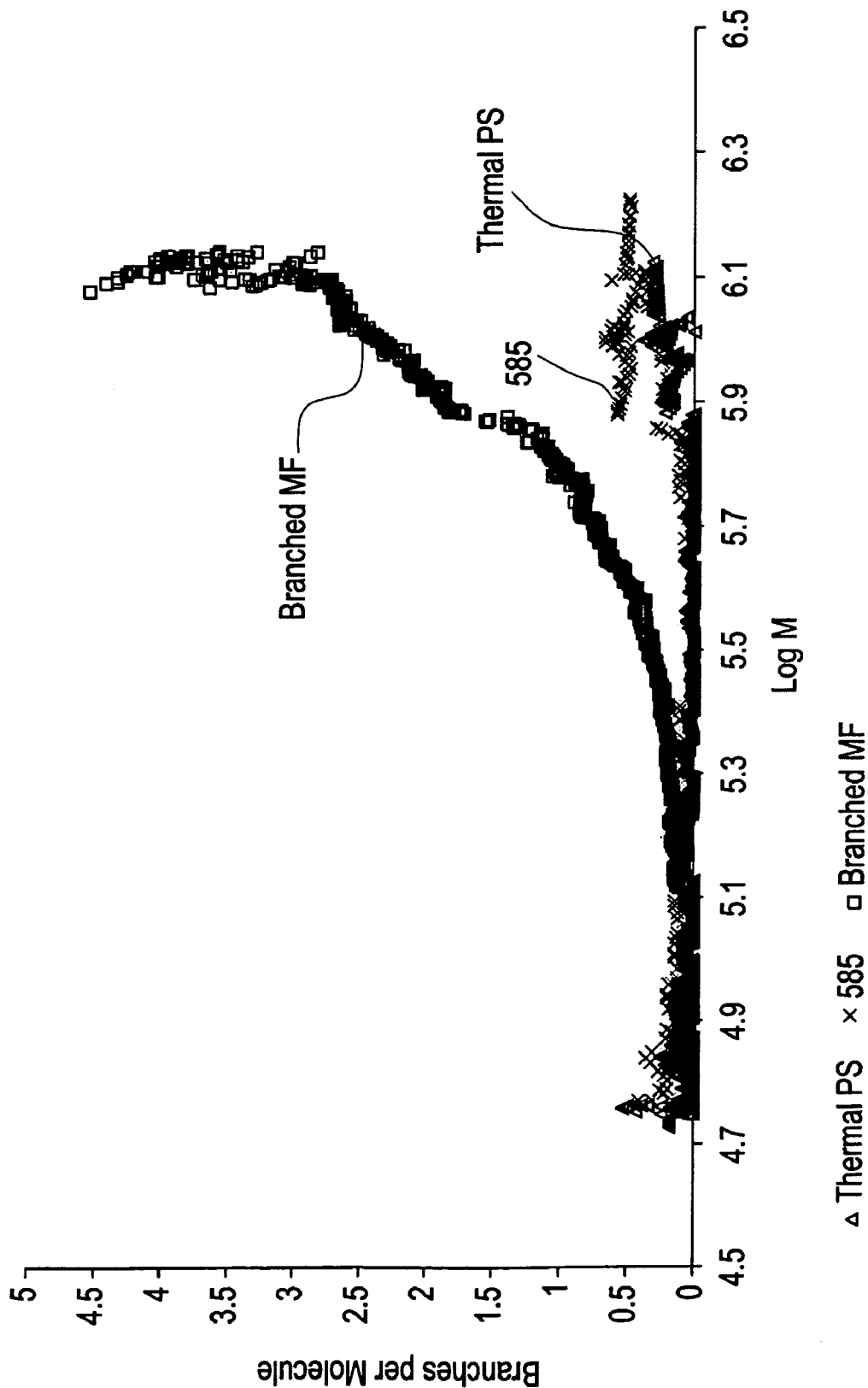
FIG. 16 is a plot that shows the branches/molecule (Branches per Molecule) versus Log M for Samples 1-3.

FIG. 16 shows the branches/molecule (branches per molecule) versus Log M for Samples 1-3. FIG. 16 shows that Sample 1 prepared by thermal initiation shows little branching, while Sample 3 shows the highest number of branches per molecule. Table V shows the averaged results of the analysis.

TABLE V

| Sample | Test Results | | | | | |
|---|---|---|---|---|---|---|
| | Mn | Mw | Mz | PDI | Bn | Lambda |
| #1 Thermal PS | 132,200 | 243,300 | 382,800 | 1.84 | 0.000 | 0.000 |
| #2 585 | 121,500 | 268,200 | 459,700 | 2.21 | 0.144 | 0.040 |
| #3 Branched MF | 99,000 | 236,000 | 458,700 | 2.38 | 0.292 | 0.042 |

It should be understood that the data for the thermal initiated polystyrene used as a linear reference is not adjusted, while the branching characteristics of the other polystyrene samples are based upon a comparison of certain values (e.g. IV and $R_g$) of the sample with unknown branching and Sample 1 used as a linear reference, as detailed in the previous measuring methods. This also applies to FIGS. 21 and 26, and the $B_n$ and Lambda data in Tables V-IX.

Figure 17:
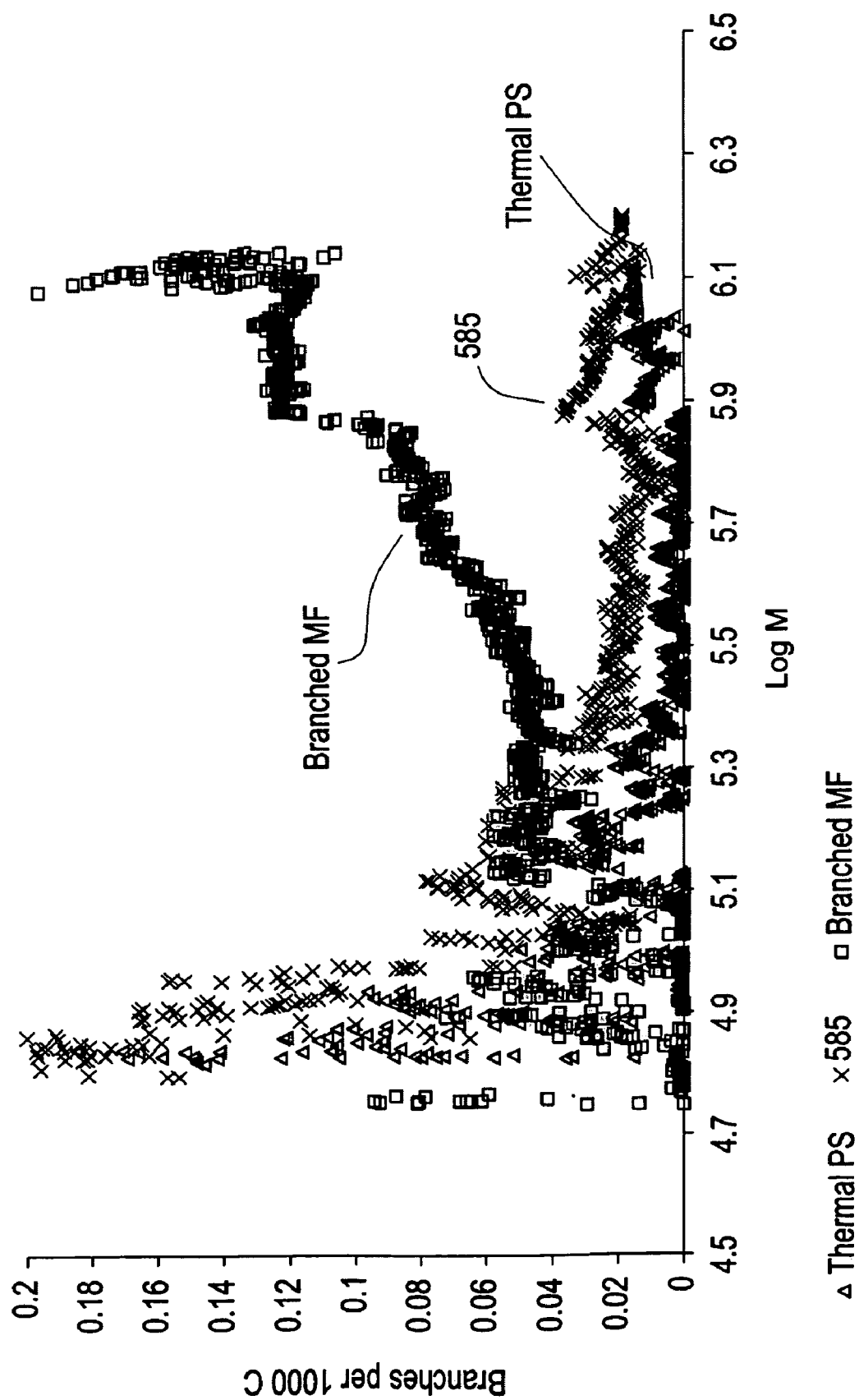
FIG. 17 is a plot that shows the branches/1000 backbone carbons (Branches per 1000 C) versus Log M for Samples 1-3.

FIG. 17 shows the branches/1000 backbone carbons (branches per 1000 C) versus Log M. FIG. 17 again shows that the thermal polystyrene sample shows little branching, while Sample 3 shows the highest number of branches per backbone carbon. Again, the data for the thermal initiated polystyrene is not adjusted, while the branching characteristics of the other polystyrene samples are based upon a comparison of the values of the sample with unknown branching and the linear reference as previously set forth in the measuring methods. This also applies to FIGS. 22 and 27.

Experiments with Bifunctional Initiators L531 and L233— Sample 4

A fourth set of experiments concerns the synthesis of polystyrene Sample 4 by using 145 ppm of bifunctional initiator LUPERSOL 531 (L-531) which contains 1,1-di-(t-amylperoxy) cyclohexane and 40 ppm of LUPERSOL 233 (L-233) which contains ethyl 3,3 di-tert-butyl-peroxy butyrate, both of which are commercially available from Arkema, Inc., Philadelphia, Pa. (formerly sold by Atofina Petrochemicals, Inc.).

Polymerization was carried out thermally for 2 hours at 110° C., 1 hour at 130° C. and 1 hour at 150° C. The theoretical active oxygen of the multifunctional initiators was as follows: L233=10.9; L531=to 11.1.

Polystyrene Sample 4 was then submitted for SEC and measurements by the Viscotek apparatus as described. Table VI shows the averaged results of the analysis. While the use of bifunctional initiators alone such as L531 and L233 can increase the rate of polymerization, they appear to cause minimal, if any, branching without the use of a cross-linking agent and/or a multifunctional initiator. See e.g. data for Samples 6-9, below.

TABLE VI

| Sample | Test Results | | | | | |
|---|---|---|---|---|---|---|
| | Mn | Mw | Mz | PDI | Bn | Lambda |
| #4 145 ppm L-531 40 ppm L-233 | 149,800 | 289,200 | 442,900 | 1.93 | 0.046 | 0.017 |

Experiments with DVB—Sample 5

A fifth set of experiments concerns the measurement of Sample 5 prepared with 100 ppm divinylbenzene (DVB), a cross-linking agent which is known to form relatively high numbers of non-linear molecules. The polymerization was carried out thermally for 2 hours at 110° C., 1 hour at 130° C. and 1 hour at 150° C.

Polystyrene Sample 5 was then submitted for SEC and measurements by the Viscotek apparatus as described. The results of Samples 1 and 3 are shown for comparison purposes. The addition of DVB during polymerization without a multifunctional initiator increases the rate of polymerization, molecular weight, and branching.

Figure 18:
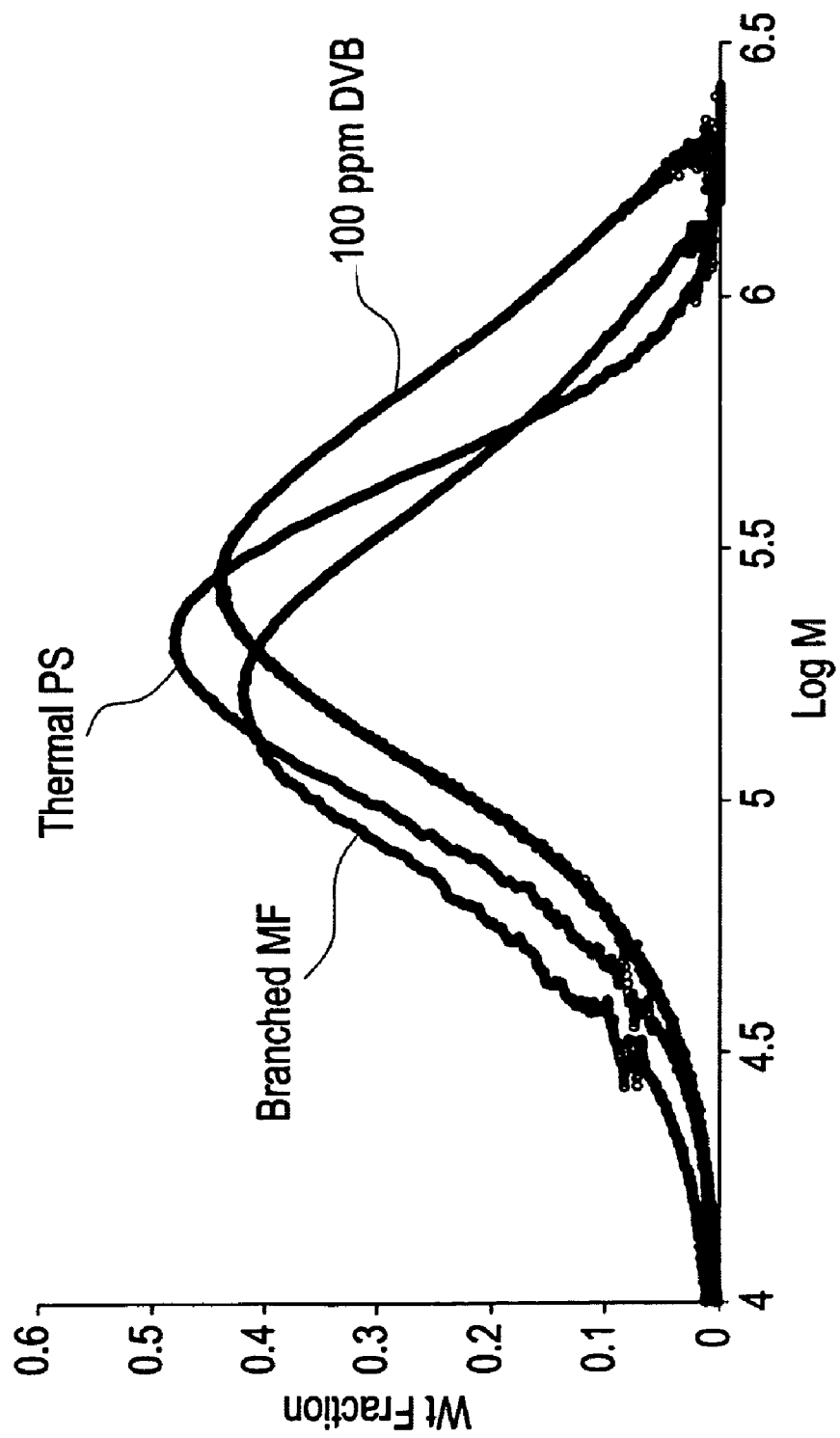
FIG. 18 is a plot that shows the weight fraction (Wt Fraction) versus Log M for thermal initiated polystyrene, polystyrene made with a multifunctional initiator, and polystyrene made with DVB (Samples 1, 3, and 5)

FIG. 18 shows the weight fraction (Wt Fraction) versus log molecular weight (Log M) for Samples 1, 3, and 5. The plot once again shows that as the log molecular weight of the polymer increases, the cummulative weight fraction decreases. The results also suggest that branching occurs only with higher chain lengths or molecular weights. See e.g. FIGS. 21-22.

Figure 19:
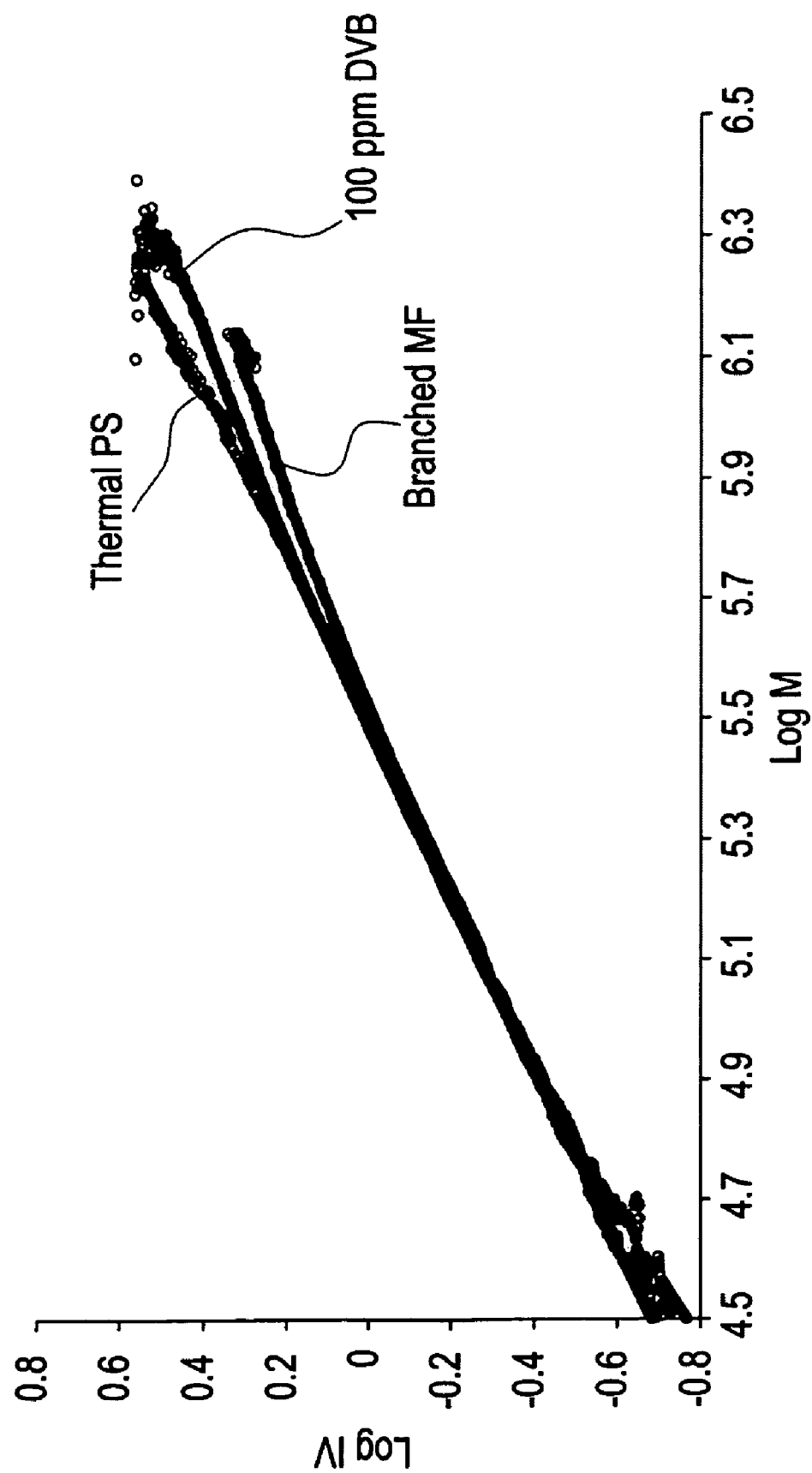
FIG. 19 is a plot that shows the log intrinsic viscosity (Log IV) versus Log M for Samples 1, 3, and 5.

FIG. 19 is a Mark-Houwink plot showing the log intrinsic viscosity (Log IV) versus Log M for Samples 1, 3, and 5.

Figure 20:
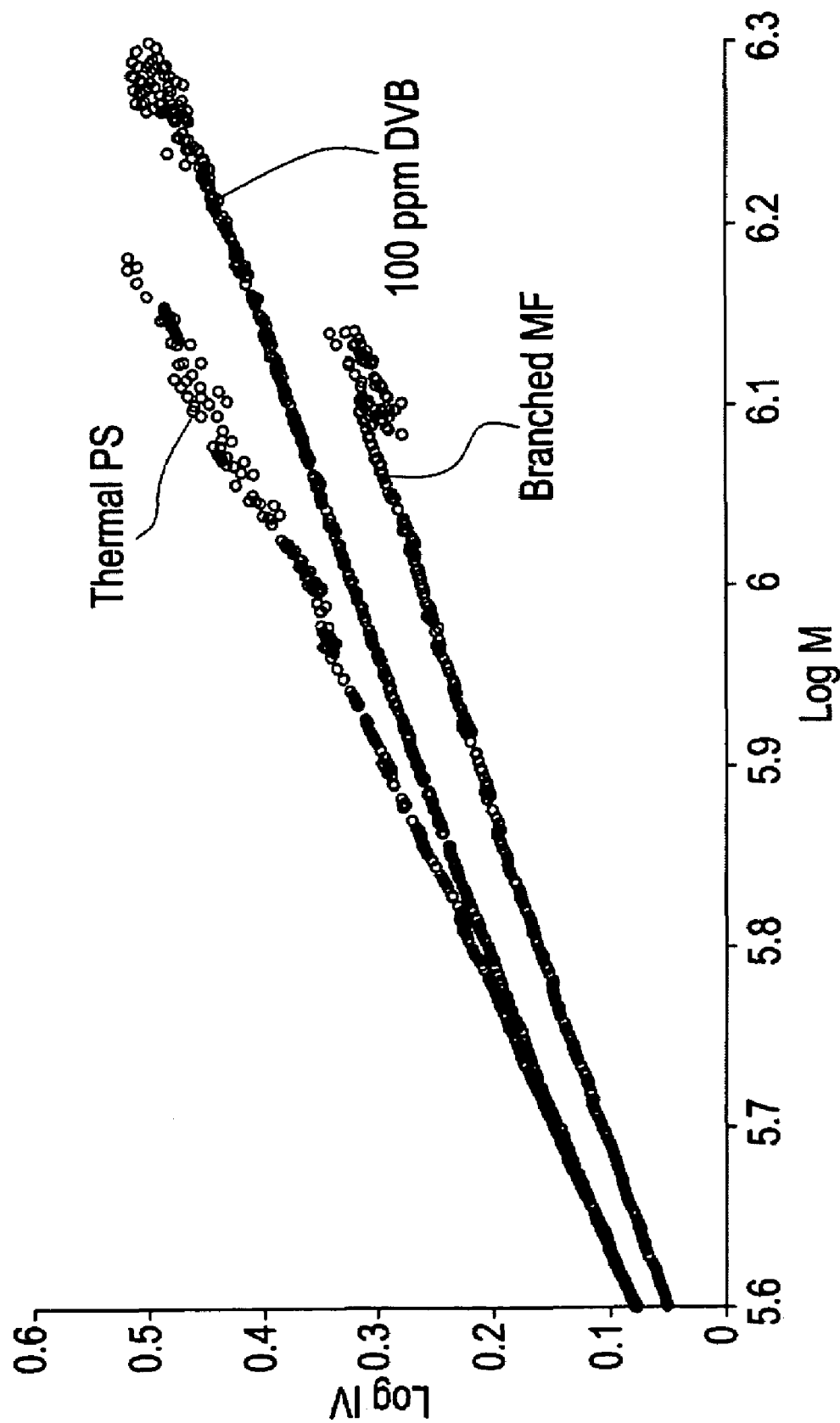
FIG. 20 is an expanded view of FIG. 19 from Log M 5.6 to 6.3.

FIG. 20 is an expanded view of FIG. 19 from Log M 5.6 to 6.3.

Figure 21:
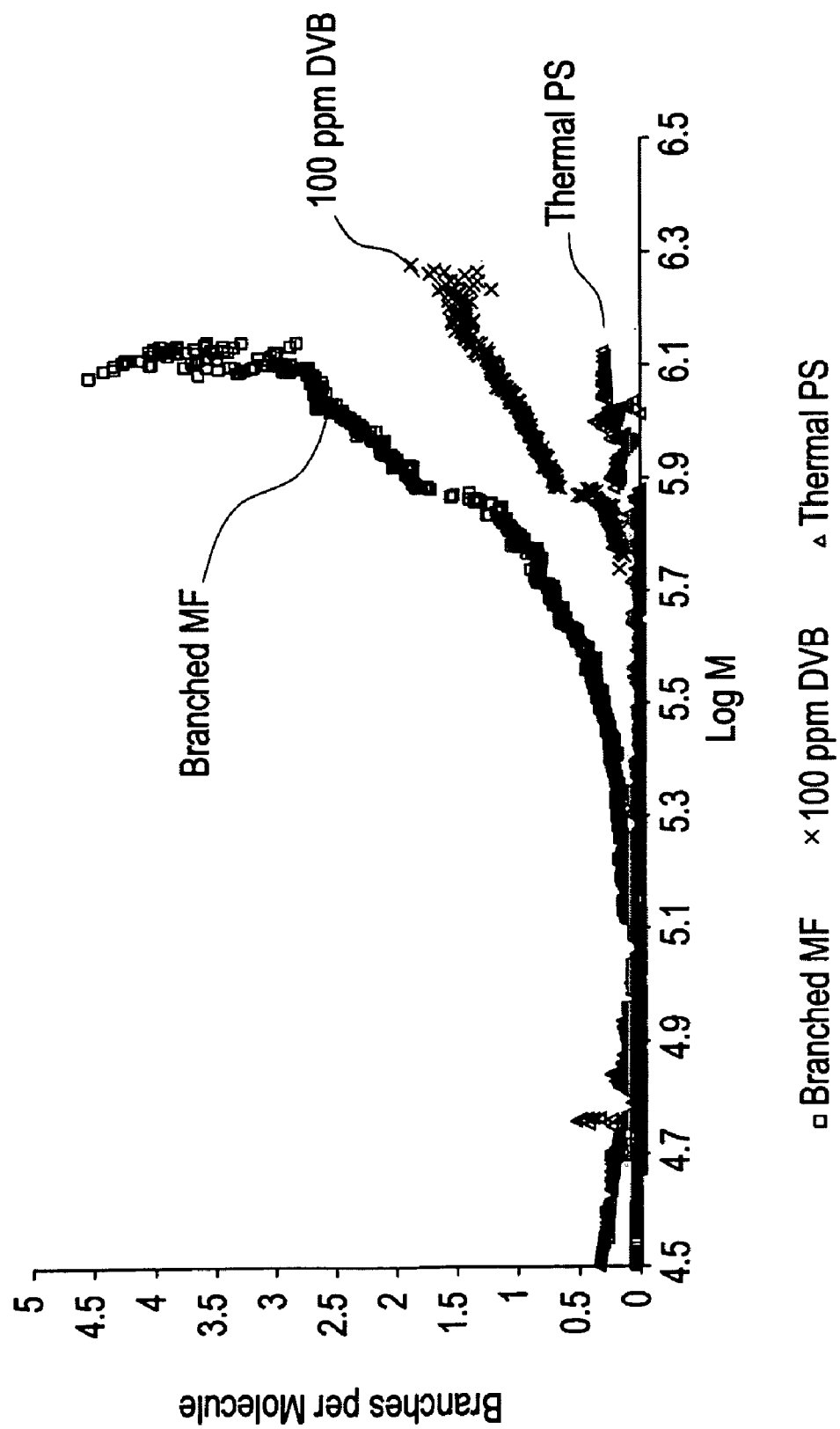
FIG. 21 is a plot that shows the branches/molecule versus Log M for Samples 1, 3, and 5.

FIG. 21 shows the branches/molecule (Branches per Molecule) versus Log M for Samples 1, 3, and 5. FIG. 21 again shows that Sample 3 which was prepared with a multifunctional initiator shows the highest number of branches per molecule.

Figure 22:
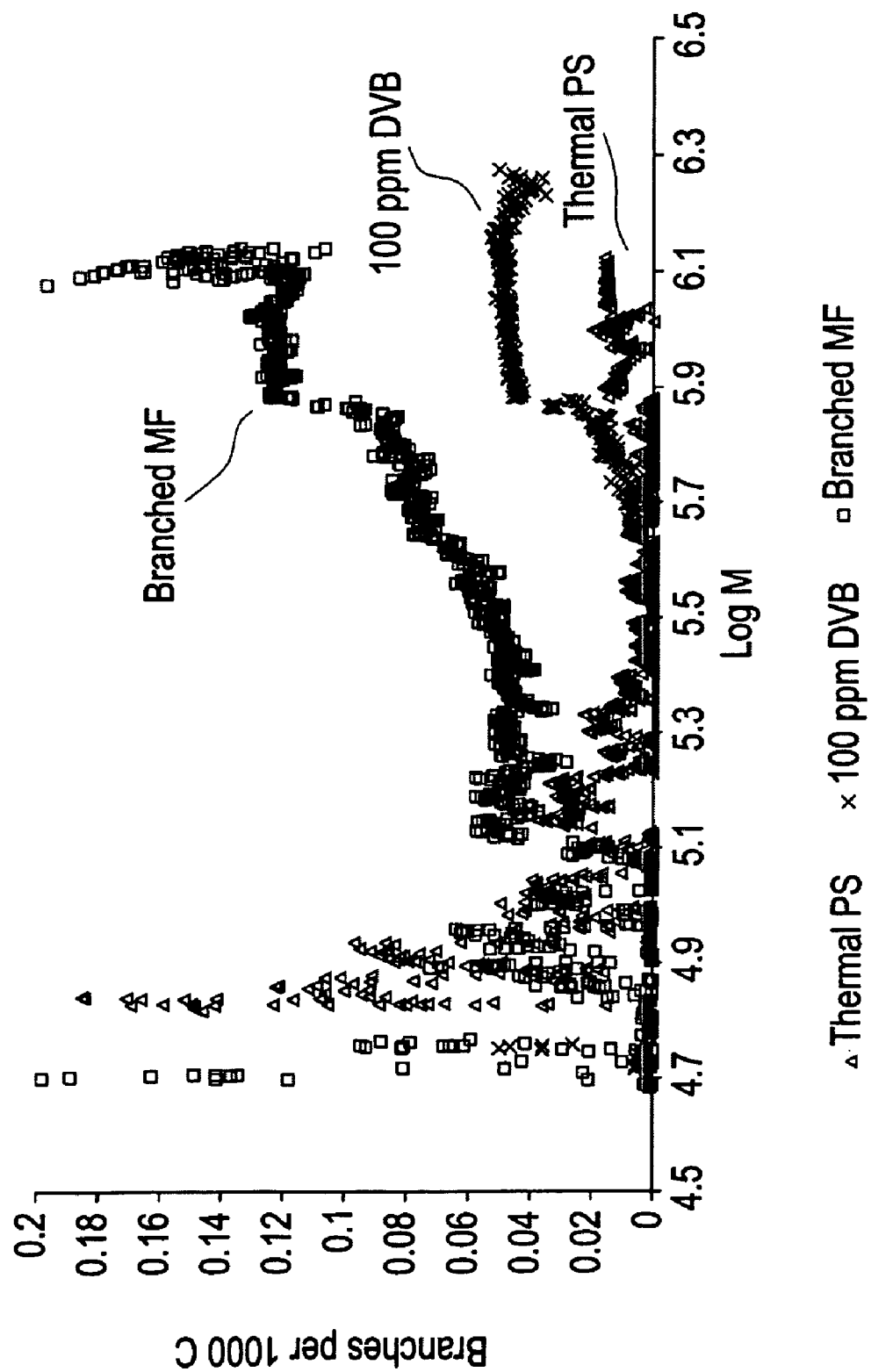
FIG. 22 is a plot that shows the branches/1000 backbone carbons versus Log M for Samples 1, 3, and 5.

FIG. 22 shows the branches/1000 backbone carbons (branches per 1000 C) versus Log M for Samples 1, 3, and 5. FIG. 22 again shows that the thermal polystyrene sample shows little branching, while Sample 3 shows the highest number of branches per backbone carbon. Table VII shows the averaged results of the analysis of Samples 1, 3, and 5.

TABLE VII

| Sample | Test Results | | | | | |
|---|---|---|---|---|---|---|
| | Mn | Mw | Mz | PDI | Bn | Lambda |
| #1 Thermal PS | 132,200 | 243,300 | 382,800 | 1.84 | 0.000 | 0.000 |
| #3 Branched MF | 99,000 | 236,000 | 458,700 | 2.38 | 0.292 | 0.042 |
| #5 100 ppm DVB | 166,353 | 388,261 | 705,417 | 2.33 | 0.148 | 0.008 |

Experiments with L233 and EDGA—Samples 6-9

A sixth set of experiments concerns the synthesis of polystyrene by using a bifunctional initiator L233 and various concentrations of cross-linking agent ethylene glycol diacrylate (EDGA) as shown in Table VIII, using the same temperature profile described previously. Polystyrene Samples 6-9 were submitted for SEC and measurements by the Viscotek apparatus as described.

Figure 23:
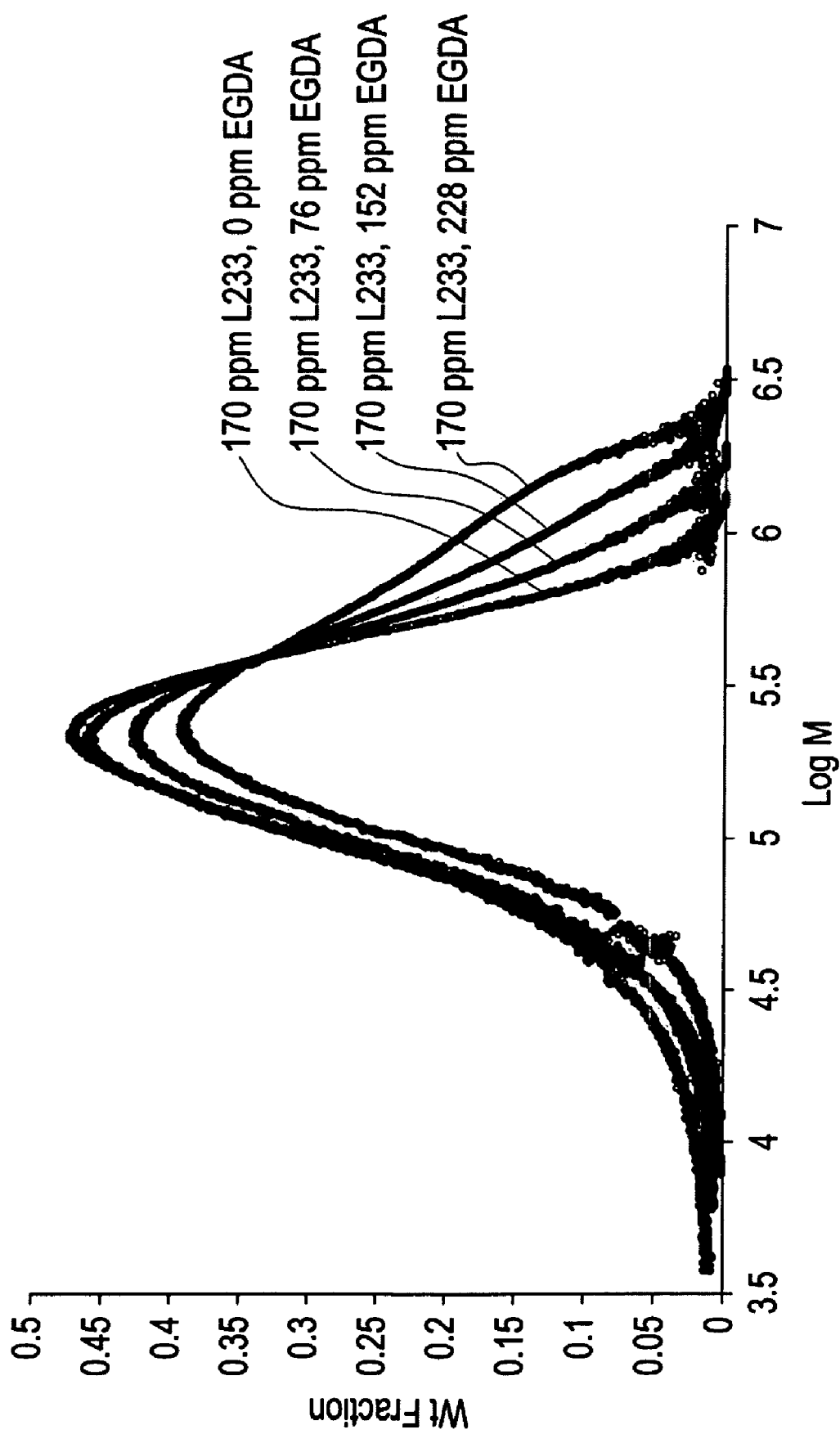
FIG. 23 is a plot that shows the weight fraction versus Log M for Samples 6-9 prepared with a bifunctional initiator and varying concentrations of EGDA.

FIG. 23 shows the weight fraction (Wt Fraction) versus log molecular weight (Log M) for Samples 6-9. The plot once again shows that as the log molecular weight of the polymer increases, the cummulative weight fraction decreases. The results also suggest that branching occurs only with the highest chain lengths or molecular weights. See e.g. FIGS. 26-27.

Figure 24:
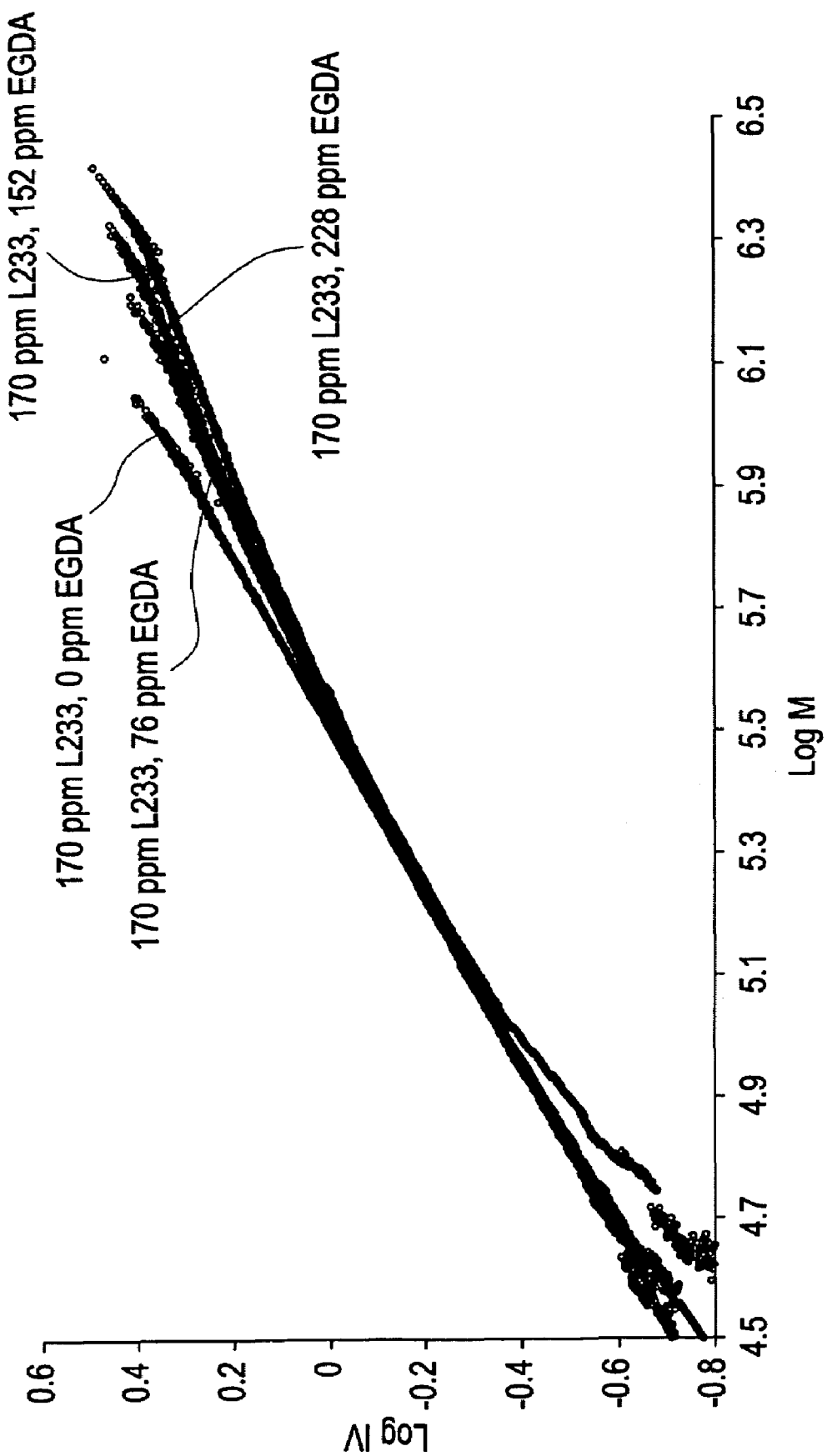
FIG. 24 is a plot that shows the log intrinsic viscosity (Log IV) versus Log M for Samples 6-9.

FIG. 24 shows the log intrinsic viscosity (Log IV) versus log molecular weight (Log M) for Samples 6-9.

Table IX summarizes the averaged test results for the samples, and shows the number-average molecular weight (Mn), weight-average molecular weight (Mw), Z average molecular weight (Mz), Mz/Mw ratio, polydispersity index (PDI), Lambda, and branching number Bn of each sample.

TABLE IX

Comparison of Test Results

| | Sample | Mn | Mw | Mz | Mz/Mw | PDI | Bn | Lambda |
|---|---|---|---|---|---|---|---|---|
| #1 | Thermal PS | 132,200 | 243,300 | 382,800 | 2.896 | 1.84 | 0.000 | 0.000 |
| #2 | 585 | 121,500 | 268,200 | 459,700 | 3.783 | 2.21 | 0.144 | 0.040 |
| #3 | Branched MF | 99,000 | 236,000 | 458,700 | 4.633 | 2.38 | 0.292 | 0.042 |
| #4 | 145 ppm L-531 40 ppm L-233 | 149,800 | 289,200 | 442,900 | 2.957 | 1.93 | 0.046 | 0.017 |
| #5 | 100 ppm DVB | 166,353 | 388,261 | 705,417 | 4.240 | 2.33 | 0.148 | 0.008 |
| #6 | 170 ppm L233 0 ppm EGDA | 93,700 | 238,800 | 373,700 | 3.988 | 2.55 | 0.163 | 0.049 |
| #7 | 170 ppm L233 76 ppm EGDA | 131,500 | 272,100 | 467,700 | 3.557 | 2.07 | 0.455 | 0.100 |
| #8 | 3170 ppm L233 152 ppm EGDA | 120,900 | 318,500 | 639,300 | 5.288 | 2.63 | 0.632 | 0.103 |
| #9 | 170 ppm L233 228 ppm EGDA | 157,300 | 403,400 | 864,400 | 5.495 | 2.56 | 1.154 | 0.137 |

Figure 25:
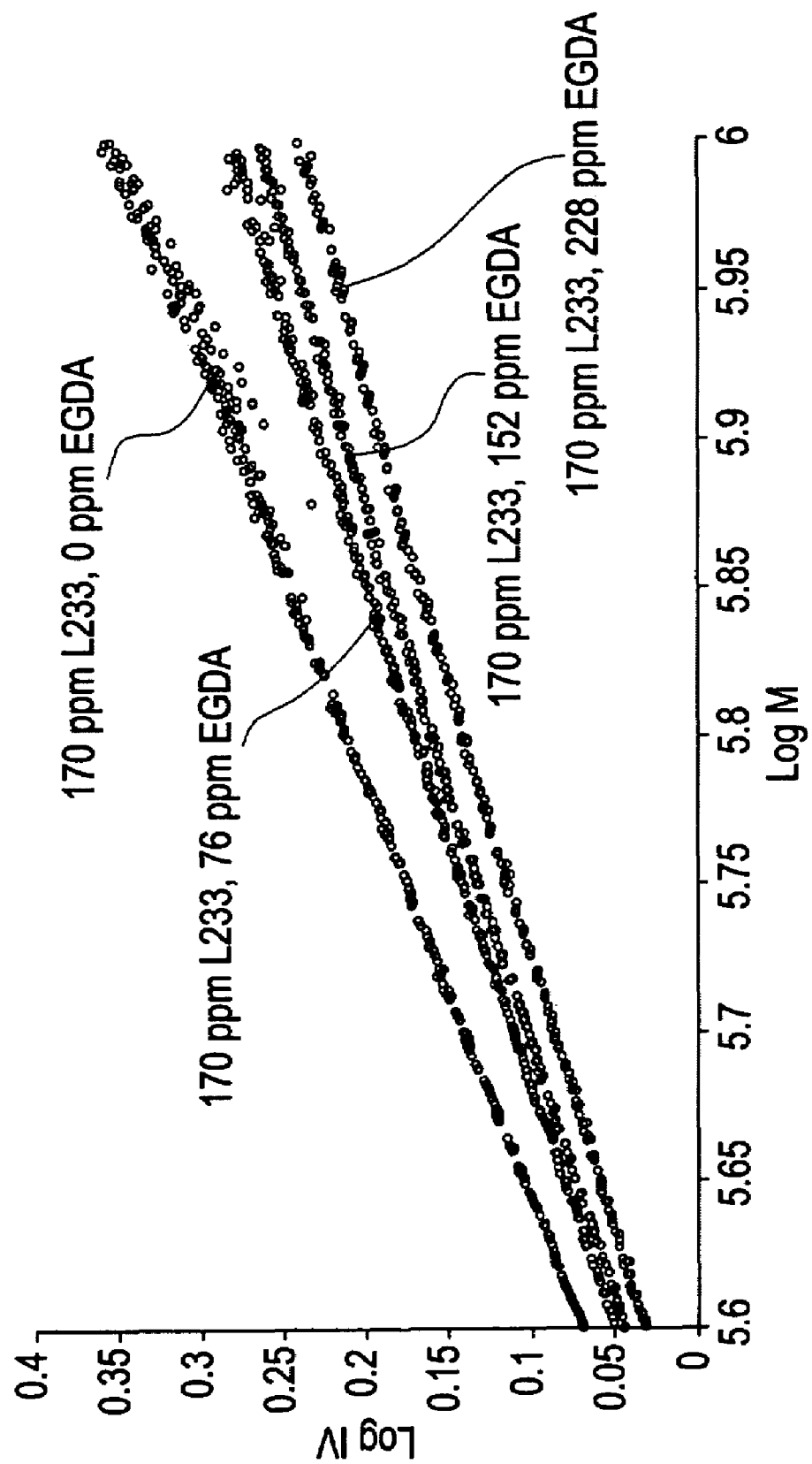
FIG. 25 is an expanded view of FIG. 24 from Log M 5.6 to 6.

FIG. 25 is an expanded view of FIG. 24 from Log M 5.6 to Log M 6.0.

Figure 26:
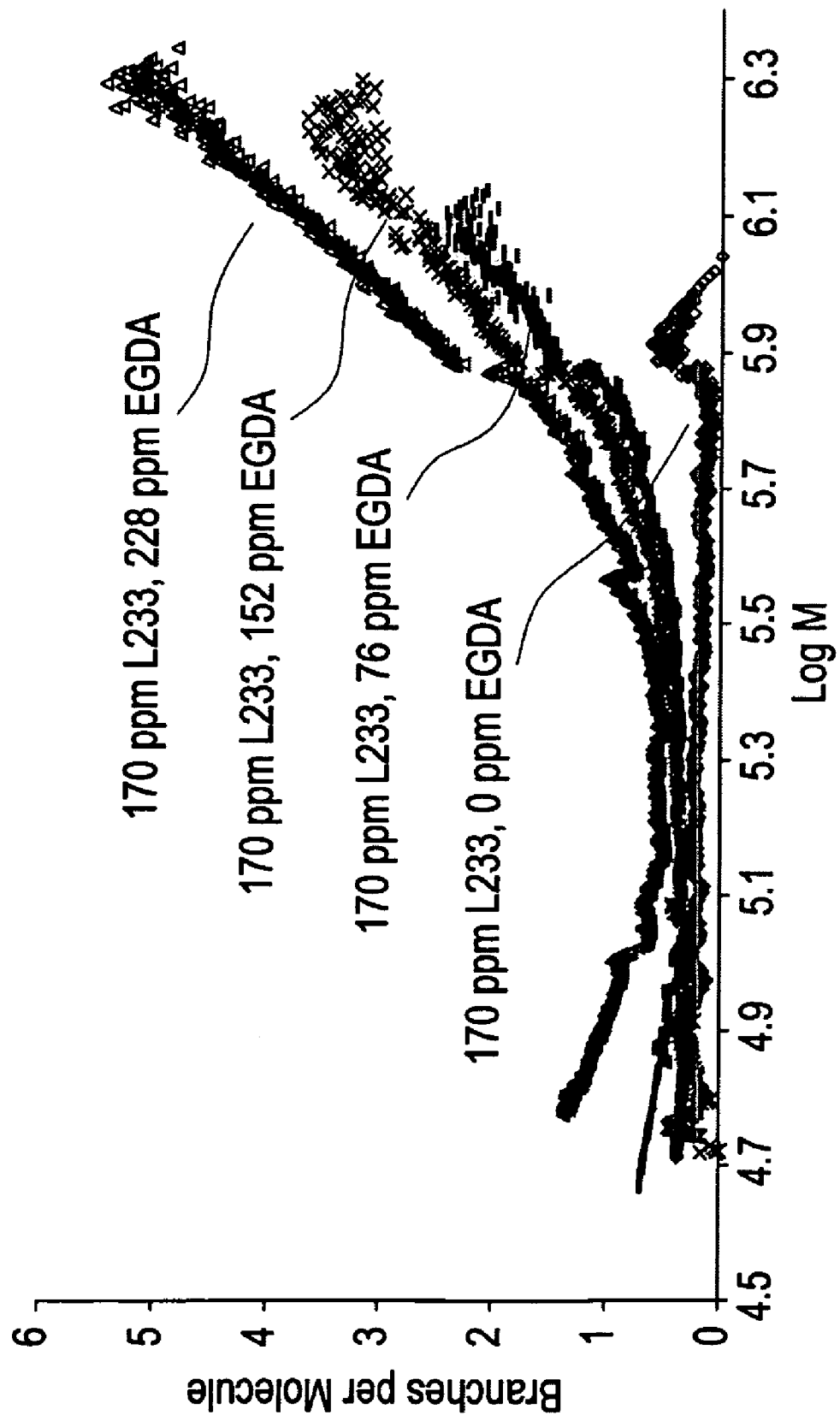
FIG. 26 is a plot that shows the branches/molecule (Branches per Molecule) versus Log M for Samples 6-9.

FIG. 26 shows the branches/molecule (Branches per Molecule) versus Log M. FIG. 26 shows that in samples with the same concentration of bifunctional initiator (L233) that the number of branches per molecule increases as the concentration of the cross-linking agent is increased. For polymers prepared with EDGA and a bifunctional initiator, branching appears to extend beyond Log M 6.0.

Figure 27:
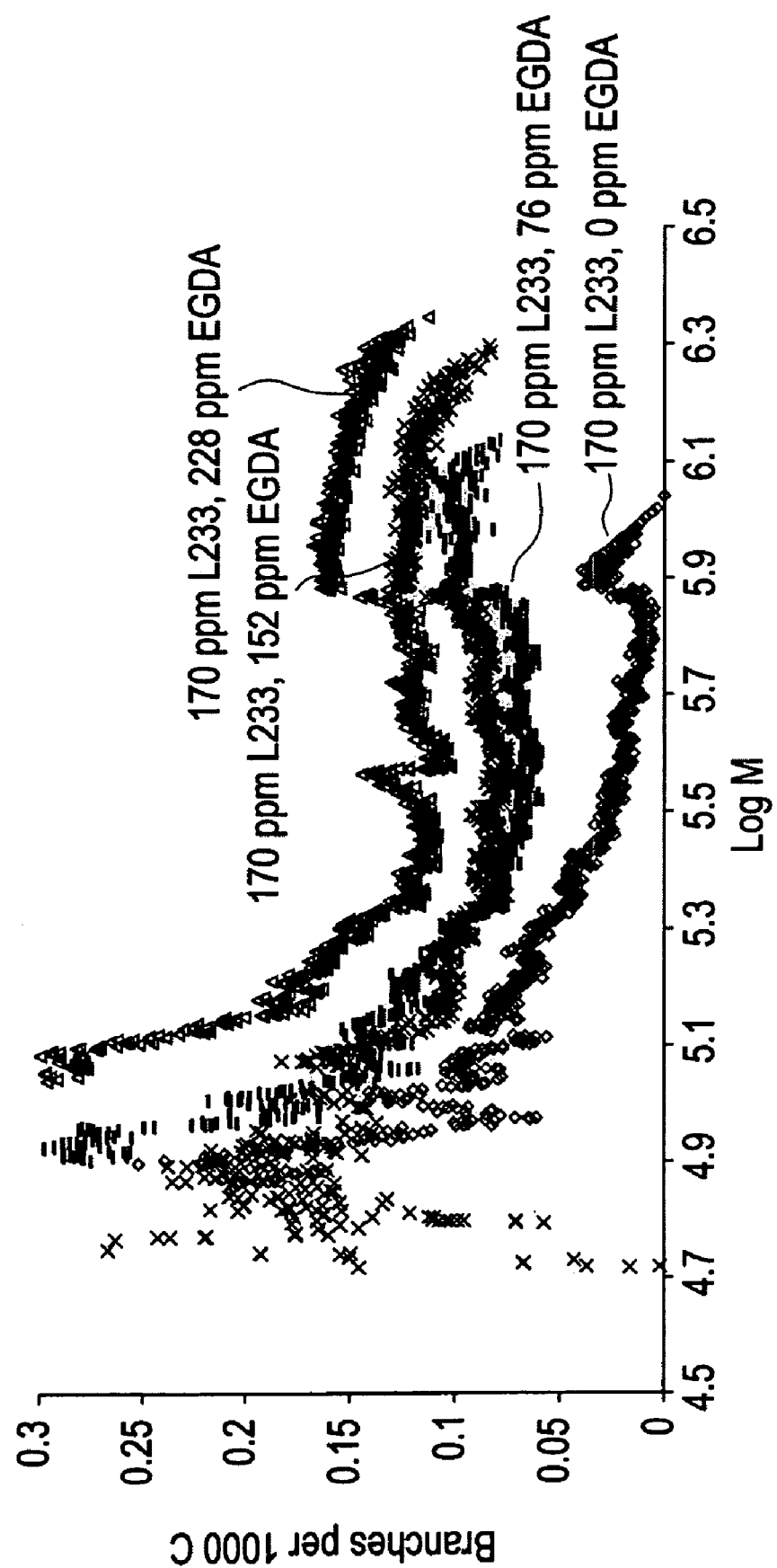
FIG. 27 is a plot that shows the branches/1000 backbone carbons versus Log M for Samples 6-9.

FIG. 27 shows the branches/1000 backbone carbons versus Log M. FIG. 27 shows that sample with the highest concentration of cross-linking agent shows the highest branching. Table VIII shows the averaged results of the analysis for Samples 6-9.

TABLE VIII

Test Results

| Sample | Mn | Mw | Mz | PDI | Bn | Lambda |
|---|---|---|---|---|---|---|
| #6 170 ppm L233, 0 ppm EGDA | 93,700 | 238,800 | 373,700 | 2.55 | 0.163 | 0.049 |
| #7 170 ppm L233, 76 ppm EGDA | 131,500 | 272,100 | 467,700 | 2.07 | 0.455 | 0.100 |
| #8 3170 ppm L233, 152 ppm EGDA | 120,900 | 318,500 | 639,300 | 2.63 | 0.632 | 0.103 |
| #9 170 ppm L233, 288 ppm EGDA | 157,300 | 403,400 | 864,400 | 2.56 | 1.154 | 0.137 |

The branching graphs in FIGS. 16, 17, 21, 22, 26 and 27 show significant detector noise at high and low molecular weights. Noise in the high molecular weight region is due to the low concentration of molecules and is thus increased by the scattered signal of the concentration (RI) detector. The response of the light scattering detector is proportional to the molecular weight, thus the noise at the low molecular weight region is increased due to its increased scatter. The useful range likely varies from a log M of about 5.0 to a log M of about 6.0 and in some cases 6.2 for polymers with higher molecular weights.

Comparison of the data averages in Table IX show that there are varying branching activities among this group of samples. Table IX illustrates that the polystyrene Sample 3 prepared with a tetrafunctional initiator has a higher molecular weight than polystyrene Sample 4 prepared with only bifunctional initiators, and that Sample 9 prepared with a bifunctional initiator and a cross-linking agent has the highest Z average molecular weight (Mz), the highest Bn, and the highest Mz/Mw ratio. The table also shows that when a bifunctional initiator is used with a cross-linking agent as in Samples 6-9, that the number of branches per molecule increases as the concentration of the cross-linking agent is increased. In these analyses, the branching number ($B_n$) is one of the most important averages. Of note in these results is the fact that Sample 4 prepared with the L531 and L233 bifunctional mixture produces little or no branching, without cross-linking agents.

In the same polymer batch, chains that are initiated thermally would end up as linear molecules unless they react via chain transfer, in contrast to chains that are initiated with a multifunctional initiator or a multifunctional initiator with a cross-linking agent and/or a chain transfer agent, thereby forming branched molecules. Thus, the molecular weight of the polymer is based upon both the linear and branched fractions. This measuring and quantifying technique has shown a great ability to distinguish polystyrene resins with different levels of branching, and the test results showed good correlation with the expected branching levels. Additionally, comparable types of branching measurements are also likely possible in other types of polymers using other types of linear references.

Additional Experiments Comparing Polystyrene Foams

Additional experiments were conducted on foams prepared with experimental non-linear resins that were prepared with multifunctional initiators in order to determine whether foams prepared with such non-linear resins have properties different from foams that are prepared with resins that are substantially linear. Three different types of experimental foams shown in Table X were prepared with non-linear resins using carbon dioxide as a blowing agent. Total Petrochemicals (USA) commercial grade foams known as 535 and 585 which are substantially linear and have 0.06 branches/1000 backbone carbons or less, were used as controls to compare the properties of such foams with respect to production and processing.

TABLE X

Formulation of Polystyrene Foams

| Sample | Formulation | Mw | Mw/Mn | Mz |
|---|---|---|---|---|
| Linear A - Control | Commercial 585 | 305,000 | 2.4 | 500,000 |
| Linear B - Control | Commercial 535 | 260,000 | 2.6 | 450,000 |
| Branched C | 600 ppm multifunctional initiator | 311,000 | 2.8 | 650,000 |
| Branched D | 600 ppm multifunctional initiator | 300,000 | 3.2 | 2,000,000 |
| Branched E | 600 ppm multifunctional initiator | 315,000 | 3.3 | 2,400,000 |

The materials from Table X were tested in foam applications for extrusion rates and foam properties. Melt flow indexes and densities are properties that are useful in preparing commercial foams.

TABLE XI

Comparison of Foamed Polystyrene Polymers

| Product | MFI | Temp° C. 120° C. | 130° C. | 140° C. | 150° C. |
|---|---|---|---|---|---|
| | | Foam Density kg/M³ | | | |
| Linear A | 1.5 | 184 | 146 | 55 | 394 |
| Linear B | 4 | 83 | 55 | 76 | 69 |
| Branched C | 3.8 | 219 | 119 | 70 | 114 |
| Branched D | 2.6 | 110 | 43 | 83 | 115 |
| Branched E | 3.5 | 79 | 43 | 66 | 56 |

Table XI summarizes the melt flow indexes and densities of the various foam samples. The best foam densities that were obtained at from 120° C. to 130° C. are Branched D and E samples, which also have melt flow indices (MFI's) that are well-suited for commercial foam applications. Further, the extrusion rate during the production of foams made from Branched D and E resin Samples was increased by 15%, as compared to foamed resins having a different composition.

In the foregoing specification, the invention has been described with reference to specific embodiments thereof, and has been demonstrated as effective in providing methods for preparing polymers using peroxide initiators and other additives. However, it will be evident that various modifications and changes can be made thereto without departing from the scope of the invention as set forth in the appended claims. Accordingly, the specification is to be regarded in an illustrative rather than a restrictive sense. For example, specific combinations or amounts of vinyl monomers, diene copolymers, multifunctional peroxide initiators, chain transfer agents, cross-linking agents, and other components falling within the claimed parameters, but not specifically identified or tried in a particular polymer system, are anticipated and expected to be within the scope of this invention. Further, the methods of the invention are expected to work at other conditions, particularly temperature, pressure and proportion conditions, than those exemplified herein.

We claim:
1. A polymer resin comprised of:
linear polymers; non-linear vinyl polymers comprising from 0.1 to 50 weight percent of the polymer resin; and where said non-linear polymers have at least 0.06 branches/1000 backbone carbons, with said branches being measured using a heat polymerized polystyrene as a linear reference, said linear reference having from 0.0 to 0.06 branches/1000 backbone carbons and
by: using a light-scattering detector to provide a measurement that is proportional to molecular weight and concentration;
obtaining absolute molecular weight by using a light scattering detector and a DRI as the concentration detector;
using a viscometer and DRI concentration detector to determine viscosity; and where the viscometer detector provides a measurement that is proportional to intrinsic viscosity and concentration, where said polymer has an average of branches/molecule ($B_n$) of from 0.15 to 1.5, and where $B_n$ is determined by:
obtaining g', the ratio of the measured branched polymer intrinsic viscosity ($IV_b$) to linear ($IV_l$) polymer intrinsic viscosity, or g'=($IV_b/IV_l$);
converting g' to g, using $g=g'^{(1/\epsilon)}$, where $\epsilon$ (epsilon) is from 0.5 to 1.5;
using g to obtain $B_n$ according to the equation:

$$g = \frac{6}{B_n}\left[\frac{1}{2}\left(\frac{2+B_n}{B_n}\right)^{\frac{1}{2}}\ln\left(\frac{(2+B_n)^{\frac{1}{2}}+B_n^{\frac{1}{2}}}{(2+B_n)^{\frac{1}{2}}-B_n^{\frac{1}{2}}}\right)-1\right] \quad \text{Formula (6)}$$

where $B_n$ is the average of branches/molecule; and
where $B_n$ is obtained at each molecular weight M for a chosen log M range.

2. A polymer resin comprised of: linear polymers; non-linear vinyl polymers comprising from 0.1 to 50 weight percent of the polymer resin; and where said non-linear polymers have at least 0.06 branches/1000 backbone carbons, with said branches being measured using a heat polymerized polystyrene as a linear reference, said linear reference having from 0.0 to 0.06 branches/1000 backbone carbons, where said resin is styrenic and where said linear reference has a molecular weight (Mz) of from 200,000 to 400,000 and a molecular weight distribution of from 1.2 to 3.0 at one or more log M values from log M 5.0 to log M 6.0.

3. A polymer resin comprised of:
linear polymers; non-linear vinyl polymers comprising from 0.1 to 50 weight percent of the polymer resin; and where said non-linear polymers have at least 0.06 branches/1000 backbone carbons, with said branches being measured using a heat polymerized polystyrene as a linear reference, said linear reference having from 0.0 to 0.06 branches/1000 backbone carbons, where said branches are measured by using a detector selected from the group consisting of a static-light-scattering detector (SLS), a dynamic-light-scattering detector (DLS), an evaporative light-scattering concentration detector (ELSD), a RI detector, a UV-VIS, a photodiode array detector, a mass detector, a viscometric detector, or any combination thereof, and where said at least one detector is used to obtain number average equation (g) from the ratio of the radius of gyration of the branched polymer sample ($R_gb$) to the radius of gyration of the linear reference($R_gl$) and having a $B_n$ at each molecular weight M for a chosen log M range, according to the equation:

$$g = \frac{6}{B_n}\left[\frac{1}{2}\left(\frac{2+B_n}{B_n}\right)^{\frac{1}{2}} \ln\left(\frac{(2+B_n)^{\frac{1}{2}} + B_n^{\frac{1}{2}}}{(2+B_n)^{\frac{1}{2}} - B_n^{\frac{1}{2}}}\right) - 1\right] \quad \text{Formula (6)}$$

where: $B_n$ is the average of branches/molecule; and $g = (R_{gb}/R_{gl})$.

4. A method of preparing the polymer resin comprised of: linear polymers; non-linear vinyl polymers comprising from 0.1 to 50 weight percent of the polymer resin; and where said non-linear polymers have at least 0.06 branches/1000 backbone carbons, with said branches being measured using a heat polymerized polystyrene as a linear reference, said linear reference having from 0.0 to 0.06 branches/1000 backbone carbons, comprising the steps of: providing a monomer feed stream; providing a cross-linking agent and/or a chain transfer agent; introducing at least one multifunctional peroxide initiator into the monomer, wherein said initiator causes free radical polymerization and formation of said non-linear polymers; and where said cross-linking agent and/or said chain transfer agent are added prior to, during, or after the initiator and adding both a cross-linking agent and a chain transfer agent separately or together, where the chain transfer agent is NDM, the cross-linking agent is DVB, the multifunctional initiator is tetra t-butylperoxycarbonate, and the levels of the DVB and NDM are optimized for given molecular weights, melt flow indices and zero shear viscosities according to the equation:

$$\eta(x,y) = \frac{-\left[\eta(x,y_0) - e^{\left(\frac{-y_0}{t(x)}\right)} \cdot \eta(x,0) + e^{\left(\frac{-y}{t(x)}\right)} \cdot \eta(x,0) - e^{\left(\frac{-y}{t(x)}\right)} \cdot \eta(x,y_0)\right]}{[-1 + e^{\left(\frac{-y_0}{t(x)}\right)}]} \quad \text{(Formula 3)}$$

where x is the amount of DVB in ppm;
y is the amount of NDM in ppm;
$\eta_0$ is the zero shear viscosity;
$t(x) = 55 + 315 \cdot \exp(-x/40)$;
$\eta(x,0) = \eta(0,0) + \alpha^* \exp(x/\beta)$;
$\eta(x,y_0) = \eta(0,y_0) + \gamma^* \exp(x/\delta)$; and
where the parameters $\alpha$, $\beta$, $\gamma$, and $\delta$ are determined empirically from $\eta(x,0)$ and $\eta(x,y_0)$ and four experimental data points $(0,0)$ $(x_0,0)$ $(0,y_0)$ and $(x_0,y_0)$.

\* \* \* \* \*